(12) United States Patent
Francis et al.

(10) Patent No.: US 7,294,368 B2
(45) Date of Patent: Nov. 13, 2007

(54) LIQUID CRYSTAL COMPOSITION FOR USE IN BISTABLE LIQUID CRYSTAL DEVICES

(75) Inventors: Matthew Francis, Chandlers Ford (GB); Marc John Goulding, Hampshire (GB); Doina Ionescu, Hampshire (GB); Cecile Schott, Southampton (GB); John Clifford Jones, Leighsinton (GB); Steve Beldon, Herefordshire (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/538,788

(22) PCT Filed: Nov. 19, 2003

(86) PCT No.: PCT/EP03/12953

§ 371 (c)(1),
(2), (4) Date: Jun. 10, 2005

(87) PCT Pub. No.: WO2004/053021

PCT Pub. Date: Jun. 24, 2004

(65) Prior Publication Data

US 2006/0054858 A1    Mar. 16, 2006

(30) Foreign Application Priority Data

Dec. 11, 2002    (EP)    .................... 02027744

(51) Int. Cl.
*C09K 19/30* (2006.01)
*C09K 19/20* (2006.01)
*C09K 19/12* (2006.01)

(52) U.S. Cl. ............. 428/1.1; 252/299.63; 252/299.66; 252/299.67

(58) Field of Classification Search ................ 428/1.1, 428/1.3; 252/299.01, 299.61, 299.63, 299.64, 252/299.65, 299.66, 299.67; 349/41, 186
See application file for complete search history.

(56) References Cited

U.S. PATENT DOCUMENTS 5,976,407 A    11/1999    Tarumi et al.
6,028,655 A *  2/2000    Weber et al. ................ 349/182
6,249,332 B1   6/2001    Bryan-Brown et al.
6,440,506 B1   8/2002    Kojima et al.
6,514,579 B1   2/2003    Hirschmann et al.
6,544,602 B1   4/2003    Hirschmann et al.
6,569,503 B1   5/2003    Hirschmann et al.
2002/0086120 A1*  7/2002  Jacob et al. ................. 428/1.1
2002/0197420 A1   12/2002  Hirschmann et al.
2003/0113482 A1   6/2003   Nakajima et al.
2003/0209691 A1   11/2003  Hirschmann et al.
2003/0224125 A1   12/2003  Heckmeier et al.
2004/0188654 A1*  9/2004   Dubois et al. ......... 252/299.61

FOREIGN PATENT DOCUMENTS

| DE | 10018598 | 11/2000 |
|---|---|---|
| DE | 10020061 | 12/2000 |
| DE | 10020059 | 1/2001 |
| DE | 10027066 | 1/2001 |
| DE | 10056323 | 6/2001 |
| DE | 10112954 | 12/2001 |
| DE | 10221751 | * 12/2002 |
| GB | 2358870 | 8/2001 |
| WO | WO 9714990 | 4/1997 |
| WO | WO 9934251 | 7/1999 |
| WO | WO 0140853 | 6/2001 |
| WO | WO 0164814 | 9/2001 |
| WO | WO 0208825 | 1/2002 |

* cited by examiner

Primary Examiner—Shean C Wu
(74) Attorney, Agent, or Firm—Millen, White, Zelano & Branigan, P.C.

(57) ABSTRACT

The invention is directed to the use of a liquid crystal composition in a bistable liquid crystal device and especially in a zenithal bistable nematic liquid crystal device, a nematic liquid crystal medium, and a bistable liquid crystal device comprising the liquid crystal composition whereby said liquid crystal composition comprises at least 30 weight % (based on the total weight of the composition) of a component (α) containing one or more compounds having a dielectric anisotropy Δε of at least 25, whereby at least 25 weight % (based on the total weight of the composition) of said compounds have a dielectric anisotropy Δε of at least 40; and at least 5 weight % of a component (β).

28 Claims, 2 Drawing Sheets

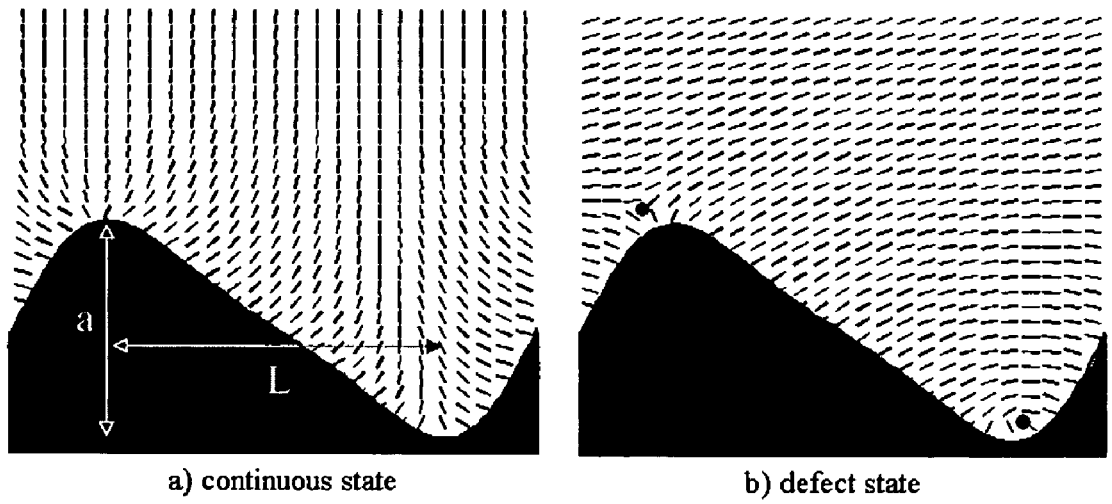
Figure 1. Illustration of zenithal bistability using grating alignment (with the lines indicating the local director) showing a) the high tilt (continuous) and b) the low tilt (defect) states.
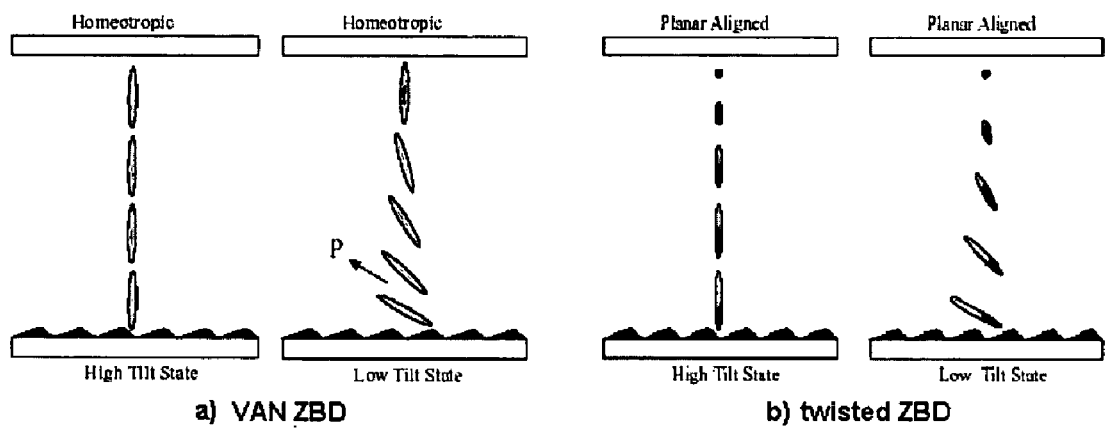
Figure 2. The a) VAN and b) TN geometries for ZBD showing the director distribution of the high and low tilt states.

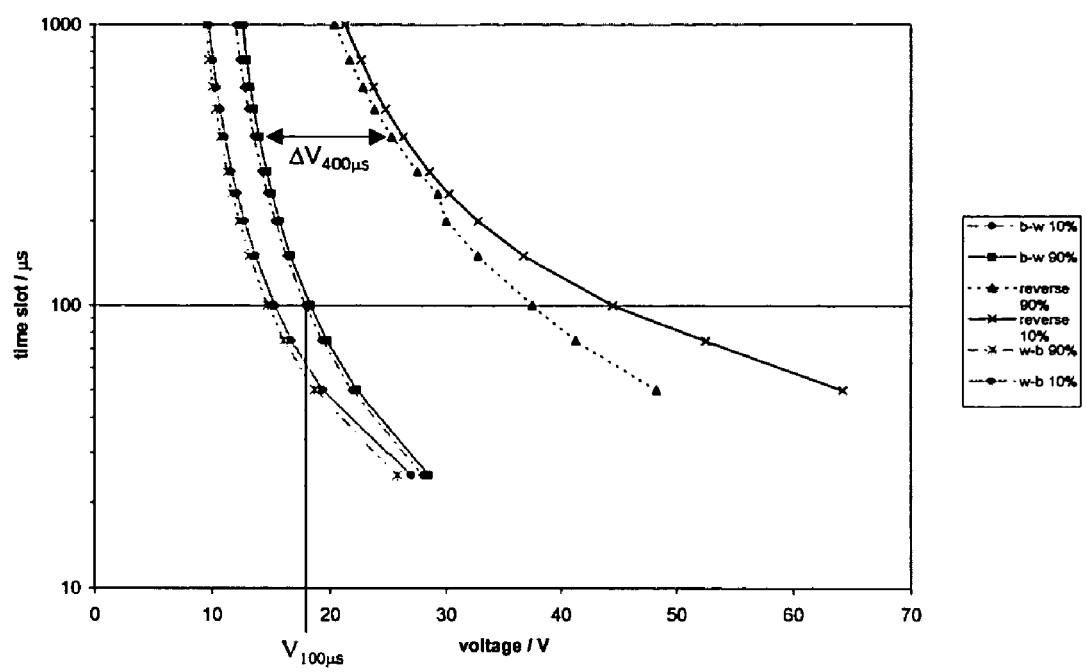
Figure 3. The τ-V curve for MLC-6204-000 at 25°C (pulse duration or time slot vs. voltage). The switching voltage ($V_{100\mu s}$) and operating window ($\Delta V_{400\mu s}$) used for comparisons are indicated.

LIQUID CRYSTAL COMPOSITION FOR USE IN BISTABLE LIQUID CRYSTAL DEVICES

The invention is directed to the use of a liquid crystal composition in a bistable liquid crystal device and especially in a zenithal bistable nematic liquid crystal device, a nematic liquid crystal medium, and a bistable liquid crystal device comprising the liquid crystal composition.

Electrooptical devices utilizing liquid crystal media for displaying information are well known and used in a wide variety of technical applications (see, for a review, H. Kawamoto, Proc. IEEE, 90, 460 (2002)). Among these, nematic liquid crystal devices are the most prominent; there are, for instance, twisted nematic (TN) liquid crystal devices (M. Schadt and W. Helfrich, Appl. Phys. Lett., 18, 127 (1971)) and super-twisted nematic (STN) liquid crystal devices (see, inter alia, T. J. Scheffer and J. Nehring, Appl. Phys. Lett., 48, 1021 (1984)). These devices are monostable, i.e. the liquid crystal medium is switched to an ON state by application of a suitable voltage, and is allowed to switch to an OFF state when the voltage applied falls below a lower voltage level. In order to display complex information electrooptical devices need to comprise a number of picture elements that can be switched independently of each other. However, when direct or even multiplex addressing of pixels are used, the number of elements addressable in nematic liquid crystal displays is limited, in the first case by mere geometrical requirements of the electrical connections and in the second case by the steepness of the device's transmission versus the voltage curve.

This limitation can be overcome by incorporating thin film transistors (TFT) into each picture element. Such devices, also known as active matrix (AM) displays, enable addressing of a high number of picture elements and thus of large area high resolution displays and with relatively low voltage requirements. Some of these devices are also mechanically rather stable and have a wide temperature range. Although this allows the construction of small and portable battery powered displays, for certain applications the techniques have several drawbacks. Manufacturing AM displays is still a complicated process involving the building up of a complex assembly which contributes to rather high costs of production. Since the device has no intrinsic or internal memory, constant update of the display even for static images is required. This causes relatively high power consumption and, hence, rather poor battery life time. This is especially undesired with portable devices displaying information that is changed only from time to time or in a limited part of the display such as mobile phones, personal digital assistants (PDAs), pagers, electronic shelf edge labels, and the like.

An approach to avoid the limitations and drawbacks of these nematic liquid crystal devices is to use displays with an internal memory effect, e.g. a bistable liquid crystal device. Bistability means that the molecules of the liquid crystal medium inside the device can adopt two (or more) different stable states. Consequently, by applying a suitable addressing scheme the liquid crystal molecules of the medium are switched into a first stable state which persists even after addressing; utilization of another addressing scheme causes the liquid crystal molecules to adopt a second stable state that likewise persists after addressing.

Ferroelectric liquid crystal displays using smectic liquid crystal materials can be made into bistable devices. They have, however, several disadvantages, e.g. lack of shock resistance, narrow operating temperature range, and low cell gap causing manufacturing difficulties. Therefore, these ferroelectric devices are unlikely to fulfill the requirements to displays for the portable devices mentioned above.

However, not only ferroelectric smectic liquid crystals are capable of being used in bistable devices but also nematic liquid crystals. Besides other approaches that utilize bistable bulk configurations adopted by nematic liquid crystals (see, for instance, I. Dozov et al., "Recent improvements of bistable nematic displays switched by anchoring breaking (BiNem®)", Proceedings SID 01 (2001), 16.1, 224 and references therewithin), a promising way of achieving bistability in a nematic liquid crystal display is to use a surface alignment which can support two or more stable states. As discussed in literature (see, for instance, J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, Eds., Proceedings of SPIE Vol. 3955 (2000), 84 and references cited therein) two types, azimuthal and zenithal bistability, can be distinguished.

In the first instance (i.e. azimuthal bistability), the director of the liquid crystal molecules in the display having a grating alignment on the surface of one of the display cell's plates (or substrates) will lie parallel to said plate in both stable states; that means that switching between the stable states occurs within the plane of the display cell's plates (see, for instance, WO 92/00546 and WO 95/22077 which describes the use of a substrate having a bigrating alignment layer). However, reproducing selection of the stable states is found to be difficult and switching generally requires a high switching voltage.

On the other hand, zenithal bistability is observed when the zenithal bistable surface is used (see FIG. 1; the tiny lines represent the local director of the liquid crystal molecules that are oriented by interaction with the surface grating and appropriate alignment layer). With such a surface, the director of the liquid crystal molecules has two possible configurations with different pretilt angles in the same azimuthal plane (i.e. the plane perpendicular to the surface of the display cell's substrate). The first state is the high tilt state while the second state is the low tilt state. The grating of the zenithal bistable surface is defined by its amplitude a and its pitch L; typical values are for L of about 1 μm and for a of about 0.6 to 0.8 μm (see WO 97/14990 and, for more details, WO 02/08825; and J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, eds., Proceedings of SPIE Vol. 3955 (2000), 84).

A homeotropic orientation can be, for example, induced by coating the grating with a homeotropic alignment layer; this orientation ensures that the director of the liquid crystal molecules does not lie parallel to the grooves of the grating. Although the orientation of the director of the liquid crystal molecules is perpendicular to the (local) surface, i.e. varying with the location on the surface along a direction perpendicular to the grooves, the orientation in the "bulk" is very much influenced by the opposite surface alignment in both states. Switching from one stable state to the other may be achieved by applying a simple electrical pulse thereby causing a switch from a black display or picture element to a white one (or vice versa) with the appropriate polariser configuration and retardation, and switching back to the original state occurs upon application of a pulse of opposite polarity thereby causing a switch from white to black (or vice versa). Switching may also be induced by using pulses of same polarity but with much higher voltages (also referred to as "reverse switching"); however, reverse switching is a detrimental effect which limits the operation of a zenithal bistable nematic device in terms of the addressing and so a high a voltage as-possible is desired for the reverse switching.

In general, for obtaining zenithal bistability only one of the two display cell's substrates is provided with a surface grating. The opposite plate may have a surface providing a homeotropic alignment of the liquid crystal director (VAN mode, see FIG. 2a)) or a surface inducing planar alignment of the director (twisted mode, see FIG. 2b)) thereby causing the twisting of the liquid crystal director around the axis perpendicular to the substrates across the cell for the low tilt state. For details with regard to cell geometry and configuration, exact cell parameters, addressing means, assembling of the entire zenithal bistable device (including use of polarisers) and so on, see the disclosure of WO 97/14990, E. L. Wood, G. P. Bryan-Brown, P. Brett, A. Graham, J. C. Jones, and J. R. Hughes, "Zenithal Bistable Device (ZBD™) Suitable for Portable Applications, SID 00 Digest (2000), 124, J. C. Jones, J. R. Hughes, A. Graham, P. Brett, G. P. Bryan-Brown, and E. L. Wood, "Zenithal Bistable Devices: Towards the electronic book with a simple LCD", IDW '00 (2000), 301, J. C. Jones, S. M. Beldon and E. L. Wood, "Greyscale in Zenithal Bistable LCD: The Route to Ultra-low Power Colour Displays", seminar talk on the ASID meeting 2002 of the Society for Information Display, Singapore, September 2002; and the detailed discussion given in J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, eds., Proceedings of SPIE Vol. 3955 (2000), 84, and references cited therein.

Utilizing zenithal bistability in electrooptical devices offers attractive features:

Image retention on a display without continuous update combined with

High mechanical shock stability

Low power consumption since the display only needs addressing when the image changes Infinite multiplexibility for unlimited resolution without the need for TFT elements Transmissive and reflective modes possible Suitability for use with plastic substrates Besides the assembly and make up of the zenithal bistable display, another key issue to the zenithal bistable device technology is the nematic liquid crystal medium used inside the display's cell.

The zenithal bistable device and hence the liquid crystal medium have to meet several requirements more or less depending on the specific use of the device. Since there is no consistent theory so far that might predict the physical variables to be optimized, it turned out to be helpful using a set of (semi-)empirical parameters for evaluating liquid crystal media with respect to their usefulness in zenithal bistable nematic devices. These are illustrated in the so-called τ-V curve for switching voltages of pulse duration τ and for 10 and 90% switching levels with opposite polarities (see FIG. 3) for a liquid crystal mixture of the prior art, namely MLC-6204-000 of Merck KGaA, Darmstadt, Germany.

Firstly, in order to minimize power consumption, to allow more flexibility with the addressing of the device's picture elements and to remain within the limits of standard STN drivers a low switching field and correspondingly a low operating voltage is desirable for switching from one bistable state to the other. For material comparison one can determine the switching field E for a pulse (usually a 100 μs pulse duration) from the switching voltage V that gives a transmission change from, e.g., 0 to 90% transmission (black-to-white; B-W) for a particular liquid crystal mixture in a given test cell providing zenithal bistability. (In general, one can also use the 100 to 10% transmission change transition of white-to-black, W-B, where the switching field of which may be higher or lower than the B-W transition depending on the grating's shape and dimensions.) In order to take into account the voltage drop across the grating (which varies for different types of gratings as well as cell thickness) the value of E actually measured is corrected to distinguish the field just across the liquid crystal again for comparison purposes giving the corrected switching field $E_{LC@100\ \mu s}$ for a 100 μs pulse. Here, an additional factor of 1.5 μm is added to the cell thickness d when calculating the field just across the liquid crystal:

$$E_{100\ \mu s} = V_{100\ \mu s}/d \text{ and } E_{LC@100\ \mu s} = V_{100\ \mu s}/(d+1.5)$$
where $d$ is in μm.

Multiplying $E_{LC@100\ \mu s}$ with optimum cell gap $d_{opt}$ (that can be approximated by using the TN $1^{st}$ minimum condition $d_{opt} = \lambda\sqrt{3}/(2\Delta n)$ with $\lambda=555$ nm and $\Delta n$ being the optical anisotropy of the liquid crystal medium) gives the operating voltage $V_{opt}$ corresponding to the optimum cell gap for a 100 μs pulse for just the liquid crystal. $E_{LC@100\ \mu s}$ and so $V_{opt}$ depend on the liquid crystal medium used. The optimum cell gap is considered only for the twisted mode (see FIG. 2b)) here but comparisons can also be made for the VAN mode (see FIG. 2a)), where the retardation of the hybrid state will be matched to either a half-wave plate of quarter-wave plate depending on the polariser configuration ($d\Delta n=\lambda/2$ and $d\Delta n=\lambda/4$, respectively).

The second empirical parameter that needs to be taken into account is the operating window $\Delta V_{opt}$ corresponding to the optimum cell gap. It describes the effect of reverse switching: When applying a pulse with a given time slot of, e.g. 400 μs, and a defined pulse polarity, e.g. B-W, one observes the desired switching at a specific value of the switching field and a further reverse switching (e.g. W-B in this case) which is not induced by a pulse of inverse polarity but by a pulse of the same polarity at an increased switching field. For technical purposes, obviously said operating window ought to be as wide as possible to permit more flexibility of the driving schemes used and particularly in relation to achieving good grayscale operation (see J. C. Jones, S. M. Beldon and E. L. Wood, "Greyscale in Zenithal Bistable LCD: The Route to Ultra-low Power Colour Displays", seminar talk on the ASID meeting 2002 of the Society for Information Display.) It can be represented by $\Delta E_{LC@400\ \mu s}$, that is the corrected difference between the 90% reverse switching field and the 90% B-W switching field for a 400 μs pulse:

$$\Delta E_{400\ \mu s} \Delta V_{400\ \mu s}/d \text{ and } \Delta E_{LC@400\ \mu s} = \Delta V_{400\ \mu s}/(d+1.5) \text{ where } d \text{ is in μm.}$$

Taking into account the optimum cell gap $d_{opt}$ by multiplying with $\Delta E_{LC@400\ \mu s}$ eventually gives the operating window $\Delta V_{opt}$ ($d_{opt} \Delta E_{LC@400\ \mu s} = \Delta V_{opt}$).

A further parameter, the optical response time $\tau_{opt}$ corresponding to the optimum cell gap, describes how fast the liquid crystal medium changes between stable states upon application of an electric pulse. It can be determined by measuring the response time τ for the 10-90% B-W transition using a 100 μs pulse in the actual test cell; then, in order to normalize the experimental values, τ is multiplied by $(d^{opt}/d)^2$ giving $\tau_{opt}$ (with $d_{opt}$ being the optimum cell gap as calculated above for $V_{opt}$ and d being the actual cell gap of the test cell used). The W-B transition is much faster (less than 1 ms) and so indeed the B-W response time is of most importance when assessing the properties of the liquid crystal medium used. The smaller $\tau_{opt}$ the faster the optical response of the liquid crystal medium. A small $\tau_{opt}$ (of about 40 ms or less) may be desirable for certain electrooptical applications, e.g. displaying moving pictures. It is even more preferred for specific video applications that $\tau_{opt}$ is less than about 16 ms so as not to observe flash.

Still another parameter of great importance is the clearing point $T_{NI}$ of the liquid crystal medium describing the temperature at which the nematic mixture becomes isotropic. For many technical purposes and for increasing the variability of electrooptical devices utilizing zenithal bistability (and so the possible applications), liquid crystal media having a high clearing point, preferably of at least 80° C. or more, are desired.

Those liquid crystal media the use of which in zenithal bistable devices have been described in the prior art do not meet all the parameter requirements outlined above. Even liquid crystal mixture MLC-6204-000 (available from Merck KGaA, Darmstadt, Germany) that has been used in zenithal bistable devices as the preferred medium (WO 01/40853, Example 6; J. C. Jones, G. Bryan-Brown, E. Wood, A. Graham, P. Brett and J. Hughes, "Novel bistable liquid crystal displays based on grating alignment", in "Liquid Crystal Materials, Devices, and Flat Panel Displays", R. Shashidhar, B. Gnade, Eds., Proceedings of SPIE Vol. 3955 (2000), 84) has a clearing point $T_{NI}$ of only 62.4° C. that is rather low for use in zenithal bistable device for many possible applications.

The present invention therefore encounters the problem to provide a liquid crystal composition that is suitable for use in a bistable liquid crystal device and especially in a zenithal bistable nematic device and has improved properties.

The problem is solved by the use of a liquid crystal composition in a bistable liquid crystal device, said device being preferably a zenithal nematic liquid crystal device, whereby said compostion comprises at least 30 weight % (based on the total weight of the composition) of a component (α) containing one or more compounds having a dielectric anisotropy Δε of at least 25, whereby at least 25 weight % (based on the total weight of the composition) of said compounds have a dielectric anisotropy Δε of at least 40; and at least 5 weight % (based on the total weight of the composition) of a component (β);

whereby said component (β) comprises at least one compound of formula III and/or at least one compound of formula IV and/or at least one compound of formula V and/or at least one compound of formula VI and/or at least one compound of formula VII

III

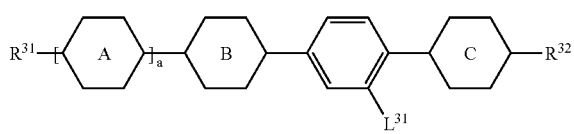

IV

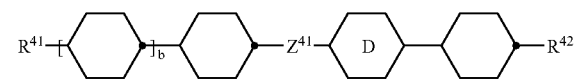

V

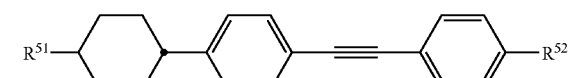

VI

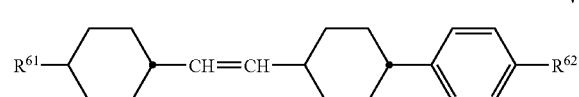

VII

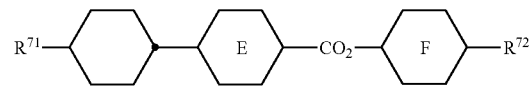

in which a and b are independently of each other 0 or 1;

$R^{31}$, $R^{32}$, $R^{41}$, $R^{42}$, $R^{51}$, $R^{52}$, $R^{61}$, $R^{62}$, $R^{71}$ and $R^{72}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$L^{31}$ is H or F;

$Z^{41}$ is —CO—O—, —CH$_2$O—, —OCH$_2$—, —CF$_2$O—, —OCF$_2$—, —CH$_2$CH$_2$—, —CF$_2$CF$_2$—, —CH$_2$CF$_2$—, —CF$_2$CH$_2$—, —CH=CH— or —C≡C—;

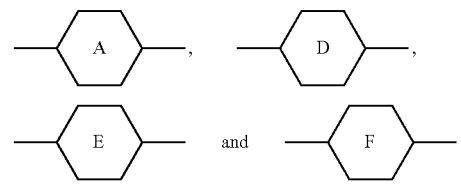

are independently of each other or

-continued

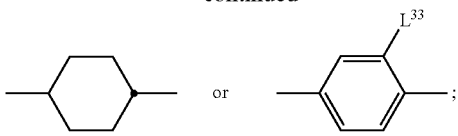

in which

L$^{32}$ and L$^{33}$ are independently of each other H or F.

(If not measured directly, values of Δε for single compounds are obtained by extrapolating Δε values determined using a known concentration of the single compound (usually 10 weight %) in a standard host mixture (usually ZLI-4792 of Merck KGaA, Darmstadt, Germany) for which the initial mixture value of Δε is also known. Further parameters of single compounds may be obtained similarity.)

It is preferred that said component (α) comprises at least one compound of formula I and/or at least one compound of formula II

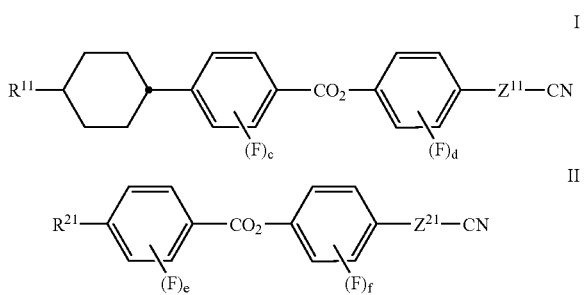

c, d, e and f are independently of each other 0, 1, 2, 3 or 4;

R$^{11}$ is C$_1$-C$_{15}$ alkyl which is unsubstituted or mono- or poly-substituted with CN or halogen and in which one or more of the CH$_2$ groups may be replaced independently of each other by —O—, —S—, —CH=CH—, —C≡C—, —CO—O—, —OC—O— such that there are no hetero atoms adjacent to each other;

R$^{21}$ is C$_2$-C$_{15}$ alkenyl which is unsubstituted or mono- or poly-substituted with CN or halogen and in which one or more of the CH$_2$ groups may be replaced independently of each other by —O—, —S—, —CH=CH—, —C≡C—, —CO—O—, —OC—O— such that there are no hetero atoms adjacent to each other;

Z$^{11}$ and Z$^{21}$ are independently of each other a single bond or —C≡C—.

A further subject matter of this invention is a bistable liquid crystal device comprising two outer substrates which, together with a frame, form a cell;

a liquid crystal composition present in said cell;

electrode structures with alignment layers on the inside of said outer substrates whereby at least one alignment layer comprises an alignment grating that permits the molecules (compounds) of the liquid crystal composition to adopt at least two different stable states whereby the assembly of said electrode structures with said alignment layers being such that a switching between the said at least two different stable states is achieved by applying suitable electric signals to said electrode structures;

whereby said liquid crystal composition is said liquid crystal composition as described above and below and that comprises said components (α) and (β).

In particular, said bistable liquid crystal device is a zenithal bistable nematic liquid crystal device in which said electrode structures with alignment layers on the inside of said outer substrates have at least one alignment layer that comprises an alignment grating that permits the compounds (or the director of the molecules) of said liquid crystal composition to adopt at least two different stable states with different pretilt angles in the same azimuthal plane whereby the assembly of said electrode structures with said alignment layers being such that a switching between the said at least two different stable states is achieved by applying suitable electric signals to said electrode structures.

It will be acknowledged that the invention is described hereinafter primarily with regard to the use of the liquid crystal composition above in a zenithal bistable nematic liquid crystal device although it may be used in other liquid crystal devices as well, for instance, in bistable liquid crystal devices like azimuthal bistable liquid crystal devices as disclosed, inter alia, in WO 92/00546 and WO 95/22077. Thus, details are given for the zenithal bistable nematic liquid crystal device but can easily be adapted to the requirements of other types of bistable liquid crystal devices.

The zenithal bistable nematic device and the liquid crystal composition for use in a zenithal bistable nematic device according to the invention show an improved set of parameters said parameters being, inter alia, operating voltage, operating window, optical response time and, especially, clearing point. It should be noticed that, for instance, the clearing point of the liquid crystal compositions for use in the zenithal bistable nematic devices of the invention is significantly higher than the clearing point of liquid crystal mixtures previously used in zenithal bistable nematic devices. Operating voltage and operating window are both in a range useful for operating of a zenithal bistable nematic device.

The cell that is part of the zenithal bistable nematic device according to the invention may be any conventional cell which allows the nematic liquid crystal composition to adopt at least two different zenithal bistable states. Two possible stable states are schematically depicted in FIG. 1. The two different zenithal bistable states are characterized by two different pretilt angles that are adopted by the liquid crystal molecules in the same azimuthal plane. The cell comprises a frame and two outer substrates or plates and has electrode structures with alignment layers on the inside of said substrates. At least one of these alignment layers has an zenithal alignment grating known to those skilled in the art and as described, for instance, in WO 97/14990, WO 01/40853, WO 02/08825, and J. C. Jones, et al., Proceedings of SPIE Vol. 3955 (2000), 84.

The electrode structures are assembled with the alignment layer(s) in such a way that (in the case of two stable states) switching from one stable state to the other can be achieved by applying suitable electric signals to the electrode structures thereby applying said electric signals to the liquid crystal composition inside the cell. Commonly, single pulses can be used as such suitable electric signals. Details are known to the artisan and described in WO 97/14990, WO 01/40853, WO 02/08825, J. C. Jones, J. R. Hughes, A. Graham, P. Brett, G. P. Bryan-Brown, IDW '00 (2000), 301, J. C. Jones, et al., Proceedings of SPIE Vol. 3955 (2000), 84, and E. L. Wood, P. J. Brett, G. P. Bryan-Brown, A. Graham, R. M. Amos, S. Beldon, E. Cubero and J. C. Jones, "Large Area, High Resolution Portable ZBD Display", SID 02 Digest (2002), 22-25.

The substrate opposite to the substrate having the grating alignment layer may have an homeotropic alignment due to suitable surface treatment (see FIG. 2a)). Switching upon application of an electric pulse occurs from the high tilt or vertically aligned state to the low tilt or hybrid aligned state. This switch gives a black-to-white (B-W) change if the cell is placed between crossed polarizers (at 45° to the grating direction), with the brightest white state obtained when the vertically aligned state acts as a half-waveplate (d$\Delta$n=$\lambda$/2). This switching mode is called VAN mode. Zenithal bistable devices utilizing the VAN mode are very insensitive to cell gap variations. They require additional optical compensators to achieve wide viewing angles. A second switching mode of zenithal bistable devices is called TN mode (see FIG. 2b)): The substrate opposite to the substrate having the grating alignment layer has a alignment layer, usually of rubbed polyimide, causing planar alignment of the liquid crystal molecules on said substrate.

This in turn causes the twisting of the liquid crystal director around their axis perpendicular to the substrates across the cell. Switching upon application of an electric pulse now occurs from the low tilt or twisted aligned state to the high tilt or hybrid aligned state. This switch gives a black-to-white (B-W) change if the cell is placed between parallel polarizers and using the slightly modified TN $1^{st}$ minimum condition (as given above) accounting for the influence of the ordinary refractive index of the hybrid state. Due to a high normal incidence contrast ratio additional optical compensators for achieving wide viewing angles are not required in a transmissive display. Therefore the TN mode is preferred for most of the technical applications of zenithal bistable nematic devices. It is also possible to build up a zenithal bistable reflective display and even a zenithal bistable transflective display. For details, also with regard to the polarizers used, it is referred to WO 97/14990, E. L. Wood, G. P. Bryan-Brown, P. Brett, A. Graham, J. C. Jones, and J. R. Hughes, SID 00 (2000), 124, and E. L. Wood, P. J. Brett, G. P. Bryan-Brown, A. Graham, R. M. Amos, S. Beldon, E. Cubero and J. C. Jones, "Large Area, High Resolution Portable ZBD Display" SID 02 Digest (2002), 22-25.

In the context of the present invention and with respect to the compounds contained in the liquid crystal composition for use in bistable liquid crystal devices and especially in zenithal bistable nematic devices of the invention the term "alkyl" means—as long as it is not defined in a different manner elsewhere in this description or the claims—straight-chain and branched hydrocarbon (aliphatic) radicals with 1 to 15 carbon atoms; the hydrocarbon radicals may be unsubstituted or substituted with one or more substituents being independently selected from the group consisting of F, Cl, Br, I or CN. This subclass of "alkyl" containing aliphatic saturated radicals may also be designated as "alkanyl". Furthermore, "alkyl" is also meant to comprise unsubstituted or likewise substituted hydrocarbon radicals in which one or more of the CH$_2$ groups are such replaced by —O— ("alkoxy", "oxaalkyl"), —S— ("thioalkyl"), —CH═CH— ("alkenyl"), —C≡C— ("alkinyl"), —CO—O— or —O—CO— that there are no adjacent hetero atoms (O, S). Preferably, alkyl is a straight-chain or branched saturated hydrocarbon having 1, 2, 3, 4, 5, 6, 7 or 8 carbon atoms and being unsubstituted or mono- or poly-substituted with F. More preferably, alkyl is meant to be methyl, ethyl, n-propyl, i-propyl, n-butyl, i-butyl, t-butyl, n-pentyl, neopentyl, n-hexyl, n-heptyl, n-octyl; CF$_3$, CHF$_2$, CH$_2$F; CF$_2$CF$_3$. Most preferably, alkyl is a straight-chain hydrocarbon of up to 8 carbon atoms.

Since one or more CH$_2$ groups of an alkyl radical may be replaced by —O— as described above, the term "alkyl" also comprises "alkoxy" and "oxaalkyl" moieties. "Alkoxy" means "O-alkyl" in which the oxygen atom is directly linked to the group or ring being substituted with alkoxy and alkyl is defined as above. In particular, "alkyl" in "O-alkyl" means methyl, ethyl, n-propyl, i-propyl, n-butyl, i-butyl, t-butyl, n-pentyl, neopentyl, n-hexyl, n-heptyl or n-octyl, whereby alkyl is optionally substituted with F. Most preferably, alkoxy is —OCH$_3$, —OC$_2$H$_5$, —O-n-C$_3$H$_7$, —O-n-C$_4$H$_9$, —O-t-C$_4$H$_9$, —OCF$_3$, —OCHF$_2$, —OCHF or —OCHFCHF$_2$. In the context of the present invention the term "oxaalkyl" comprises alkyl moieties in which at least one non-terminal CH$_2$ group is replaced by O in such a way that there are no adjacent oxygen atoms. Preferably, oxaalkyl comprises straight-chain radicals of the formula C$_t$H$_{2t+1}$—O—(CH$_2$)$_u$— in which t and u are independently of each other 1, 2, 3, 4, 5 or 6; especially t is 1 or 2 and u is an integer from 1 to 6.

If one or more of the CH$_2$ groups of alkyl are replaced by sulfur a "thioalkyl" radical is obtained. Thioalkyl comprises alkyl moieties in which at least one terminal or non-terminal CH$_2$ group is replaced by S (sulfur) in such a way that there are no adjacent sulfur atoms. Preferably, thioalkyl comprises straight-chain radicals of the formula C$_t$H$_{2t+1}$—S—(CH$_2$)$_u$— in which t is 1, 2, 3, 4, 5 or 6 and u is 0, 1, 2, 3, 4, 5 or 6; especially t is 1 or 2 and u is zero or an integer from 1 to 6.

In the context of the present invention the term "alkenyl" means an alkyl radical in which one or more —CH═CH— moieties are present. When two —CH═CH— moieties are present the radical may also be designated as "alkadienyl". An alkenyl radical may comprise 2 to 15 carbon atoms and may be straight-chain or branched. It can be unsubstituted or mono- or polysubstituted with F, Cl, Br, I or CN; one or more of its CH$_2$ groups may be replaced independently of each other by —O—, —S—, —C≡C—, —CO—O—, —OC—O— such that there are no hetero atoms adjacent to each other. If the alkenyl CH═CH moiety is not a terminal CH$_2$═CH group it may exist in two configurations, namely the E-isomer and the Z-isomer. In general, the E-isomer (trans) is preferred. Preferably, alkenyl contains 2, 3, 4, 5, 6 or 7 carbon atoms and means vinyl, 1E-propenyl, 1E-butenyl, 1E-pentenyl, 1E-hexenyl, 1E-heptenyl, 2-propenyl, 2E-butenyl, 2E-pentenyl, 2E-hexenyl, 2E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. More preferred alkenyl is vinyl, 1E-propenyl, 3E-butenyl.

In the case one or more CH$_2$ alkyl groups are replaced by —C≡C— an alkinyl radical is obtained. Also the replacement of one or more CH$_2$ alkyl groups by —CO—O— or —O—CO— is possible. The following of these radicals are preferred: acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 2-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)-ethyl, 3-(methoxycarbonyl)-propyl, 3-(ethoxy-carbonyl)-propyl oder 4-(methoxycarbonyl)-butyl.

In the context of the present invention "halogen" means F, Cl, Br and/or I.

The liquid crystal composition for use in the (zenithal) bistable (nematic) liquid crystal device of the invention contains at least two different components, component (α) and component (β).

Component (α) contains one or preferably more compounds having a high dielectric anisotropy Δε of 25 or more, especially of 30 or more. At least 25 weight %, preferably 30 weight % or more, (based on the total weight of the composition) of the compounds of component (α) exhibit a dielectric anisotropy Δε of 40 or more. At least 30 weight % (based on the whole composition) of component (α) need to be comprised by the liquid crystal composition of the zenithal bistable nematic device according to the invention. It is preferred that the liquid crystal composition comprises 35 weight % or more, even more preferred at least 40 weight %, still more preferred at least 45 weight %, most preferred 50 weight % or more, of said component (α).

It has been found by the inventors that component (α) preferably comprises either one or more compounds of formula I or one or more compounds of formula II or one or more compounds of both formula I and formula II (besides other compounds having the required high dielectric anisotropy that may be present). In one preferred embodiment of the invention component (α) contains at least one compound of formula I but no compound of formula II; in another preferred embodiment component (α) contains at least one compound of formula II but no compound of formula I. If component (α) contains at least one compound of formula I, said compound(s) of formula I may be present in a total amount of at least 5 weight %, preferably at least 10 weight %, more preferred at least 15 weight % or more. If component (α) contains one compound of formula II, said compound of formula II may be present in an amount of about 5 to 30 weight %, preferably 8 to 25 weight %, more preferred 10 to 20 weight %. However, if component (α) contains more than one compound of formula II, the total amount of these compounds is in the range of about 5 to about 55 weight %, preferably about 8 to about 35 weight %, more preferred about 9 to about 25 weight %.

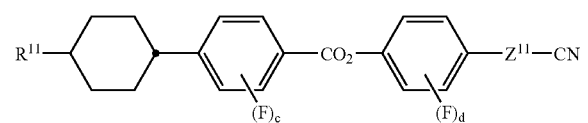

I

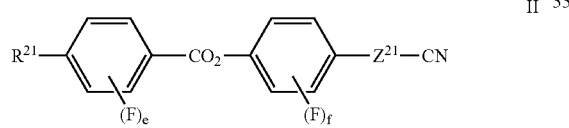

II

With regard to compounds of formula I c and d may be independently of each other 0, 1, 2, 3 or 4, preferably 0, 1 or 2; that means that preferably each of the phenyl rings of formula I may be unsubstituted or mono- or di-substituted with fluorine. If present the F substituent(s) may be in any position of the phenyl ring substituted. It is preferred that

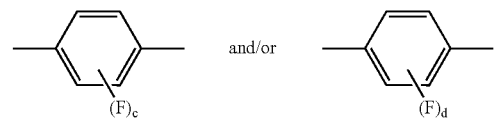

are independently of one another

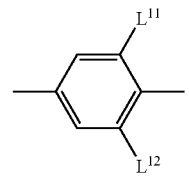

with $L^{11}$ and $L^{12}$ being independently of one another H or F. Furthermore, $Z^{11}$ can be either a single bond (so that the CN group is directly linked to the phenyl ring) or a C—C triple bond thereby forming a —C≡C—CN substituent of the phenyl ring. It is preferred that $Z^{11}$ is a single bond.

Preferred compounds of formula I are the following compounds:

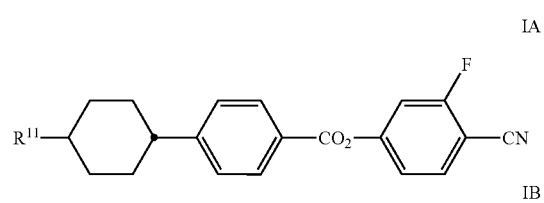

IA

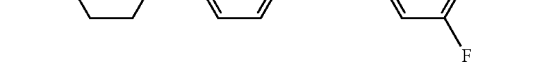

IB

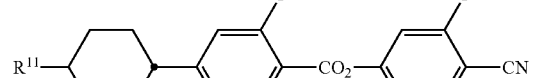

IC

ID

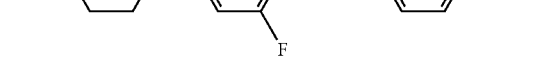

IE

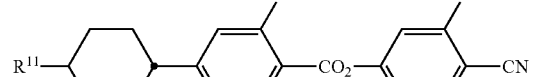

-continued

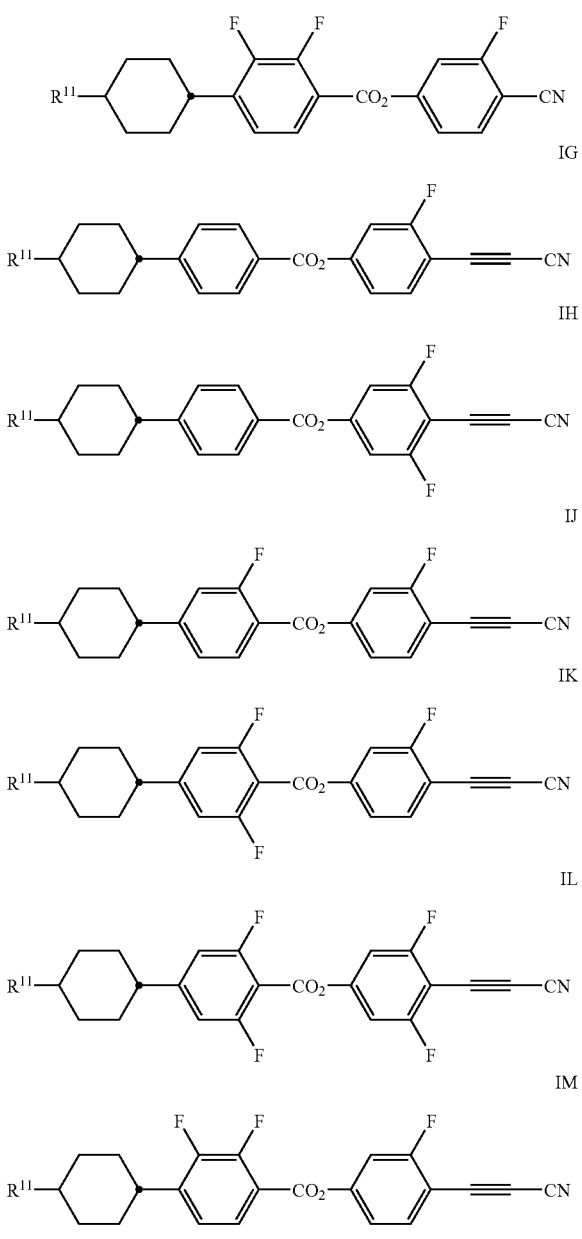

with $R^{11}$ being defined as above. Preferably, $R^{11}$ in formulas I and IA to IM is a straight-chain alkyl radical, especially an alkanyl radical with 1, 2, 3, 4, 5 or 6 carbon atoms. Highly preferred compounds are of general formula IA1 with n=1, 2, 3, 4, 5 or 6.

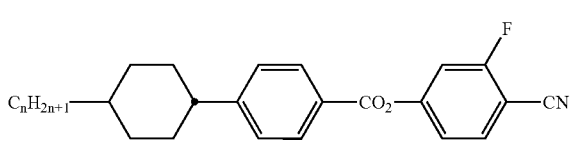

Especially preferred examples of compounds of formula I being present in component (α) either alone or in combination with each other are the following compounds of formula I1 to I3:

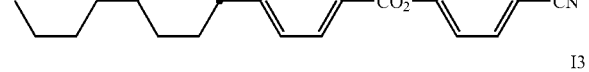

It is preferred to have a mixture of all three compounds I1, I2 and I3 in the liquid crystal composition. For instance, compound I1 exhibits a dielectric anisotropy Δε of 37.5 whereas compound I3 has a Δε of 36.0.

With regard to compounds of formula II e and f may be independently of each other 0, 1, 2, 3 or 4, preferably 0, 1 or 2; that means that preferably each of the phenyl rings of formula II may be unsubstituted or mono- or di-substituted with fluorine. If present the F substituent(s) may be in any position of the phenyl ring substituted. It is preferred that

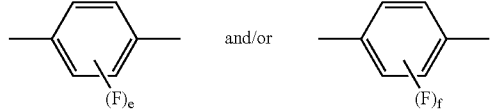

are independently of one another

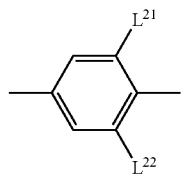

with $L^{21}$ and $L^{22}$ being independently of one another H or F. Furthermore, $Z^{21}$ can be either a single bond (so that the CN group is directly linked to the phenyl ring) or a C—C triple bond thereby forming a —C≡C—CN substituent of the phenyl ring. It is preferred that $Z^{21}$ is a single bond.

Preferred compounds of formula II are the following compounds:

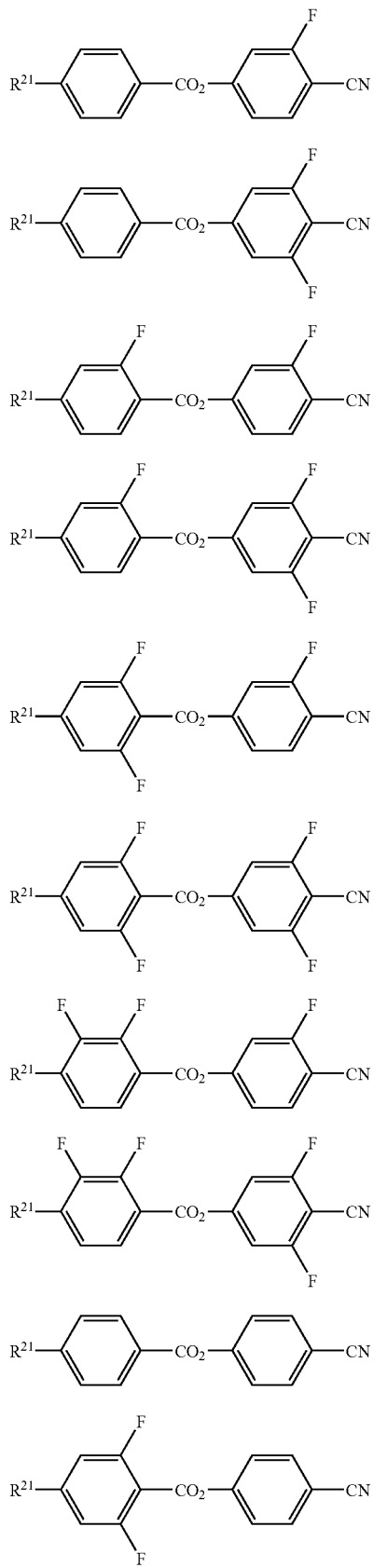
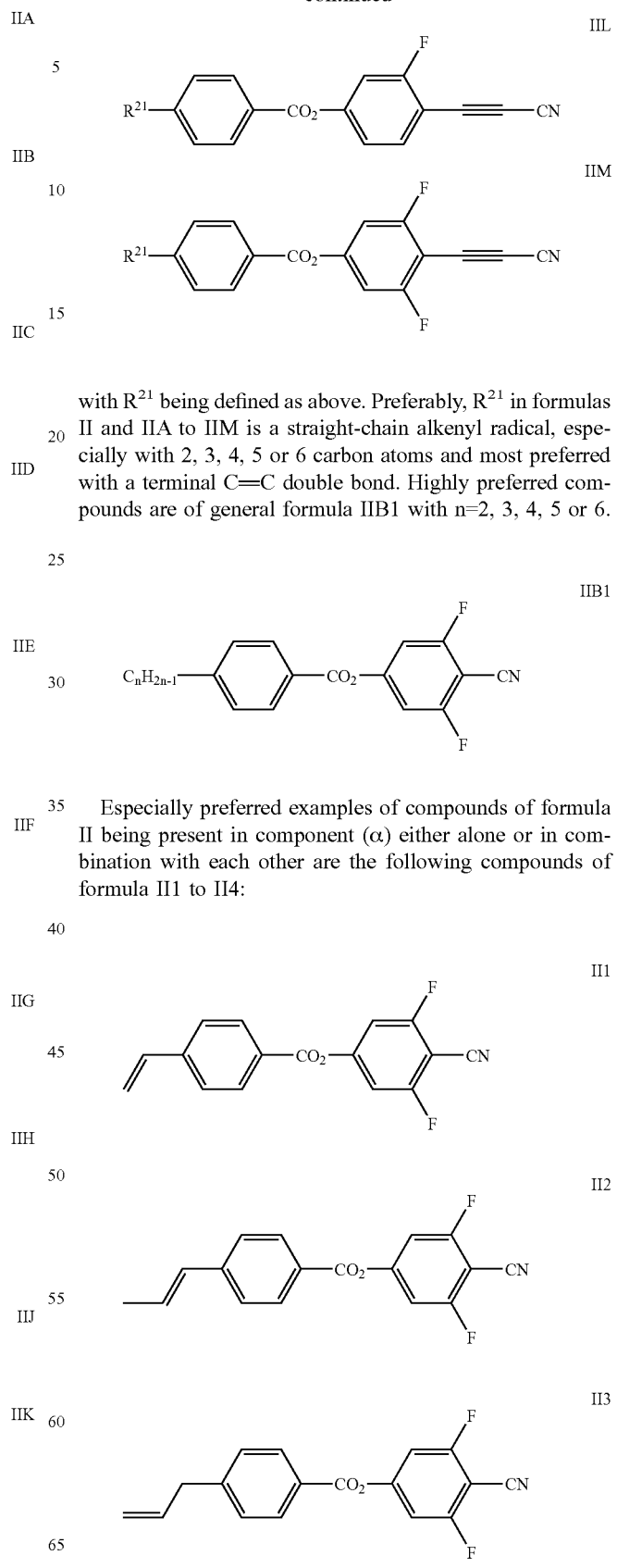

with $R^{21}$ being defined as above. Preferably, $R^{21}$ in formulas II and IIA to IIM is a straight-chain alkenyl radical, especially with 2, 3, 4, 5 or 6 carbon atoms and most preferred with a terminal C=C double bond. Highly preferred compounds are of general formula IIB1 with n=2, 3, 4, 5 or 6.

Especially preferred examples of compounds of formula II being present in component (α) either alone or in combination with each other are the following compounds of formula II1 to II4:

-continued

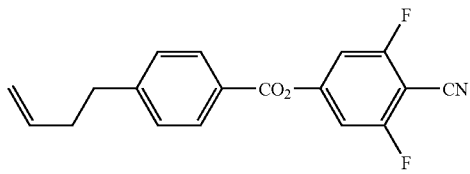
II4

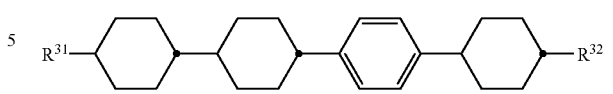
IIIA

IIIB

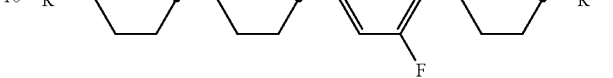
IIIC

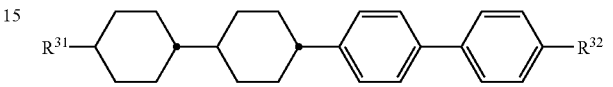
IIID

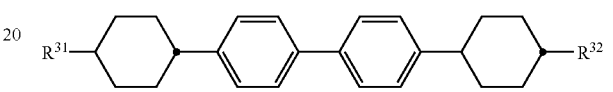
IIIE

The most preferred compound of formula II is compound II4 which exhibits a dielectric anisotropy Δε of 59.5.

With respect to component (β) said component is present in the liquid crystal composition in the zenithal bistable nematic device of the invention in an amount of at least 5 weight % or more. Apparently, component (β) is required for a high clearing point of the liquid crystal mixtures used in zenithal bistable nematic devices. Component (β) comprises compounds of formula III and/or formula IV and/or formula V and/or formula VI and/or formula VII.

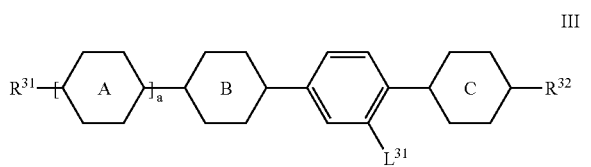
III

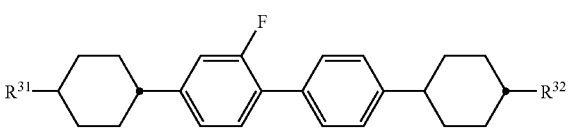
IIIF

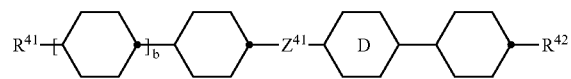
IV

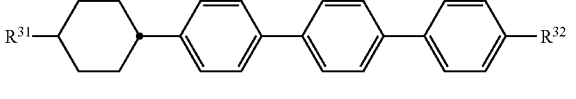
IIIG

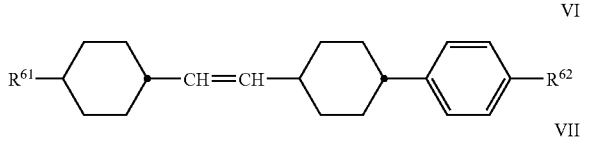
V

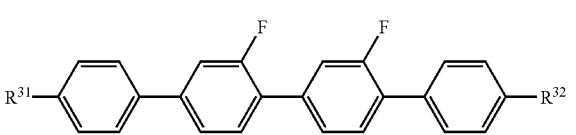
VI

VII with a, b, $R^{31}$, $R^{32}$, $R^{41}$, $R^{42}$, $R^{51}$, $R^{52}$, $R^{61}$, $R^{62}$, $R^{71}$, $R^{72}$, $L^-$, $Z^{41}$ and the rings indicated by A, B, C, D, E and F being defined as above.

With respect to formula III it is preferred that a is 1. Preferred compounds of formula III are of the following formulas:

with $R^{31}$ and $R^{32}$ being as defined above. Preferably, in formulas III and IIIA to IIIG $R^{31}$ and $R^{32}$ are both independently of each other straight-chain alkyl, more preferred straight-chain alkanyl or alkenyl having 2, 3, 4, 5 or 6 carbon atoms, especially straight-chain alkanyl with 2 to 6 carbon atoms, a is 1 and $L^{31}$ is H or F (for formula III). Highly preferred compounds are of formula IIID and IIIE. Especially preferred examples of formula III are compounds of formula III1 to III6:

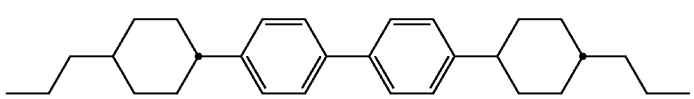
III1

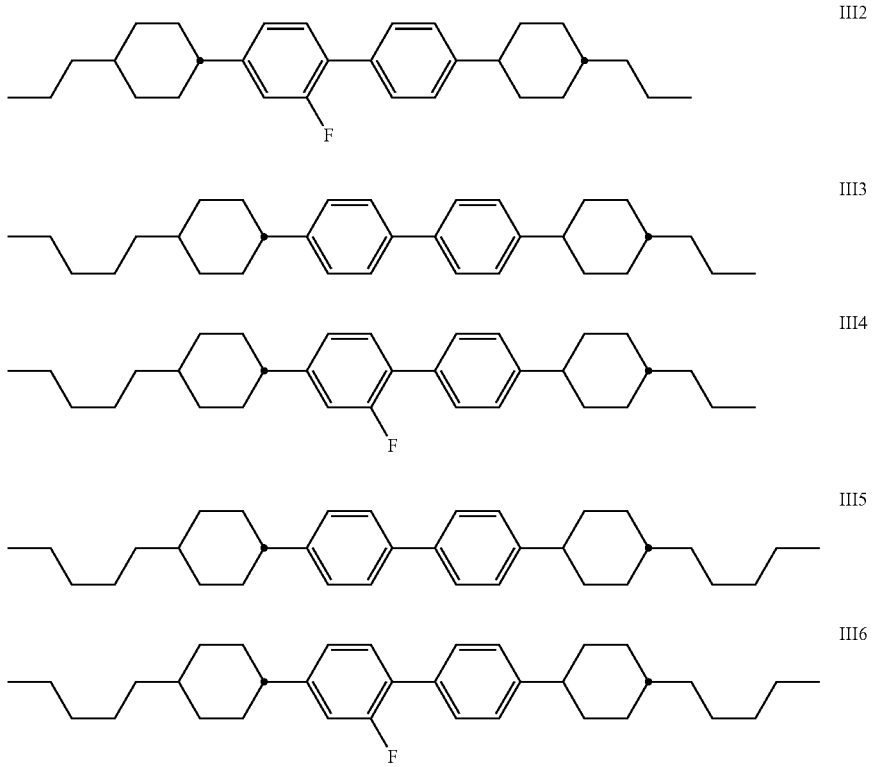

III2

III3

III4

III5

III6

Most preferred compounds of formula III are compounds III2, III4 and III6, and it is especially preferred to have a mixture of all three compounds in the liquid crystal composition.

In some embodiments of the present invention it may also be preferred that a in formula III is zero. Then, preferred compounds of formula III are of the following formulas:

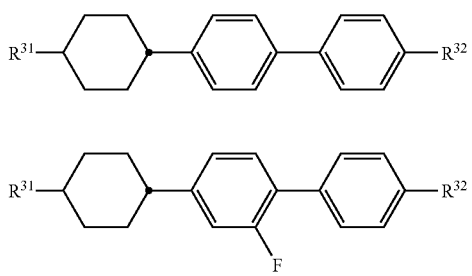

IIIH

IIIJ

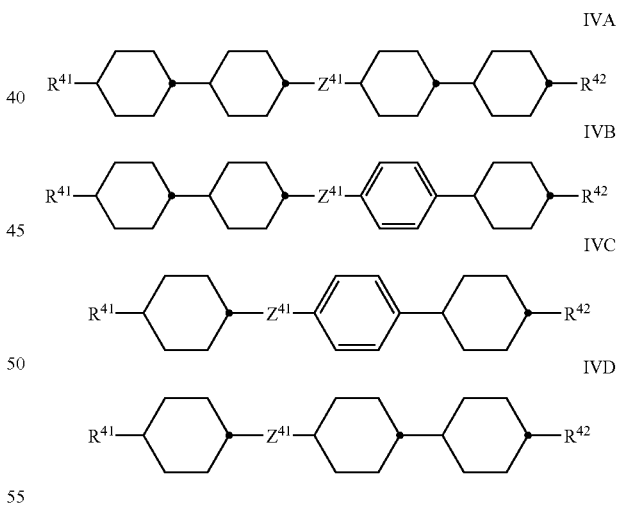

IVA

IVB

IVC

IVD whereby $R^{31}$ and $R^{32}$ are as defined above and preferably independently of each other straight-chain alkyl, more preferred straight-chain alkanyl or alkenyl having 2, 3, 4, 5 or 6 carbon atoms, even more preferred straight-chain alkanyl with 2 to 6 carbon atoms. Especially, $R^{31}$ is n-propyl or n-pentyl and $R^{32}$ is ethyl.

With respect to formula IV preferred compounds are of formulas IVA and IVB in which b is 1 as well as of formulas IVC and IVD in which b is zero:

with $R^{41}$, $R^{42}$ and $Z^{41}$ being as defined above; $Z^{41}$ is preferably —CO—O— or, in case of formula IVD, —OCH$_2$—. $R^{41}$ and $R^{42}$ are both independently of each other straight-chain alkyl, more preferred straight-chain alkanyl or alkenyl having 2, 3, 4, 5 or 6 carbon atoms, especially straight-chain alkanyl with 2 to 6 carbon atoms. Compounds of formula IVB are more preferred. Especially preferred examples of formula IV are compounds of formulas IV1 to IV3 as well as of formulas IV4 and IV5 and of formulas IV6 to IV8:

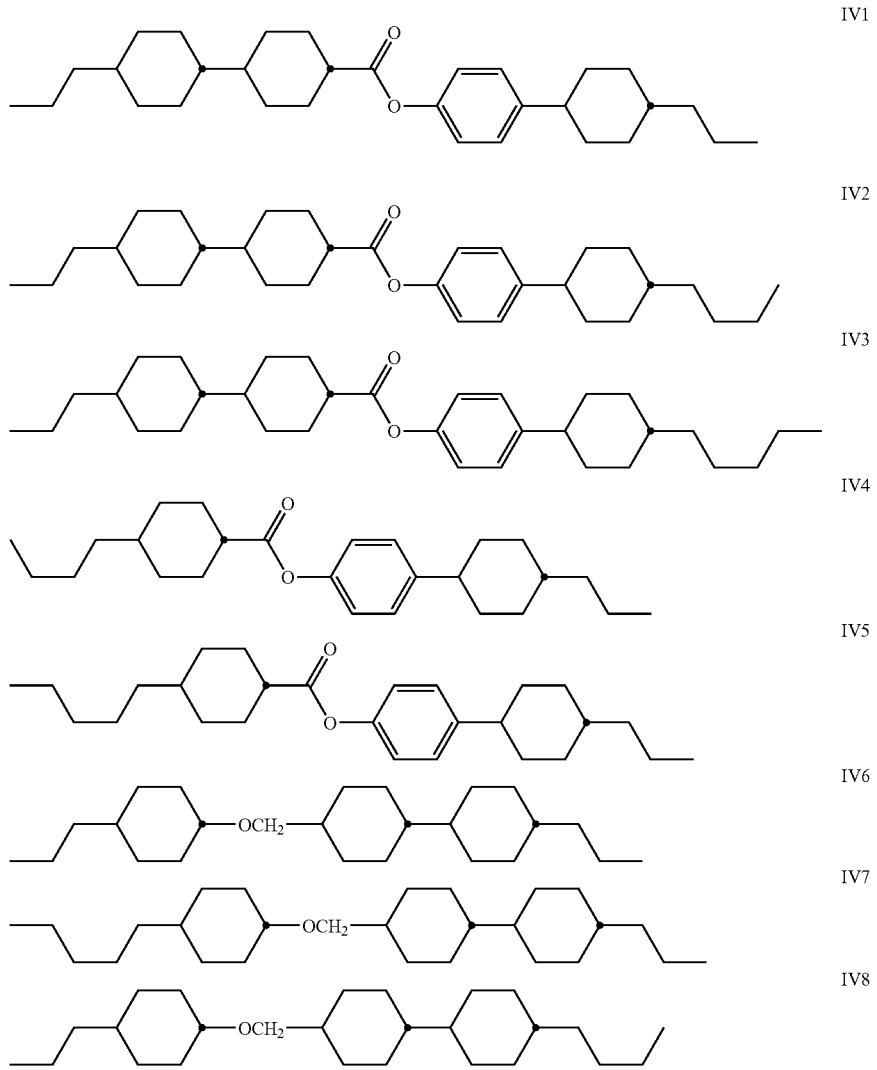

It is especially preferred to have a mixture of compounds IV1, IV2 and IV3 in the liquid crystal composition.

Preferably, in formula V $R^{51}$ is straight-chain alkyl, more preferred straight-chain alkanyl or alkenyl having 2, 3, 4, 5 or 6 carbon atoms, especially straight-chain alkanyl with 2 to 6 carbon atoms, and $R^{52}$ is straight-chain alkyl or, more preferred, alkoxy having 1, 2, 3 or 4 carbon atoms. Especially preferred examples of formula V are compounds of formula V1 to V6:

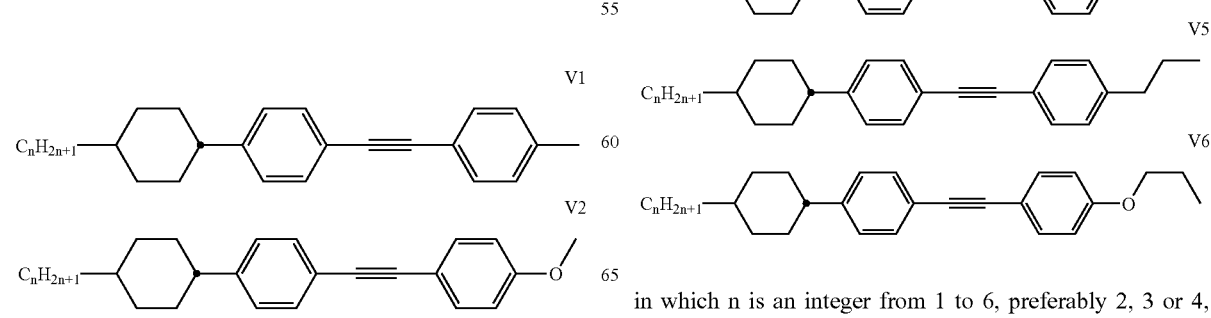

in which n is an integer from 1 to 6, preferably 2, 3 or 4, especially 3. Preferred compounds of formula V are compounds of formula V2, V4 and V6 with n=3 (giving an n-propyl substituent). It is preferred to have a mixture of all three compounds V2, V4 and V6 in the liquid crystal composition.

Preferably, in formula VI $R^{61}$ is straight-chain alkenyl, especially straight-chain alkenyl having 2, 3, 4 or 5 carbon atoms, and $R^{62}$ is straight-chain alkanyl or alkoxy both having 1, 2, 3, 4 or 5 carbon atoms (formula VIA or VIB with n=1, 2, 3, 4, 5 and m=1, 2, 3, 4, 5).

VIA
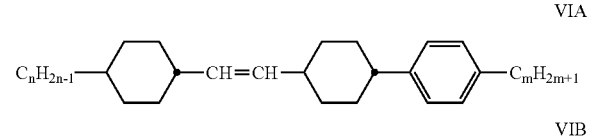

VIB
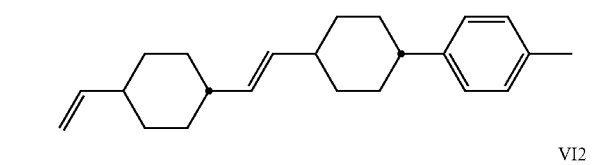

Preferred compounds of formula VI are compounds of formula VI1 to VI4:

VI1
VI2
VI3
VI4
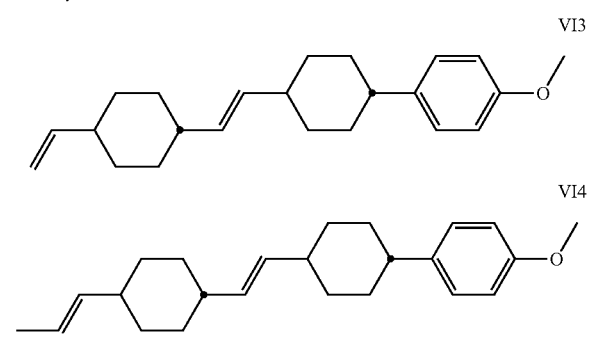

Especially preferred are compounds of formula VI1, VI3 and VI4. They may be used alone or, more preferred, as a mixture of two or three compounds.

Regarding compounds of formula VII specific compounds are of the following formulas VIIA
VIIB
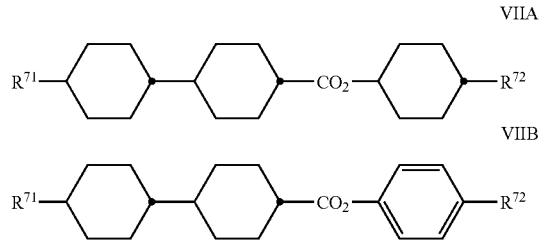

-continued

VIIC
VIID
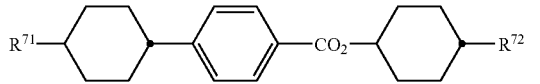
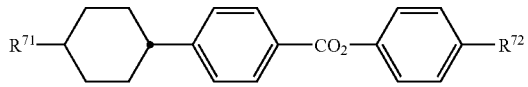

with $R^{71}$ and $R^{72}$ being as defined above. Preferably, $R^{71}$ and $R^{72}$ are straight-chain alkyl, especially alkanyl, with 1, 2, 3, 4, 5 or 6 carbon atoms. Preferred compounds of formula VII are:

VIIC1
VIID1
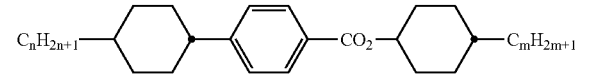
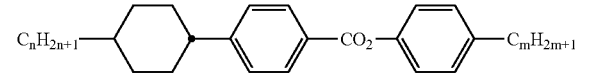

with n and m being independently of each other 1, 2, 3, 4, 5 or 6. Especially preferred examples of compounds of formula VII are VII1
VII2
VII3
VII4
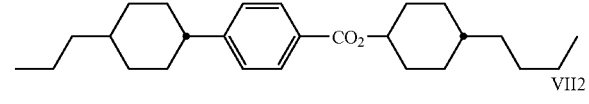
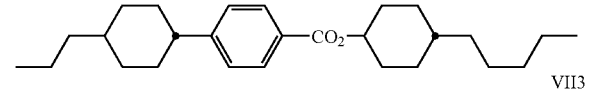
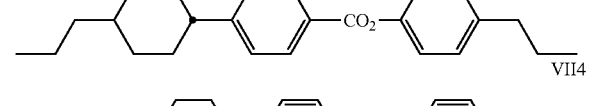
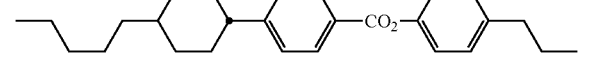

Component (β) is used in an amount of 5 weight % or more in the liquid crystal composition comprised in the zenithal bistable nematic devices according to the invention. When component (α) comprises at least one compound of formula II, it is preferred that the liquid crystal composition comprises 8 weight % or more of component (β). When there is no compound of formula I in component (α), an amount of at least 10 weight % of component (β) is even more preferred. In certain embodiments of the invention a total amount of 15 or 20 weight % or more of component (β) is highly preferred.

In an actual embodiment of the invention component (β) may contain one or more compounds of only one of the formulas III or IV or V or VI or VII. It is also possible that it contains one or more compounds of two, three or more of the formulas III to VII. It may contain an equal or a different amount of compounds of each formula used. It is preferred that component (β) contains one or more compounds of one or two of the formulas III, IV, V, VI or VII. If compounds of two of the formulas III to VII are contained, any combination is possible, i.e. III+IV or III+V or III+VI or III+VII or IV+V or IV+VI or IV+VII or V+VI or V+VII or VI+VII; both types of compounds may be used in an equal amount, or one of the types may be used in an excess with regard to the other one, for instance, in a ratio of 2:1. It is preferred that an equal amount of both types of compounds is used. In case that compounds of two of the formulas III, IV, V, VI and VII are contained in component (β), it is also preferred that one type of the compounds is of formula III. Thus, especially preferred combinations are III+IV, III+V, III+VI and III+VII. When component (α) comprises at least one compound of formula II, it is preferred that component (β) comprises compounds of two of the formulas III, IV, V, VI and VII.

It will be acknowledged that other compounds than those of formulas I and II may be present in component (α) as long as they have a sufficiently high dielectrical anisotropy Δε and are not detrimental to the set of parameters as outlined above.

Thus, it is preferred that component (α) of the liquid crystal composition used in the zenithal bistable nematic device of the invention also comprises one or especially more compounds of formula VIII

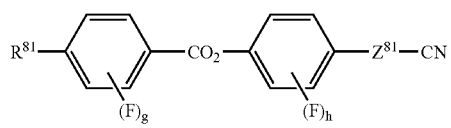

VIII in which
  g and h are independently of each other 0, 1, 2, 3 or 4;
  $R^{81}$ is $C_1$-$C_{15}$ alkyl which is unsubstituted or mono- or poly-substituted with CN or halogen and in which one or more of the $CH_2$ groups may be replaced independently of each other by —O—, —S—, —C≡C—, —CO—O—, —OC—O— such that there are no hetero atoms adjacent to each other (which means that $R^{81}$ does not comprise any alkenyl radical);
  $Z^{81}$ is a single bond or —C≡C—.

With regard to compounds of formula VIII g and h may be independently of each other 0, 1, 2, 3 or 4, preferably 0, 1 or 2; that means that preferably each of the phenyl rings of formula VIII may be unsubstituted or mono- or di-substituted with fluorine. If present the F substituent(s) may be in any position of the phenyl ring substituted. It is preferred that

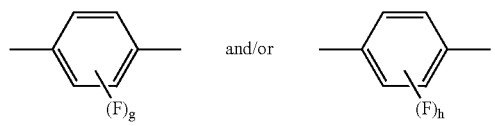

and/or are independently of one another

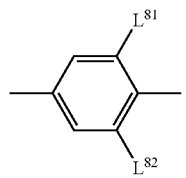

with $L^{81}$ and $L^{82}$ being independently of one another H or F. Furthermore, $Z^{81}$ can be either a single bond (so that the CN group is directly linked to the phenyl ring) or a C—C triple bond thereby forming a —C≡C—CN substituent of the phenyl ring. It is preferred that $Z^{81}$ is a single bond. Preferred compounds of formula VIII are the following compounds:

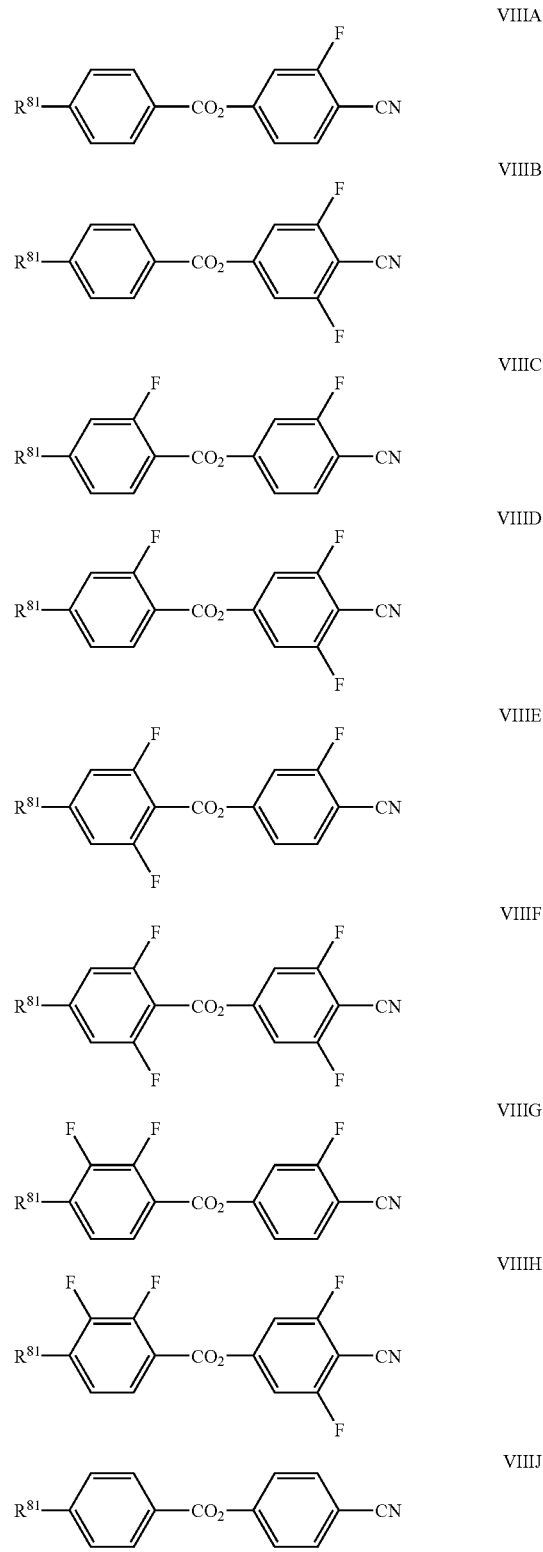

-continued

VIIIK
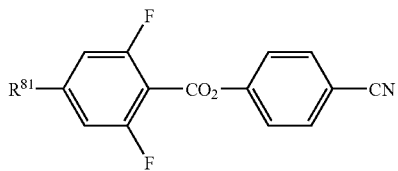

VIIIL
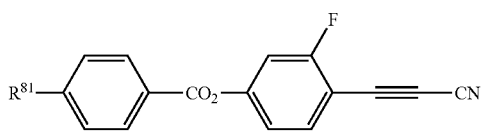

VIIIM
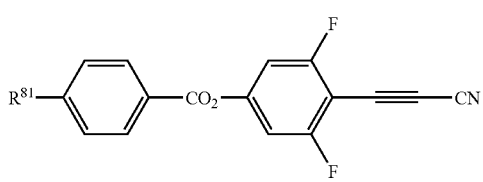

with $R^{81}$ being defined as above. Preferably, $R^{81}$ in formulas VIII and VIIIA to VIIIM is straight-chain alkyl, especially straight-chain alkanyl having 1, 2, 3, 4, 5, 6, 7 or 8 carbon atoms. Highly preferred compounds are of general formulas VIIIA1 and VIIIB1 with n=1, 2, 3, 4, 5 or 6, whereby compounds of formula VIIIA1 are most preferred.

VIIIA1
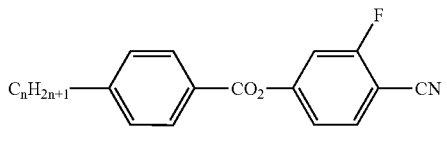

VIIIB1
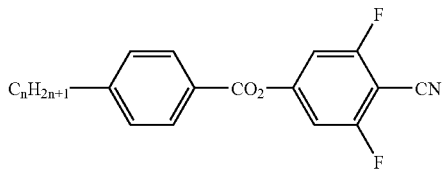

Especially preferred compounds of formula VII are compounds of formula VIII1 to VIII6:

VIII1
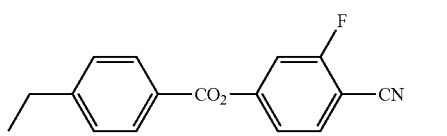

VIII2
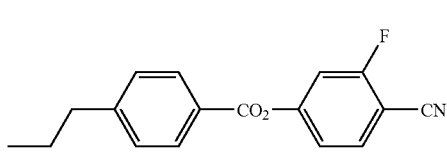

-continued

VIII3
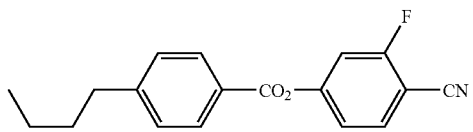

VIII4
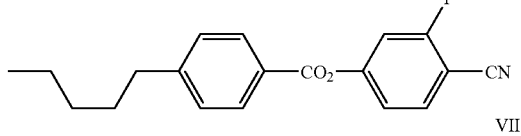

VIII5
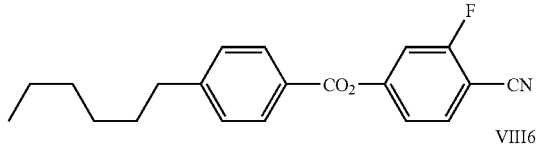

VIII6
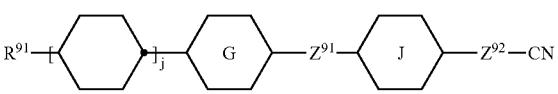

Among these compounds of formulas VIII1 (having a dielectric anisotropy Δε of 53.7), VIII2, VIII3 (Δε=44.9) and V1114 (Δε=43.0) are most preferred. If present the total amount of compounds of formula VIII in the liquid crystal composition for use in the zenithal bistable nematic devices of the invention may be about 10 weight % or more (although even smaller amounts are possible as well), preferably 20 weight % or more, more preferred in the range of about 25 to 60 weight %, still more preferred in the range of about 35 to about 55 weight %. When used as a mixture different compounds of formula VIII may be contained in component (α) in an almost equal amount. For instance, if compounds of formulas VIII1 to VIII4 are used, they may be contained in an 1:1:1:1 ratio.

In another preferred embodiment of the invention component (α) of the liquid crystal composition for use in the zenithal bistable nematic devices comprises at least one compound of formula IX:

IX $$R^{91}-\underbrace{\phantom{XX}}_{j} - G - Z^{91} - J - Z^{92} - CN$$

in which j is 0 or 1;

$R^{91}$ is $C_1$-$C_{15}$ alkyl which is unsubstituted or mono- or poly-substituted with CN or halogen and in which one or more of the $CH_2$ groups may be replaced by —O—, —S—, —CH=CH—, —C≡C—, —CO—O—, —OC—O— such that there are no hetero atoms adjacent to each other;

$Z^{91}$ and $Z^{92}$ are independently of each other a single bond or —C≡C—;

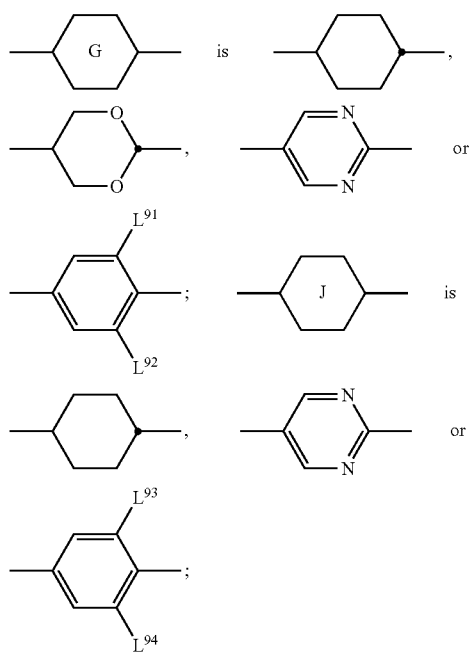

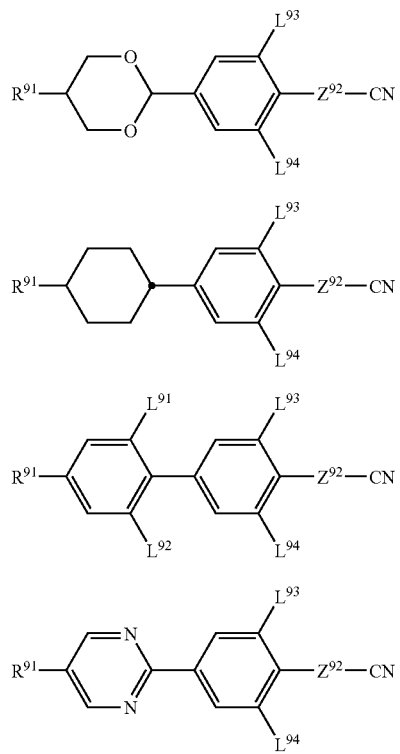

in which
L$^{91}$, L$^{92}$, L$^{93}$ and L$^{94}$ are independently of each other H or F.

Preferred classes of compounds comprised by formula IX are compounds of formula IXA to IXE in which Z$^{91}$ is a single bond:

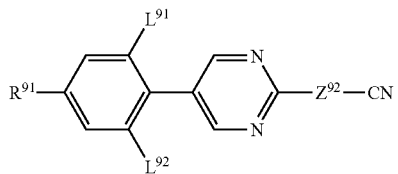

in which R$^{91}$ is defined as above and preferably means a straight-chain alkyl with 1 to 8 carbon atoms, especially a straight-chain alkanyl or alkenyl having 2, 3, 4, 5 or 6 carbon atoms; Z$^{92}$ is a C≡C triple bond or preferably a single bond; and L$^{91}$, L$^{92}$, L$^{93}$ and L$^{94}$ are H or F with L$^{91}$ and L$^{92}$ being preferably H. Preferred compounds of formulas IXA to IXE are

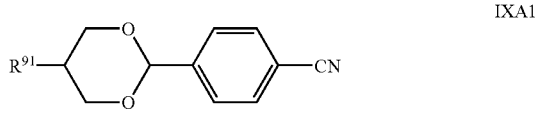

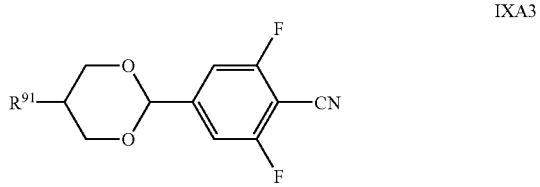

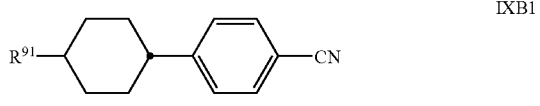

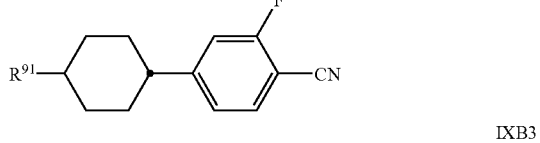

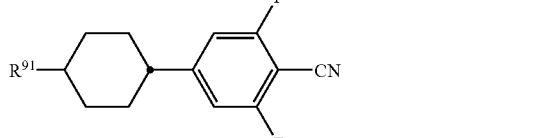

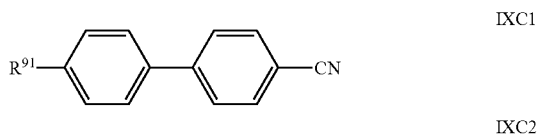

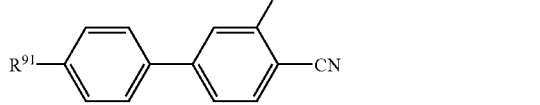

-continued

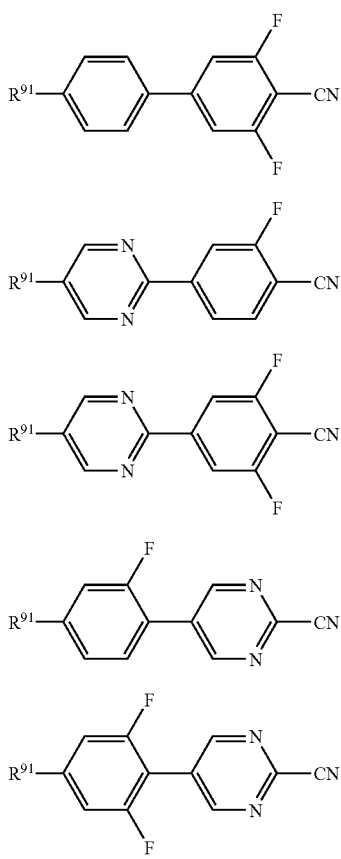

in which R⁹¹ is as defined above.

Some specific examples of compounds of formula IX are

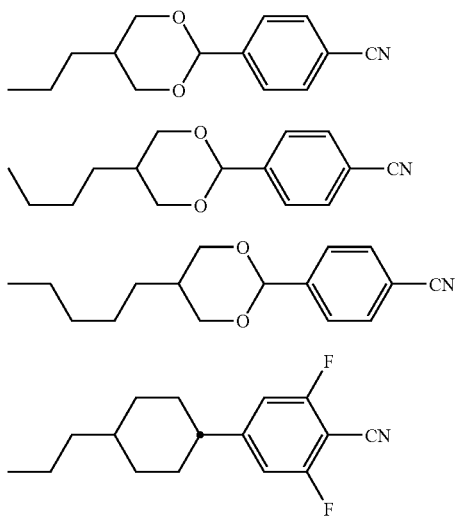

If these compounds are present in component (α) their total amount may range from about 5 to about 45 weight %. It is preferred that only one type of compounds of formulas IXA to IXE are present in the liquid crystal composition for use in the invention for the same time.

In another preferred embodiment of the invention the liquid crystal composition for use in the bistable liquid crystal device and especially in the zenithal bistable nematic device according to the invention further comprises 3 weight % or more of a component (γ) containing one or more compounds having an optical anisotropy Δn of at least 0.20. It has been found that the use of this component (γ) may decrease the operating voltage $V_{opt}$ of the liquid crystal composition. In general, component (γ) can comprise any (mesogenic) compound exhibiting a Δn of at least 0.20 that is not detrimental to the set of parameters important for use in zenithal bistable nematic liquid crystal devices. It is preferred that component (γ) comprises tolanes having a Δn of at least 0.20, especially at least one tolane compound of formula X:

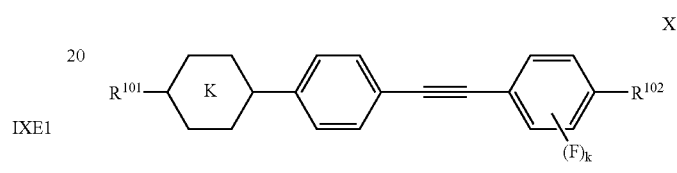

in which k is 0, 1, 2, 3 or 4;

$R^{101}$ and $R^{102}$ are independently of each other $C_1$-$C_{15}$ alkyl which is unsubstituted or mono- or poly-substituted with CN or halogen and in which one or more of the CH₂ groups may be replaced by —O—, —S—, —CH=CH—, —C≡C—, —CO—O—, —OC—O— such that there are no hetero atoms adjacent to each other; and

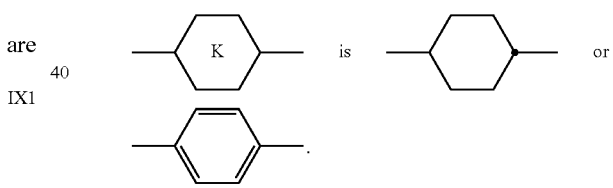

Preferred are compounds of formula XA

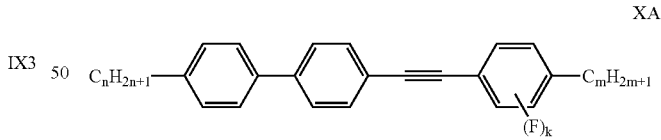

in which n and m are independently of each other 1, 2, 3, 4, 5 or 6 and k is 0, 1 or preferably 2. Preferred examples are of formula IXA1 with n being 2, 3 or 4 and m being 1, 2, 3, 4 or 5:

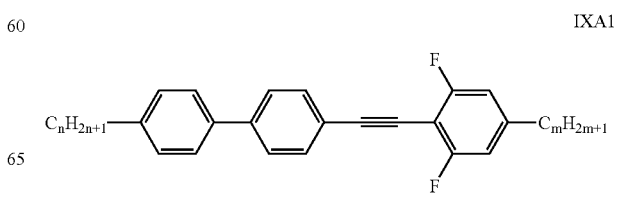

Among these compounds IXA1a and IXA1b are most preferred:

IXA1a

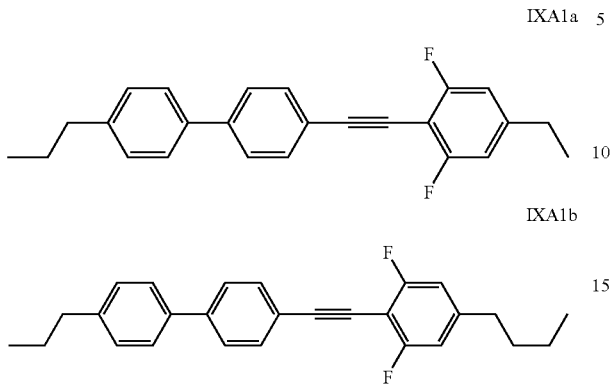

IXA1b

If present component (γ) is contained in an amount of at least 3 weight %, preferably at least 5 weight %.

The liquid crystal composition for use in the bistable liquid crystal devices and especially in the zenithal bistable nematic liquid crystal devices of the invention may comprise further substances for adjusting several properties of said composition if desired. For example, some of these substances may be used for adjusting the viscosity of the liquid crystal composition. In certain embodiments the liquid crystal composition for use in the zenithal bistable nematic devices according to the invention comprises at least one compound of formula XI and/or at least one compound of formula XII and/or at least one compound of formula XIII and/or at least one compound of formula XIV

XI

XII

XIII

XIV

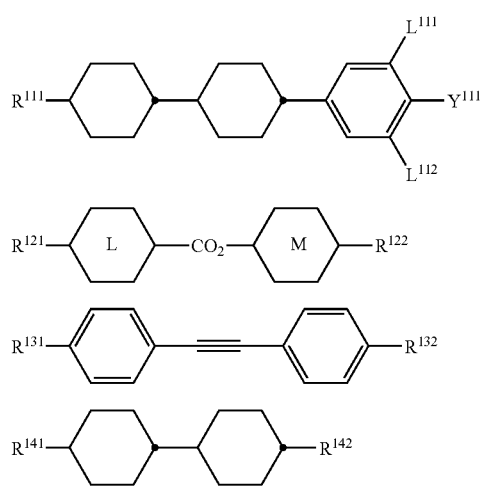

in which $R^{111}$ and $R^{142}$ are independently of each other $C_2$-$C_{15}$ alkenyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$R^{121}$, $R^{131}$, $R^{132}$ and $R^{141}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$R^{122}$ is $C_1$-$C_{15}$ alkyl which is unsubstituted or mono- or poly-substituted with halogen and in which one or more of the $CH_2$ groups may be replaced independently of each other by —O—, —S—, —CH=CH—, —C≡C—, —CO—O—, —OC—O— such that there are no hetero atoms adjacent to each other;

$Y^{111}$ is F, Cl, $C_1$-$C_{15}$ alkanyl or $C_2$-$C_{15}$ alkenyl that are independently of each other mono- or poly-substituted with halogen, or $C_1$-$C_{15}$ alkoxy which is mono- or poly-substituted with halogen;

$L^{111}$ and $L^{112}$ are independently of each other H or F; and

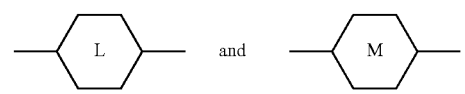

and are independently of each other

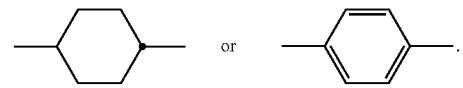

or

The exact nature and amount of these compounds within the liquid crystal composition depend on the specific mixture and the desired effect and can be easily chosen by the skilled person.

Preferred compounds of formula XI are compounds of formula XIA or XIB

XIA

XIB

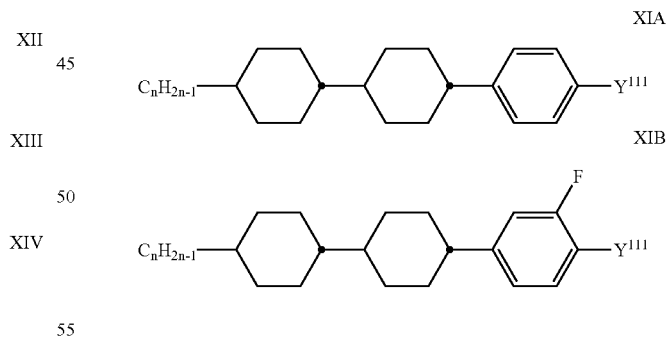

with n being 2, 3, 4, 5 or 6 and $Y^{111}$ being selected from F, Cl, $CF_3$ and $OCF_3$. Especially preferred compounds of formula XI are the following compounds:

XI1

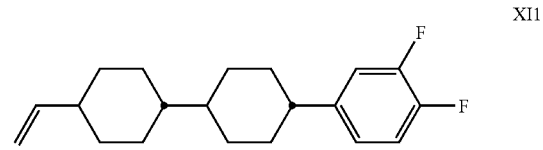

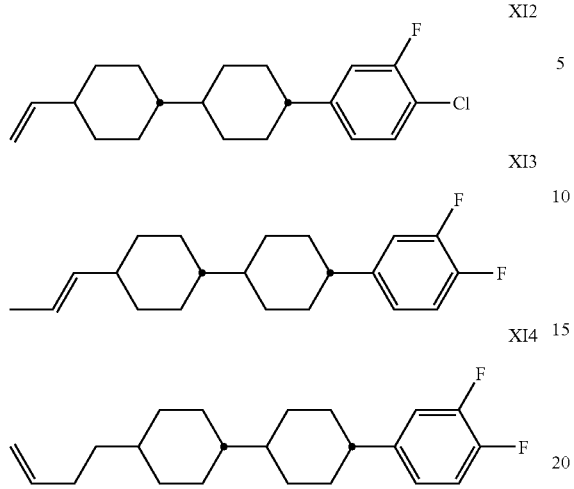
The most preferred compound of formula XI is compound XI1.
Preferred compounds of formula XII are compounds of formula XIIA, XIIB, XIIC, XIID, XIIE and XIIF:
with n being 1, 2, 3, 4, 5 or 6 and m being 1, 2, 3, 4, 5 or 6. Specific examples of compounds of formula XII are the following compounds:
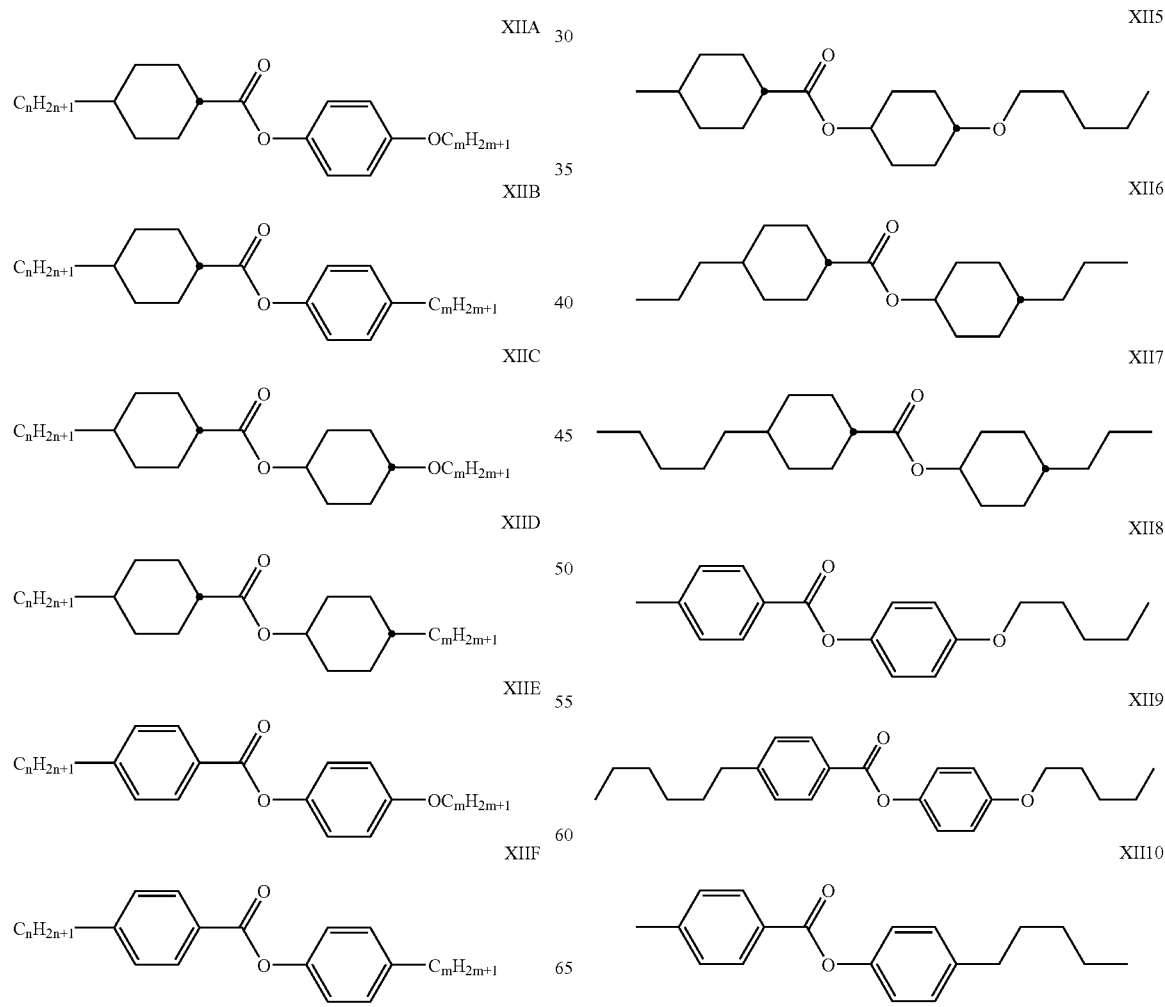

-continued

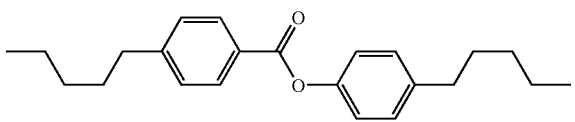
XII11

Preferred compounds of formula XIII are compounds of formula XIIIA or XIIIB:

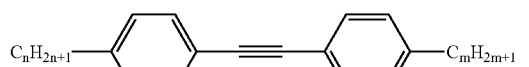
XIIIA

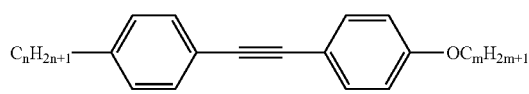
XIIIB with n being 1, 2, 3, 4, 5, 6, 7 or 8 and m being 1, 2, 3, 4, 5 or 6. Especially preferred examples of compounds of formula XIII are the following compounds:

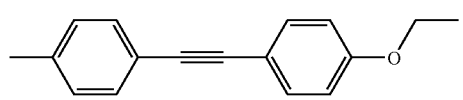
XIII1

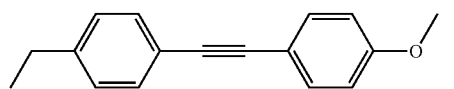
XIII2

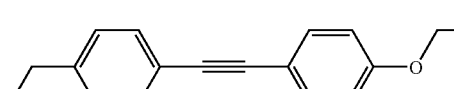
XIII3

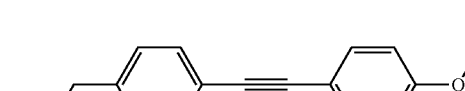
XIII4

XIII5

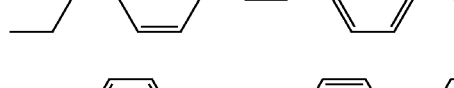
XIII6

Preferred compounds of formula XIV are compounds of formula XIVA

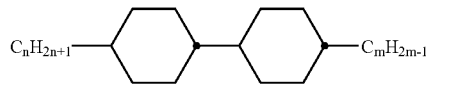
XIVA with n being 1, 2, 3, 4, 5, 6, 7 or 8 and m being 2, 3, 4, 5 or 6. Specific examples of compounds of formula XIV are the following compounds:

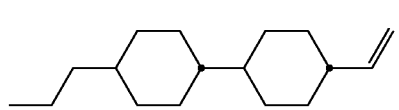
XIV1

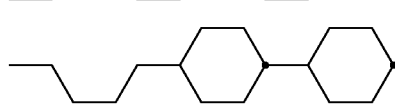
XIV2

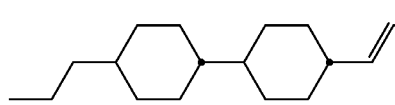
XIV3

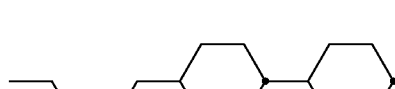
XIV4

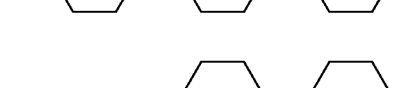
XIV5

The most preferred compound of formula XIV is compound XIV2.

The liquid crystal composition for the use according to the invention in the zenithal bistable nematic liquid crystal devices may also comprises mesogenic substances having a medium dielectric anisotropy of Δε of about 8 to 10 or more, for instance one or more compounds of formula XV and/or one or more compounds of formula XVI, preferably in an amount of up to 30 weight %, more preferred of up to 20 weight %:

XV

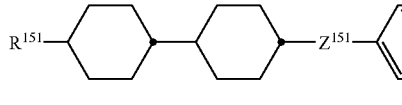
XVI in which $R^{151}$ and $R^{161}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$Y^{151}$ and $Y^{161}$ are independently of each other F, Cl, $C_1$-$C_{15}$ alkanyl which is mono- or poly-substituted with halogen, or $C_1$-$C_{15}$ alkoxy, which is mono- or poly-substituted with halogen;

$L^{151}$ and $L^{161}$ are independently of each other H or F; and $Z^{151}$ is —CO—O—, $CH_2O$ or $CF_2O$.

Preferably these compounds are of formulas XVA, XVB and XVIA, respectively:

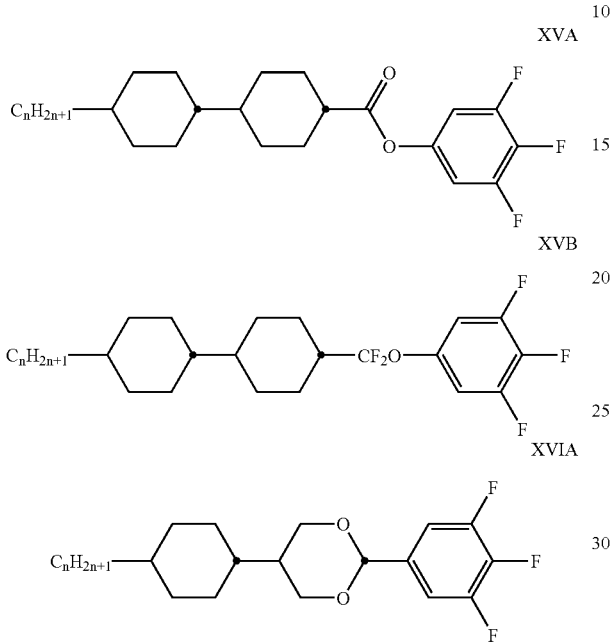

XVA

XVB

XVIA with n being in all three formulas 1, 2, 3, 4, 5, 6 or 7. These substances may influence both the operating voltage and the operating window of the liquid crystal composition for use in the zenithal bistable nematic devices of the invention as desired.

The liquid crystal composition for the use according to the invention in the zenithal bistable nematic liquid crystal devices may also comprises one or more of the mesogenic substances according to the following formulas XVII to XXII. The exact nature and amount of these compounds within the liquid crystal composition depend on the specific mixture and the desired effect and can be easily chosen by the skilled person.

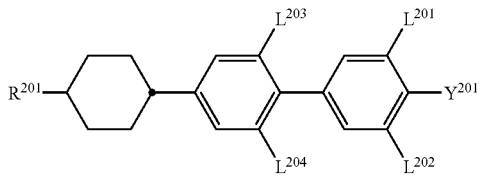

XVII

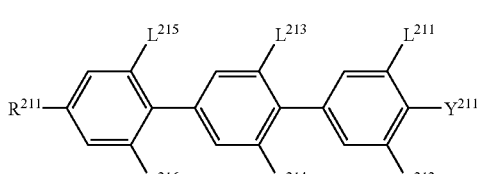

XVIII

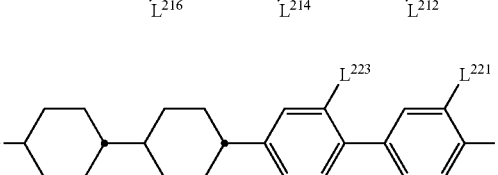

XIX

-continued

XX

XXI

XXII wherein $R^{171}$, $R^{172}$, $R^{181}$, $R^{182}$, $R^{201}$, $R^{211}$ and $R^{221}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$R^{191}$ is $C_1$-$C_{15}$ alkyl which is unsubstituted or mono- or poly-substituted with CN or halogen and in which one or more of the $CH_2$ groups may be replaced independently of each other by —O—, —S—, —C≡C—, —CO—O—, —OC—O— such that there are no hetero atoms adjacent to each other (i.e. $R^{191}$ does not represent an alkenyl radical);

$L^{191}$, $L^{192}$, $L^{201}$, $L^{202}$$L^{203}$, $L^{204}$, $L^{211}$, $L^{212}$, $L^{213}$, $L^{214}$, $L^{215}$, $L^{216}$, $L^{221}$, $L^{222}$, $L^{223}$ and $L^{224}$ are independently of each other H or F; and $Y^{191}$, $Y^{201}$, $Y^{211}$ and $Y^{221}$ are independently of each other F, Cl, $C_1$-$C_{15}$ alkanyl or $C_2$-$C_{15}$ alkenyl that are independently of each other mono- or poly-substituted with halogen, or $C_1$-$C_{15}$ alkoxy which is mono- or poly-substituted with halogen.

Preferred compounds of formula XVII are of the formulas XVIIA to XVIIC

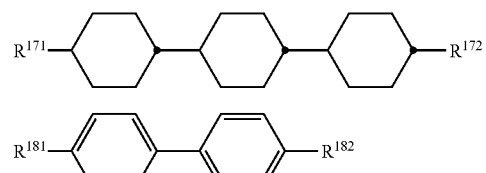

XVIIA

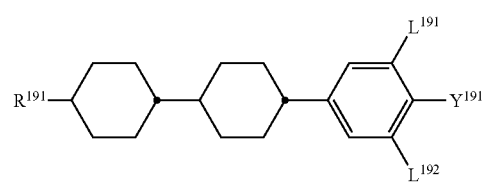

XVIIB

XVIIC

with n and m being independently of each other 1, 2, 3, 4, 5, 6 or 7 and p and q being independently of each other 2, 3, 4, 5, 6 or 7. More preferred are compounds of formula XVIIA with n being 2, 3, 4, 5, especially 3, and m being 2, 3, 4, 5, 6, especially 4, as well as of formula XVIIC with q and p being independently of each other 2, 3, 4 or 5; especially preferred both p and q are 2.

Preferred compounds of formula XVIII are of the formula XVIIIA

XVIIIA

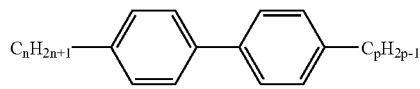

with n being 1, 2, 3, 4, 5, 6 or 7 and p being 2, 3, 4, 5, 6 or 7. More preferred are compounds of formula XVIIIA with n being 1, 2, 3, 4 or 5 and p being 2, 3, 4 and 5; especially preferred $C_nH_{2n+1}$ is methyl, ethyl or n-propyl and $C_pH_{2p-1}$ is a —CH$_2$—CH$_2$—CH=CH$_2$ or —CH$_2$—CH$_2$—CH=CH—CH$_3$ radical the latter preferably with E-configuration of the C=C double bond.

Preferred compounds of formula XIX are of the formulas XIXA and XIXB:

XIXA

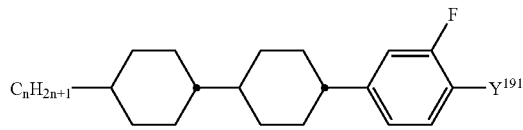

XIXB

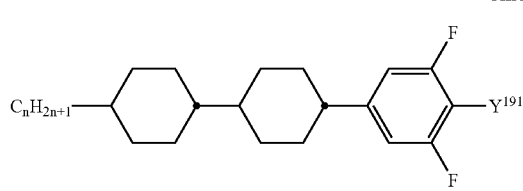

with n being 1, 2, 3, 4, 5, 6 or 7 and $Y^{191}$ being F, Cl, CF$_3$ or OCF$_3$. More preferred are compounds of formula XIXB with n being 2, 3, 4, 5, 6 or 7 and $Y^{191}$ being F.

Preferred compounds of formula XX are of the formulas XXA to XXG:

XXA

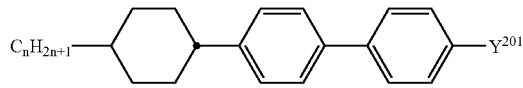

XXB

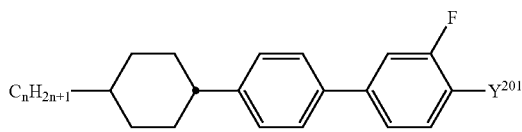

XXC

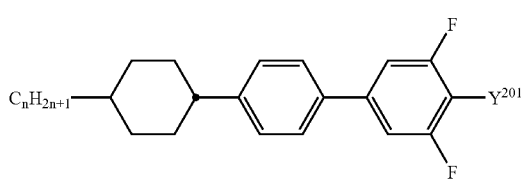

XXD

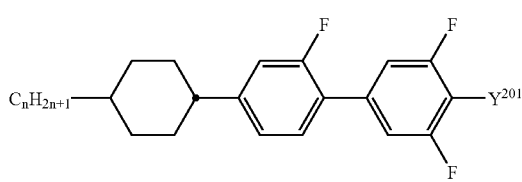

XXE

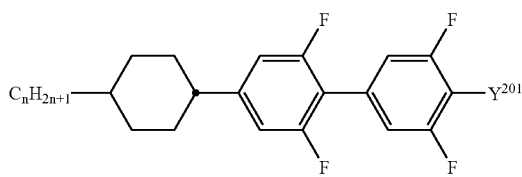

XXF

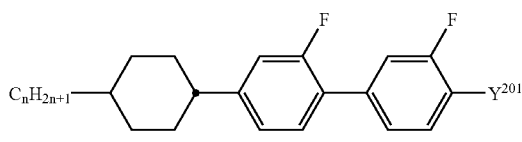

XXG

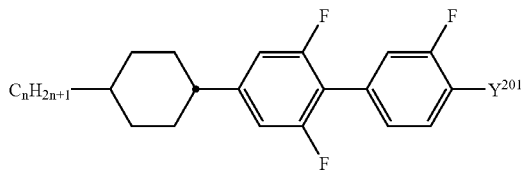

with n being 1, 2, 3, 4, 5, 6 or 7 and $Y^{201}$ being F, Cl, CF$_3$ or OCF$_3$. More preferred are compounds of formulas XXB, XXC and XXD with n being 2, 3, 4, 5, 6 or 7 and $Y^{201}$ being F.

Preferred compounds of formula XXI are of the formulas XXIA to XXIJ:

XXIA

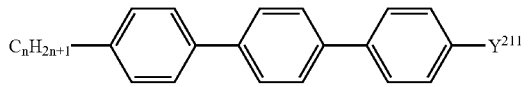

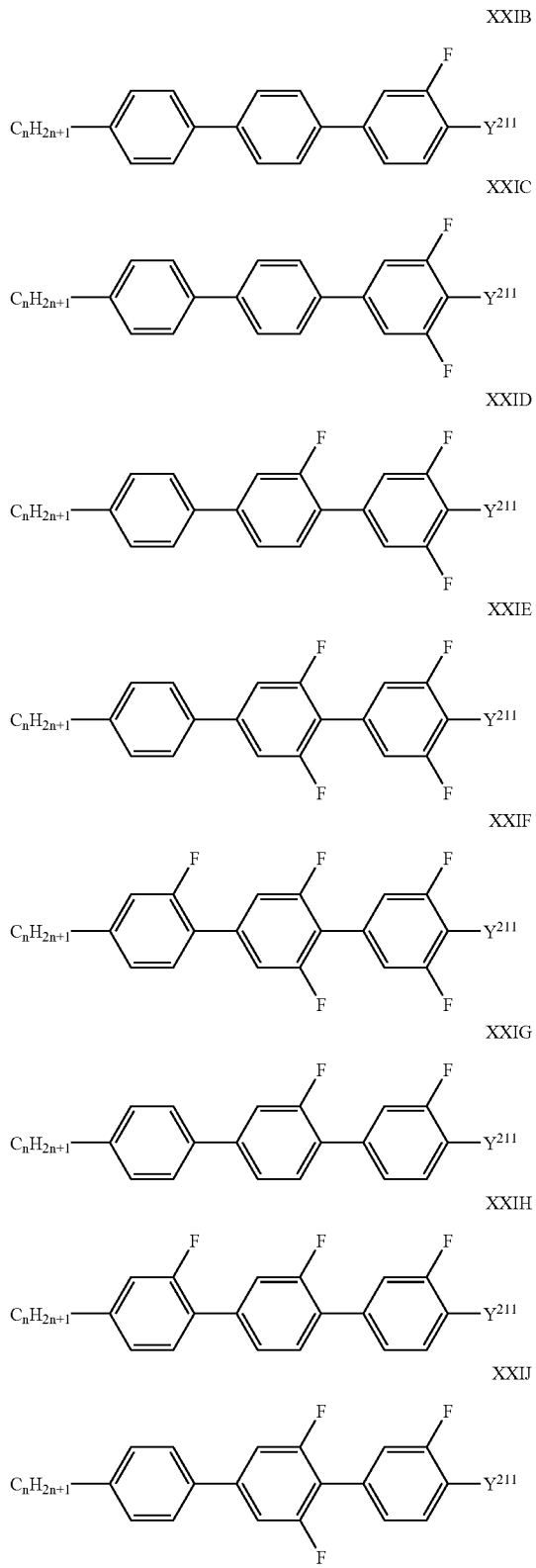

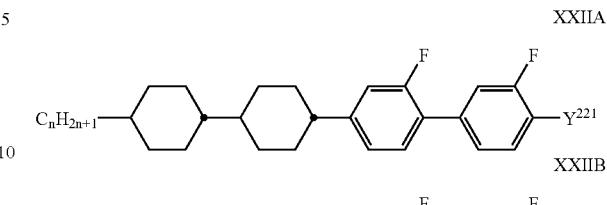

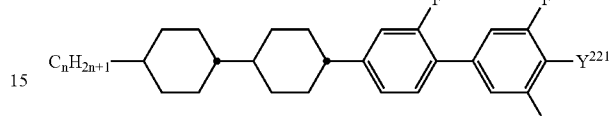

with n being 1, 2, 3, 4, 5, 6 or 7 and $Y^{211}$ being F, Cl, $CF_3$ or $OCF_3$. More preferred are compounds of formula XXID with n being 2, 3, 4, 5, 6 or 7 and $Y^{211}$ being F.

Preferred compounds of formula XXII are of the formulas XXIIA or XXIIB:

with n being 1, 2, 3, 4, 5, 6 or 7 and $Y^{211}$ being F, Cl, $CF_3$ or $OCF_3$. More preferred are compounds of formula XXIIB with n being 2, 3, 4, 5, 6 or 7 and $Y^{221}$ being F.

It is further preferred that the liquid crystal composition for the use of the invention is a nematic liquid crystal composition.

It will be acknowledged by those skilled in the art that the liquid crystal composition for the use according to the invention may also comprise further (mesogenic) compounds besides those disclosed in more detail in this specification. A wide variety of mesogenic compounds may be used as long as they are not detrimental to the set of parameters important for the use of the bistable liquid crystal composition according to the invention.

A further subject matter of the present invention is a liquid crystal medium comprising
  at least one compound of formula I as defined above; and
  at least one compound of formula III and/or at least one compound of formula IV and/or at least one compound of formula V and/or at least one compound of formula VI and/or at least one compound of formula VII all being as defined above.

Said medium optionally comprises at least one compound of formula VIII as defined above.

Still a further subject matter of the present invention is a liquid crystal medium comprising
  at least one compound of formula II as defined above; and
  at least one compound of formula III and/or at least one compound of formula IV and/or at least one compound of formula V and/or at least one compound of formula VI and/or at least one compound of formula VII all being as defined above.

Said medium optionally comprises at least one compound of formula VIII as defined above.

The liquid crystal composition for use in the zenithal bistable nematic devices of the invention may also contain an optically active component (ζ) as a dopant in an amount of 0 to 3 weight %. The chiral dopant may be useful to remove reverse twist domains in the TN mode. There exists a wide variety of compounds suitable as members of component (Λ) all of which are readily available. Exemplary substances are cholesterylnonanoate (CN), S-811, S-1011 and S-2011 and CB15 (Merck KGaA, Darmstadt, Germany). Although S-811 might be a preferred dopant, the specific choice of the dopants is not a critical issue.

The liquid crystal composition for use in the zenithal bistable nematic devices of the invention may also contain one or more light stabilizers and/or additives like pleochromatic dyes known in the state of the art.

All the compounds used in the liquid crystal composition of the bistable liquid crystal devices are either commercially available or can be readily prepared by methods known to those skilled in the art and as described in the standard text books of organic synthesis, for instance, in Houben-Weyl, *Methoden der Organischen Chemie*, Georg-Thieme-Verlag, Stuttgart. The liquid crystal composition will be prepared by applying standard protocols and techniques. In general, the desired amount of the minor component(s) will be dissolved in the major component, usually under elevated temperature. Alternatively, solutions of components in organic solvents like acetone, chloroform or methanol, can be mixed and afterwards the solvent(s) can be removed, e.g., by distillation. Likewise, manufacturing of the bistable devices according to the invention will follow standard techniques known to the artisan.

BRIEF DESCRIPTION OF THE SEVERAL VIEWS OF THE DRAWINGS

FIG. 1 is an illustration of zenithal bistability using grating alignment (with the lines indicating the local director) showing a) the high tilt (continuous) and b) the low tilt (defect) states.

FIG. 2 shows the a) VAN and b) TN geometries for ZBD showing the director distribution of the high and low tilt states.

FIG. 3 shows the τ-V curve for MLC-6204-000 at 25° C. (pulse duration or time slot vs. voltage). The switching voltage ($V_{100\mu s}$) and operating window ($\Delta V_{400\mu s}$) used for comparisons are indicated.

In the present description and the following examples the structures of the mesogenic compounds disclosed are described by using acronyms. Said acronyms can be transformed into chemical formulas according to Tables A and B. In these tables, radicals $C_nH_{2n+1}$ and $C_mH_{2m+1}$ are straight-chain alkyl radicals having n and m carbon atoms, respectively. Alkenyl radicals have the trans configuration. The codes according to Table B are self-evident. In Table A, only the acronym for the parent structure is given. In individual cases, the acronym for the parent structure is followed, usually separated by a hyphen, by a code for the substituents $R^1$, $R^2$, $L^1$ and $L^2$ as given below:

| Code of $R^1$, $R^2$, $L^1$, $L^2$ | $R^1$ | $R^2$ | $L^1$ | $L^2$ |
|---|---|---|---|---|
| n | $C_nH_{2n+1}$ | CN | H | H |
| nm | $C_nH_{2n+1}$ | $C_mH_{2m+1}$ | H | H |
| nOm | $C_nH_{2n+1}$ | $OC_mH_{2m+1}$ | H | H |
| nF | $C_nH_{2n+1}$ | F | H | H |
| nN.F | $C_nH_{2n+1}$ | CN | F | H |
| nN.F.F | $C_nH_{2n+1}$ | CN | F | F |

TABLE A

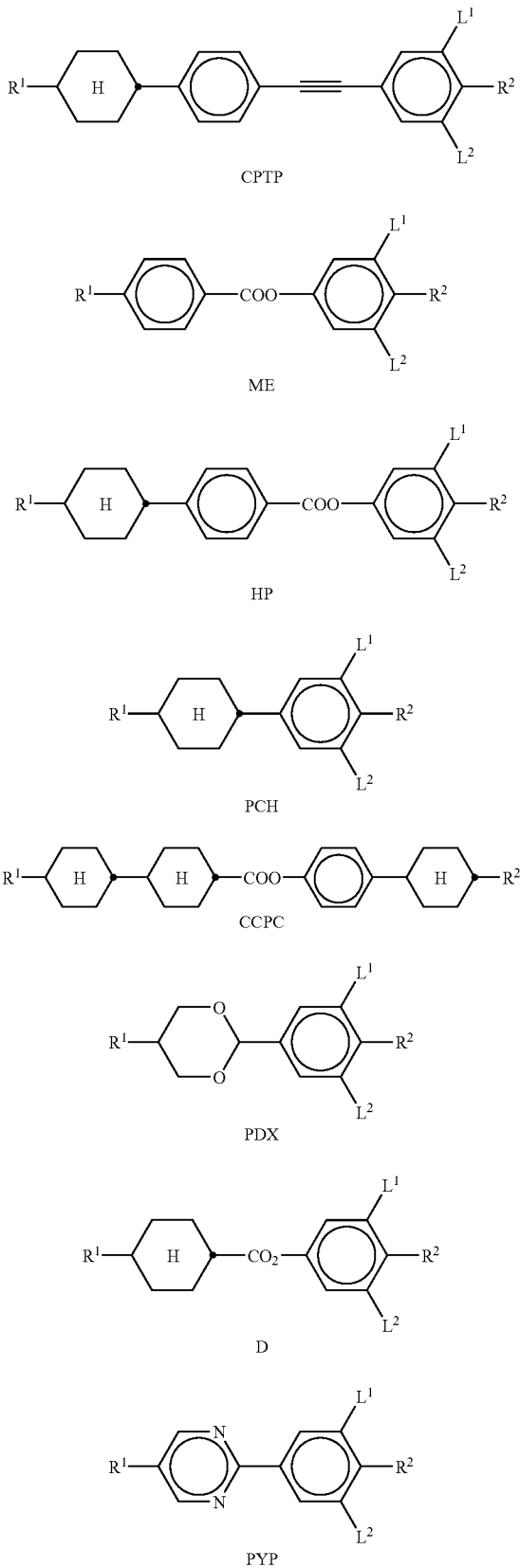

TABLE A-continued
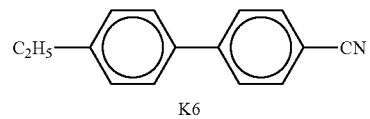
K6
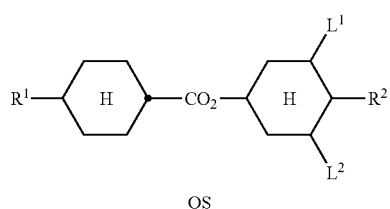
OS
TABLE A-continued
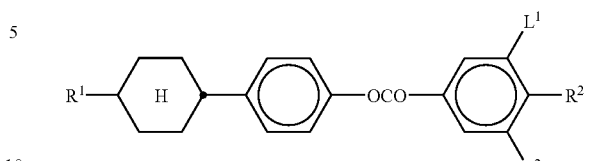
HD
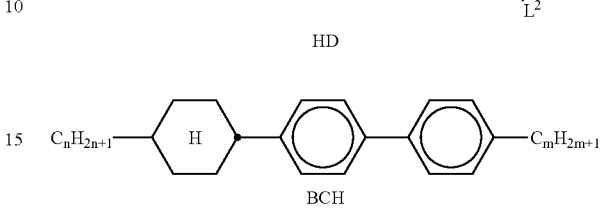
BCH
TABLE B
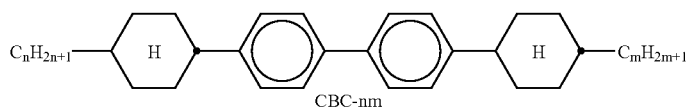
CBC-nm
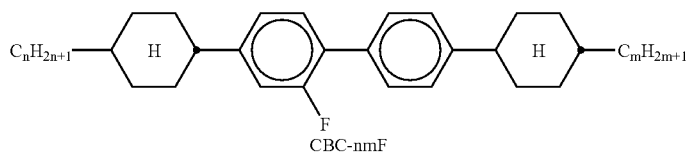
CBC-nmF
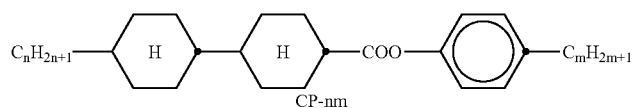
CP-nm
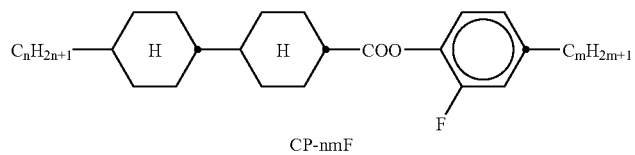
CP-nmF
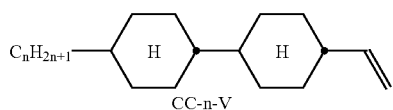
CC-n-V
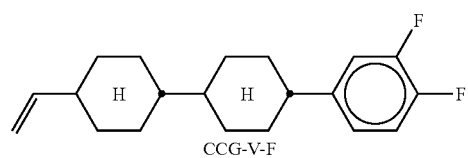
CCG-V-F
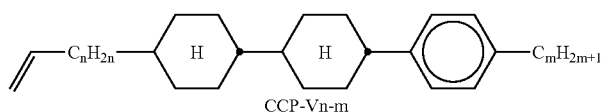
CCP-Vn-m
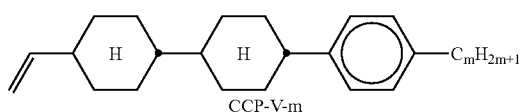
CCP-V-m TABLE B-continued
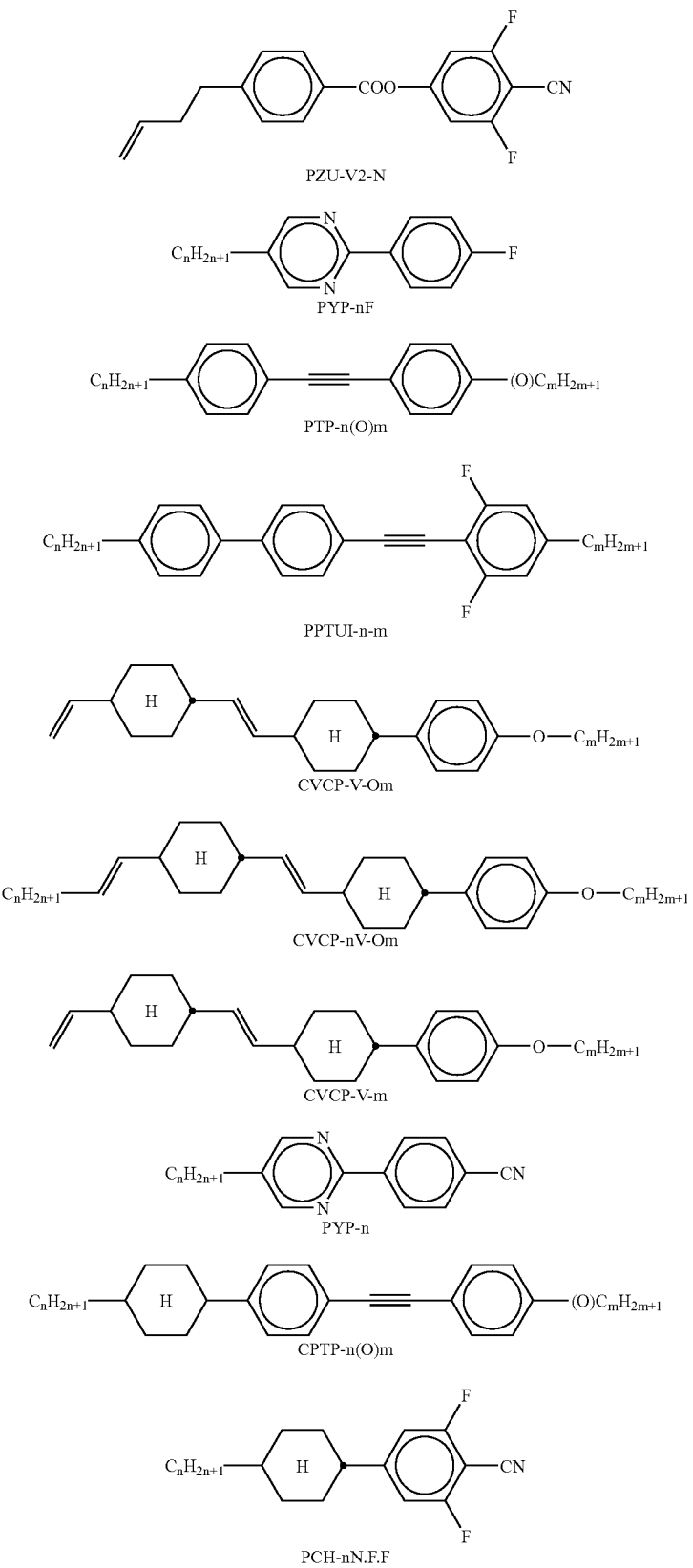

TABLE B-continued
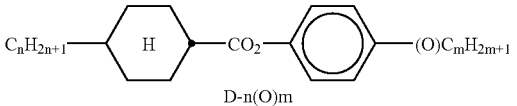
D-n(O)m
BCH-nm
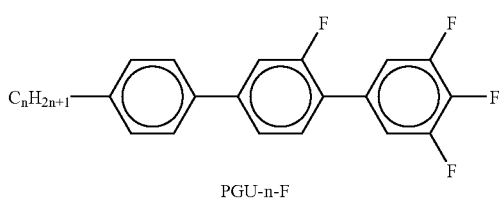
PGU-n-F
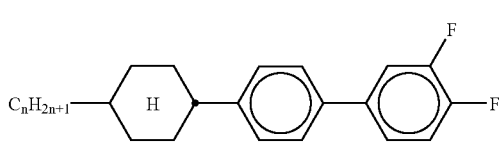
BCH-nF.F
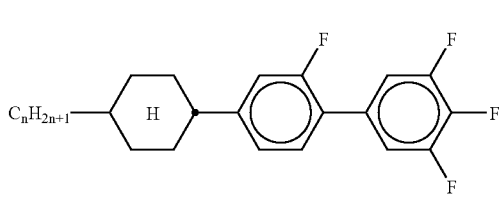
CGU-n-F
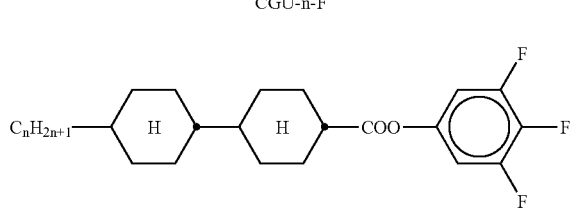
CCZU-n-F
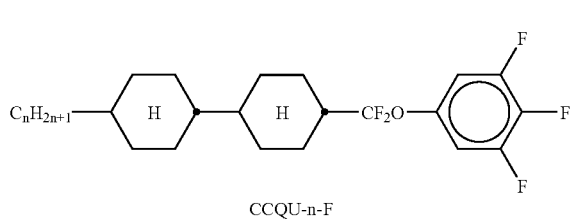
CCQU-n-F
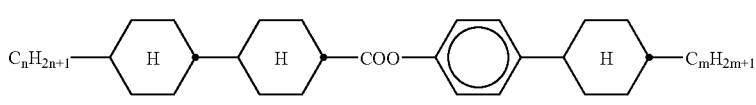
CCPC-nm
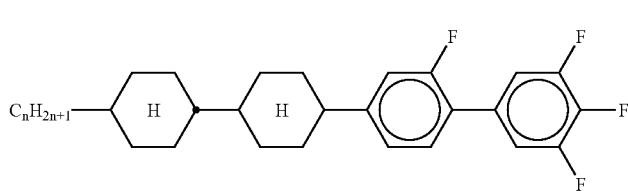
CCGU-n-F TABLE B-continued
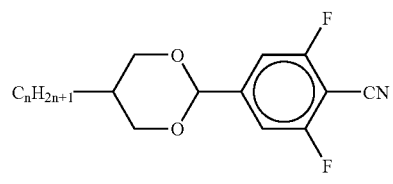
DU-n-N
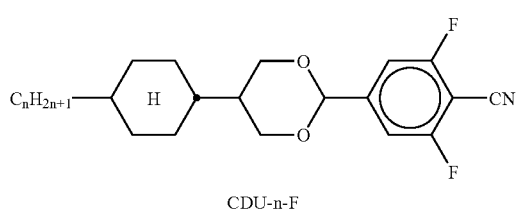
CDU-n-F
TABLE C
Table C shows dopants optionally present in the liquid crystal compositions for use in the zenithal bistable nematic devices of the invention (component (ζ)).
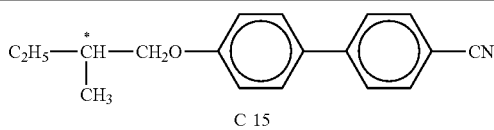
C 15
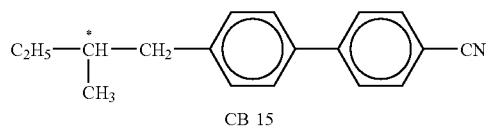
CB 15
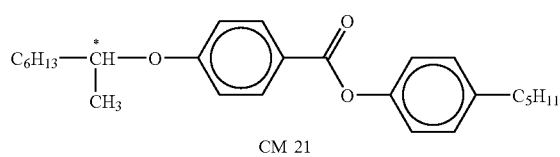
CM 21
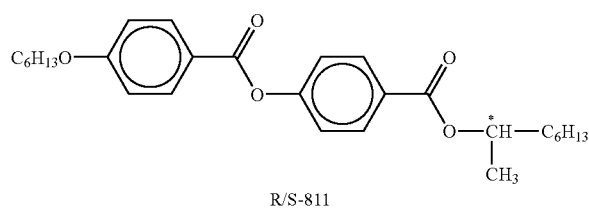
R/S-811
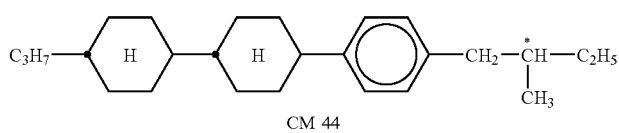
CM 44
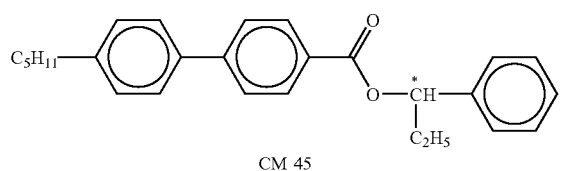
CM 45

TABLE C-continued
Table C shows dopants optionally present in the liquid crystal compositions for use in the zenithal bistable nematic devices of the invention (component (ζ)).
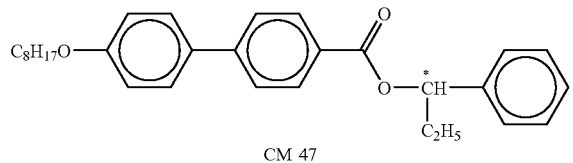
CM 47
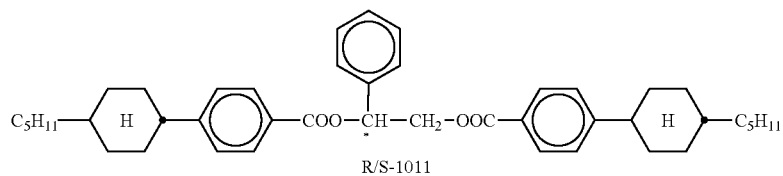
R/S-1011
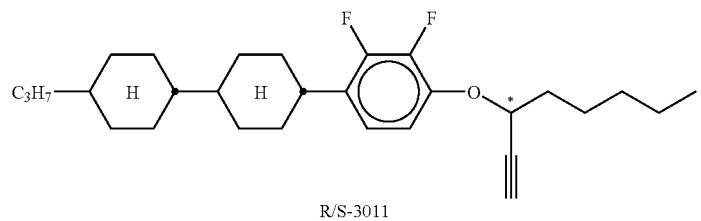
R/S-3011
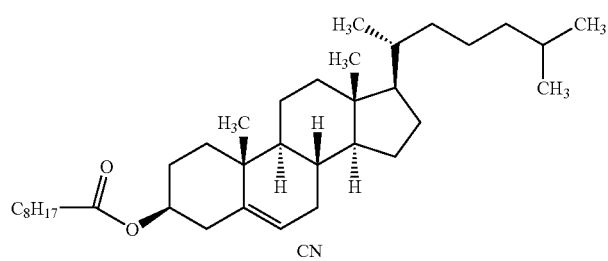
CN
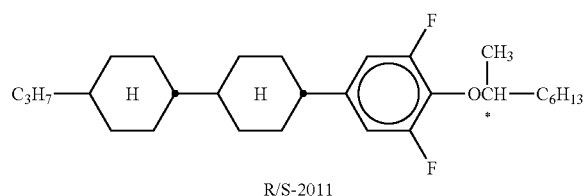
R/S-2011
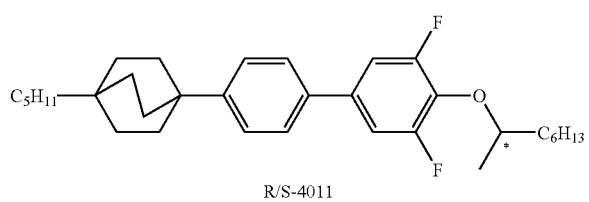
R/S-4011
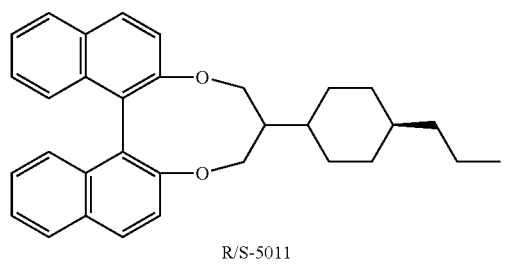
R/S-5011

TABLE D
Table D shows stabilizers optionally present in the liquid crystal compositions for use in the zenithal bistable nematic devices of the invention.
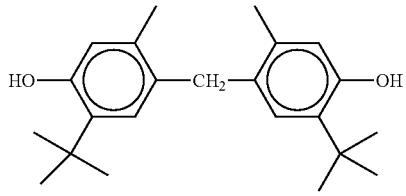
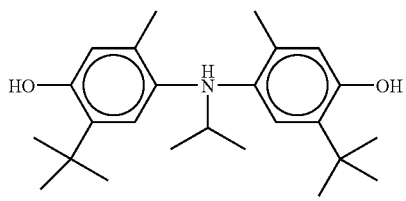
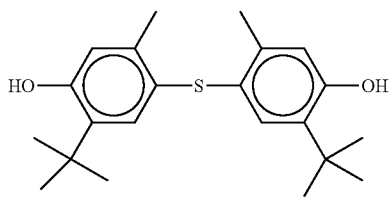
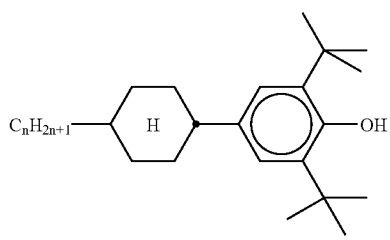
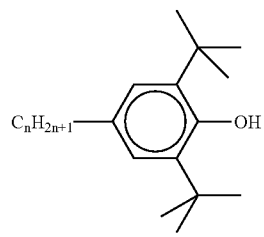
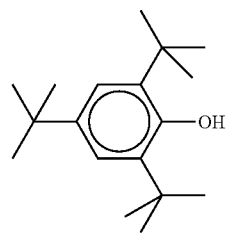

TABLE D-continued
Table D shows stabilizers optionally present in the liquid crystal compositions for use in the zenithal bistable nematic devices of the invention.
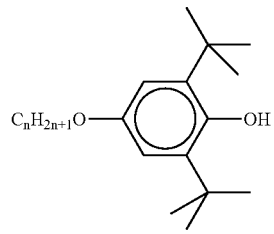
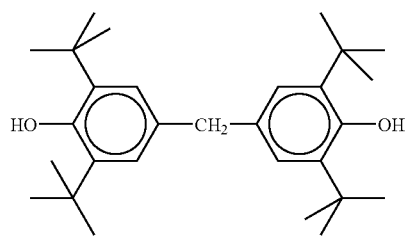
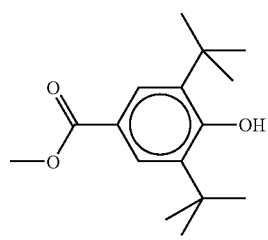
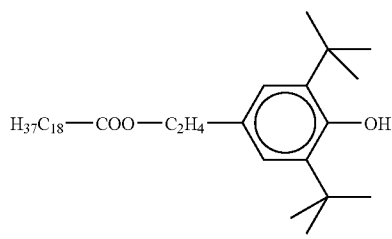
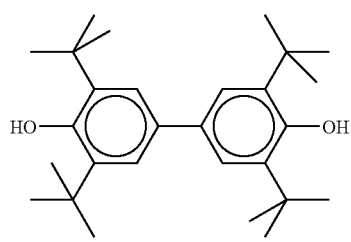

TABLE D-continued
Table D shows stabilizers optionally present in the liquid crystal compositions for use in the zenithal bistable nematic devices of the invention.
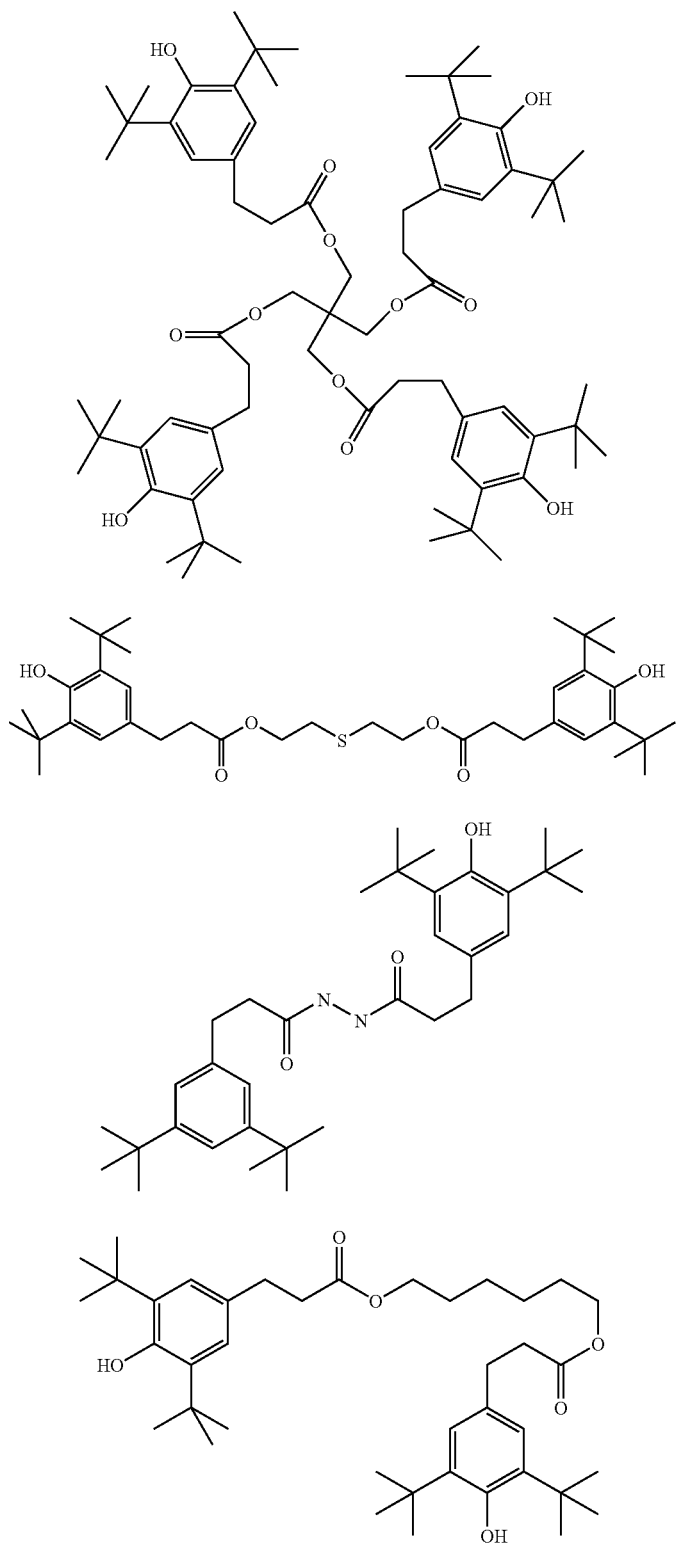

TABLE D-continued
Table D shows stabilizers optionally present in the liquid crystal compositions for use in the zenithal bistable nematic devices of the invention.
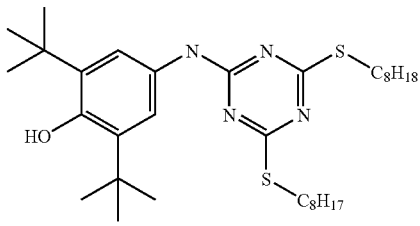
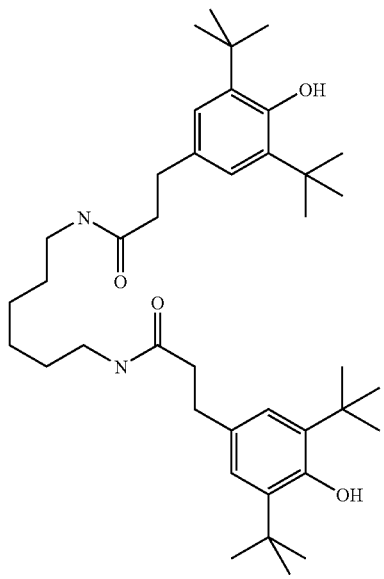
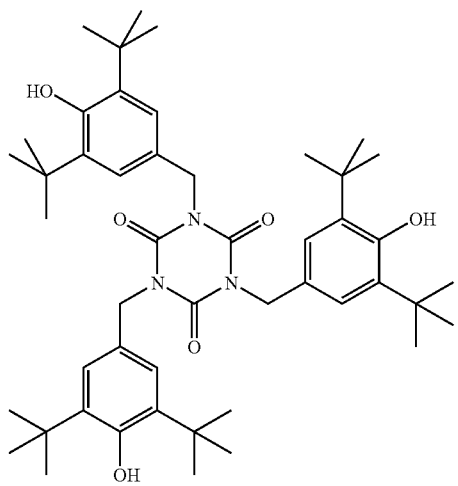

TABLE D-continued
Table D shows stabilizers optionally present in the liquid crystal compositions for use in the zenithal bistable nematic devices of the invention.
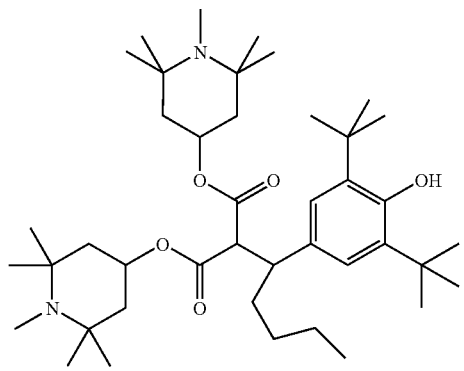
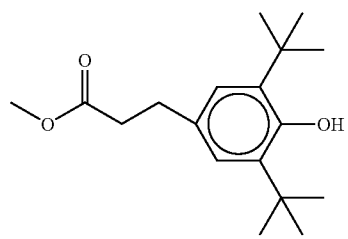
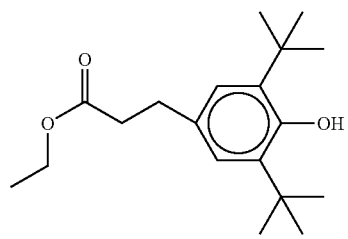
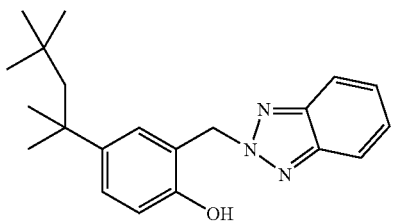
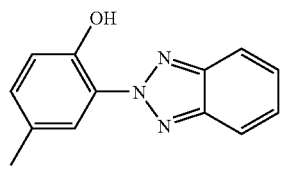
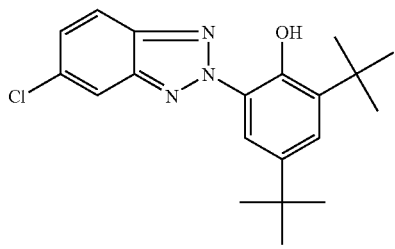

TABLE D-continued
Table D shows stabilizers optionally present in the liquid crystal compositions for use in the zenithal bistable nematic devices of the invention.
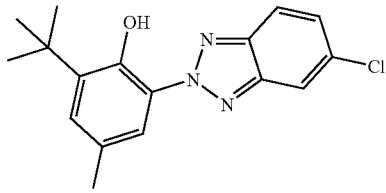
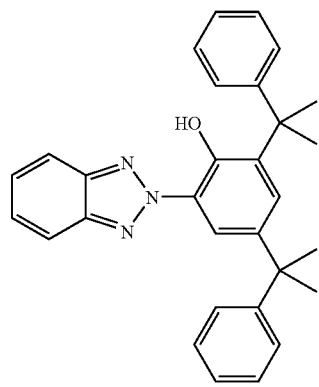
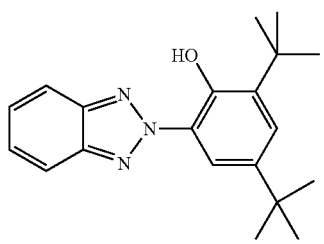
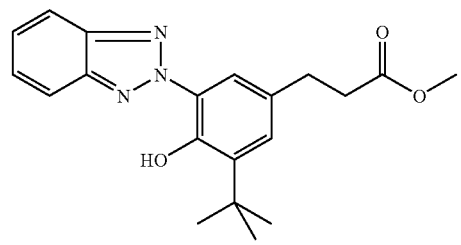
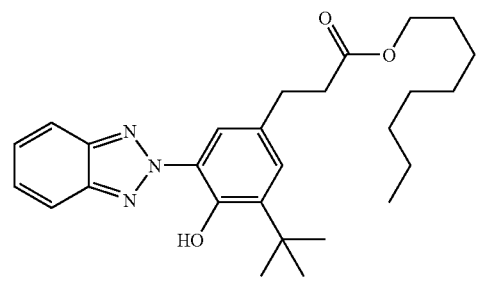

TABLE D-continued
Table D shows stabilizers optionally present in the liquid crystal compositions for use in the zenithal bistable nematic devices of the invention.
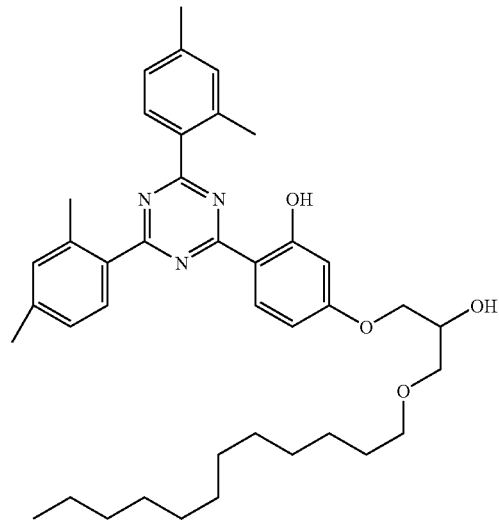
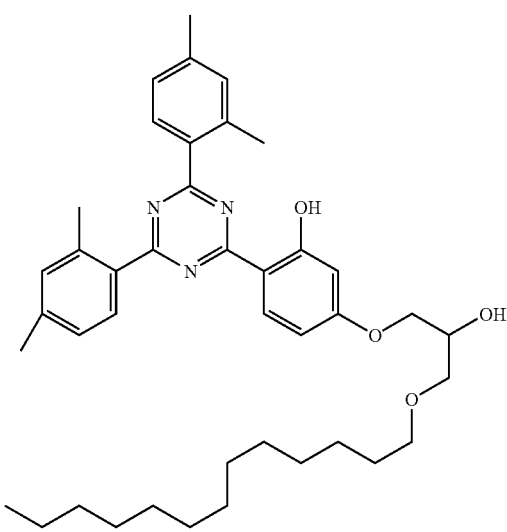
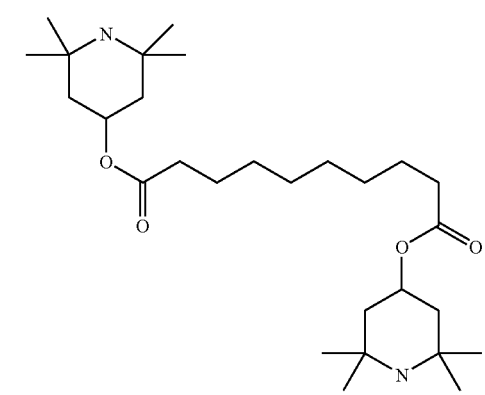

TABLE D-continued

Table D shows stabilizers optionally present in the liquid crystal compositions for use in the zenithal bistable nematic devices of the invention.

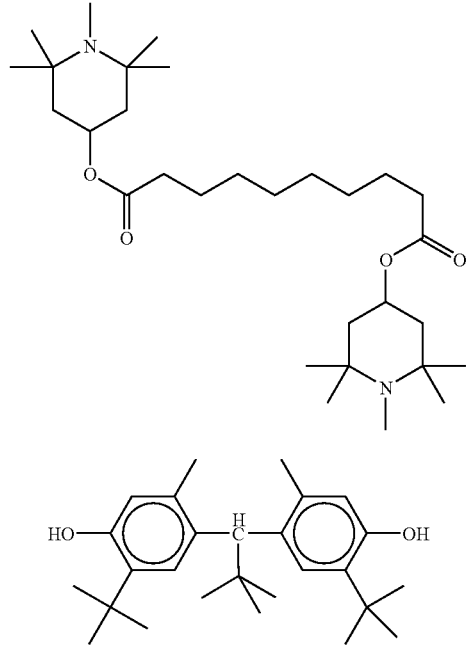

Percentages given herein are weight % and generally related to the total amount of a composition or mixture except stated otherwise. Temperatures are given in degree Celsius (° C.) unless stated otherwise. $T_{NI}$ means the clearing point at which a nematic medium becomes isotropic. $\Delta n$ is the optical anisotropy (birefringence) (at 589 nm, 20° C.). $\Delta \epsilon$ means the dielectric anisotropy (at 1 kHz, 20° C.). $K_1$ is the splay elastic constant, and $K_3$ is the bend elastic constant both given in pN. Electrooptical data has been determined in a VAN zenithal bistable nematic cell. Except stated otherwise the measurements have been performed at 20° C. $V_{opt}$ is the corrected operating voltage (in V) derived from the corrected switching field $E_{LC@100\ \mu s}$ (at 25° C.; in zenithal bistable test cells with the actual cell gap d of about 2.8 to about 5 µm; 100 µs pulse) by $V_{opt}=E_{LC@100\ \mu s} \cdot d_{opt}$ (with $d_{opt}$ (in µm) being $\lambda \sqrt{3}/(2\Delta n)$; $\lambda$=555 nm). $\Delta V_{opt}$ is the corrected operating window at a 400 µs pulse for B-W-switching and reverse switching (in V); it is calculated from the experimental switching field window $\Delta E_{LC@400\ \mu s}$ (at 25° C.; 400 µs pulse) multiplied with $d_{opt}$ defined as given above. Optical response time $\tau_{opt}$ (in ms) is calculated from $\tau^{opt}=\tau \cdot d^2_{opt}/d^2$ with $\tau$ being the experimental response time, $d_{opt}$ being as defined above and d being the experimental cell gap.

The following Examples should further illustrate the present invention as described above and in the claims but not meant to restrict its scope.

EXAMPLES

Test samples were prepared by weighing out the appropriate weight amounts (percentage weight/weight) of the individual components. The sample was then homogenised by heating into the isotropic phase and thoroughly mixing. The mixture was then stirred with a given concentration of alumina and then filtered (0.2 µm) to just leave the liquid crystal mixture. The nematic to isotropic transition temperature (or clearing point, $T_{NI}$), dielectric anisotropy ($\Delta \epsilon$), birefringence ($\Delta n$), splay and bend elastic constants ($K_1$ and $K_3$), and rotational viscosities ($\gamma_1$) were determined as described in the Merck brochure "Physical Properties of Liquid Crystals—Description of the measurement methods", ed. W. Becker (1998). Values for single compounds are extrapolated from those determined using a known concentration (usually 10 weight % of the single compound) in a standard host mixture for which the initial mixture values are also known. The electrooptical performance of each mixture in a zentihal bistable nematic device was measured using a simple experimental set-up and the VAN type test cells. This required a transmissive mode micrscope with a mounted photo-detector connected to an oscilloscope. This allowed the transmission through crossed polarisers to be monitored. The test cell was mounted on a heating stage under the microscope to permit measurements at 25° C. Bipolar electrical pulses (of varying duration and voltage) were used to ensure that there was no net d.c. voltage applied to the cell. The trailing edge (and so polarity) of each pulse therefore determined the final switched state (depending on the duration and voltage). Two signal generators were necessary to ensure that the correct initial state is first selected, with the first signal triggering the second (with an appropriate phase difference). Both signals were amplified by passing the output of the signal generators through an amplifier before being connected to the test cell. For the B-W transition, the voltages required for 10 and 90% transmission changes and reverse 90 and 10% transmission changes were measured for various pulse durations. For the W-B transition, the voltages required for 90 and 10% transmission changes only were measured for various pulse durations. These levels were set on the oscilloscope once the 0 and 100% transmission levels were known (i.e. black and white), and they could also be used to determine the optical response time of the transition (for 10 to 90% transmission changes).

VAN type test cells were used with cell gaps typically 3-5 µm, in transmissive mode and with crossed polarisers. Due to the varying cell thicknesses and different mixture $\Delta n$ values, the retardation was not optimised but this is not crucial as it only decreases the contrast.

Example 1

| Compound | Amount (wt %) |
|---|---|
| ME2N.F | 12 |
| ME3N.F | 12 |
| ME4N.F | 12 |
| ME5N.F | 12 |
| HP-3N.F | 5 |
| HP-4N.F | 5 |
| HP-5N.F | 5 |
| CC-5-V | 10 |
| CCG-V-F | 15 |
| CCPC-33 | 4 |
| CCPC-34 | 4 |
| CCPC-35 | 4 |
| Total | 100 |
| $T_{NI}$ (° C.) | 92.4 |
| $\Delta\epsilon$ | 43.7 |
| $\Delta n$ | 0.1428 |
| $K_1$ (pN) | 7.6 |
| $K_3$ (pN) | 22.5 |
| $V_{opt}$ (V) | 11.5 |
| $\Delta V_{opt}$ (V) | 7.3 |
| $\tau_{opt}$ (ms) | 55 |
| $\gamma 1$ (mPa · s) | 448 |

Example 2

| Compound | Amount (wt %) |
|---|---|
| ME2N.F | 12 |
| ME3N.F | 12 |
| ME4N.F | 12 |
| ME5N.F | 12 |
| HP-3N.F | 5 |
| HP-4N.F | 5 |
| HP-5N.F | 5 |
| CC-5-V | 16 |
| CCG-V-F | 10 |
| CCPC-33 | 3 |
| CCPC-34 | 3 |
| CCPC-35 | 2 |
| PPTUI-3-2 | 3 |
| Total | 100 |
| $T_{NI}$ (° C.) | 82.6 |
| $\Delta\epsilon$ | 43.4 |
| $\Delta n$ | 0.1465 |
| $K_1$ (pN) | 7.8 |
| $K_3$ (pN) | 17.2 |
| $V_{opt}$ (V) | 14.9 |
| $\Delta V_{opt}$ (V) | 9.6 |
| $\tau_{opt}$ (ms) | 38 |

Example 3

| Compound | Amount (wt %) |
|---|---|
| ME2N.F | 7 |
| ME3N.F | 6.5 |
| ME4N.F | 6.5 |
| HP-3N.F | 5 |
| HP-4N.F | 4.5 |
| HP-5N.F | 4.5 |
| CC-5-V | 20 |
| CCG-V-F | 16 |
| CCPC-33 | 3 |
| CCPC-34 | 3 |
| CCPC-35 | 3 |
| PZU-V2-N | 15 |
| PPTUI-3-2 | 6 |
| Total | 100 |
| $T_{NI}$ (° C.) | 92.3 |
| $\Delta\epsilon$ | 43.1 |
| $\Delta n$ | 0.1402 |
| $K_1$ (pN) | 8.3 |
| $K_3$ (pN) | 14.1 |
| $V_{opt}$ (V) | 14.5 |
| $\Delta V_{opt}$ (V) | 4.7 |
| $\tau_{opt}$ (ms) | 45 |

Example 4

| Compound | Amount (wt %) |
|---|---|
| ME2N.F | 12 |
| ME3N.F | 10 |
| ME4N.F | 4 |
| ME5N.F | 4 |
| HP-3N.F | 6 |
| HP-4N.F | 6 |
| HP-5N.F | 6 |
| CCG-V-F | 8 |
| CCPC-33 | 5 |
| CCPC-34 | 5 |
| CCPC-35 | 5 |
| PDX-3 | 12 |
| PDX-4 | 9 |
| PDX-5 | 8 |
| Total | 100 |
| $T_{NI}$ (° C.) | 97.5 |
| $\Delta\epsilon$ | 39.1 |
| $\Delta n$ | 0.1454 |
| $K_1$ (pN) | 8.4 |
| $K_3$ (pN) | 19.6 |
| $V_{opt}$ (V) | 18.0 |
| $\Delta V_{opt}$ (V) | 14.9 |
| $\tau_{opt}$ (ms) | 67 |

Example 5

| Compound | Amount (wt %) |
|---|---|
| ME2N.F | 6 |
| ME3N.F | 6 |
| ME4N.F | 5 |
| ME5N.F | 5 |
| HP-3N.F | 4 |
| HP-4N.F | 4 |
| HP-5N.F | 4 |
| CC-5-V | 10 |

-continued

| Compound | Amount (wt %) |
|---|---|
| CCG-V-F | 16 |
| CCPC-33 | 4 |
| CCPC-34 | 4 |
| CCPC-35 | 4 |
| PZU-V2-N | 10 |
| PPTUI-3-2 | 8 |
| PCH-3N.F.F | 10 |
| Total | 100 |
| $T_{NI}$ (° C.) | 88.9 |
| $\Delta\epsilon$ | 38.4 |
| $\Delta n$ | 0.1462 |
| $K_1$ (pN) | 7.8 |
| $K_3$ (pN) | 16.7 |
| $V_{opt}$ (V) | 10.4 |
| $\Delta V_{opt}$ (V) | 1.1 |
| $\tau_{opt}$ (ms) | 32 |

Example 6

| Compound | Amount (wt %) |
|---|---|
| ME2N.F | 10 |
| ME3N.F | 10 |
| ME4N.F | 10 |
| ME5N.F | 10 |
| PZU-V2-N | 10 |
| CPTP-301 | 5 |
| CPTP-302 | 5 |
| CPTP-303 | 5 |
| D-301 | 5 |
| D-302 | 5 |
| D-401 | 5 |
| D-402 | 5 |
| CBC-33F | 5 |
| CBC-53F | 5 |
| CBC-55F | 5 |
| Total | 100 |
| $T_{NI}$ (° C.) | 88.7 |
| $\Delta\epsilon$ | 44.2 |
| $\Delta n$ | 0.1709 |
| $K_1$ (pN) | 9.4 |
| $K_3$ (pN) | 18.2 |
| $V_{opt}$ (V) | 11.6 |
| $\Delta V_{opt}$ (V) | 9.3 |
| $\tau_{opt}$ (ms) | 36 |

Example 7

| Compound | Amount (wt %) |
|---|---|
| ME2N.F | 10 |
| ME3N.F | 10 |
| ME4N.F | 10 |
| ME5N.F | 10 |
| PZU-V2-N | 10 |
| CPTP-301 | 5 |
| CPTP-302 | 5 |
| CPTP-303 | 5 |
| CC-5-V | 20 |
| CCPC-33 | 5 |
| CCPC-34 | 5 |
| CCPC-35 | 5 |
| Total | 100 |
| $T_{NI}$ (° C.) | 91.6 |
| $\Delta\epsilon$ | 43.3 |

-continued

| | |
|---|---|
| $\Delta n$ | 0.155 |
| $K_1$ (pN) | 9.9 |
| $K_3$ (pN) | 16.5 |
| $V_{opt}$ (V) | 11.0 |
| $\Delta V_{opt}$ (V) | 5.1 |
| $\tau_{opt}$ (ms) | 20 |
| $\gamma_1$ (mPa·s) | 319 |

Example 8

| Compound | Amount (wt %) |
|---|---|
| ME2N.F | 10 |
| ME3N.F | 10 |
| ME4N.F | 10 |
| ME5N.F | 10 |
| PZU-V2-N | 10 |
| CPTP-301 | 5 |
| CPTP-302 | 5 |
| CPTP-303 | 5 |
| PTP-102 | 5 |
| PTP-201 | 5 |
| PTP-301 | 5 |
| PTP-302 | 5 |
| CCPC-33 | 5 |
| CCPC-34 | 5 |
| CCPC-35 | 5 |
| Total | 100 |
| $T_{NI}$ (° C.) | 91.3 |
| $\Delta\epsilon$ | 46.7 |
| $\Delta n$ | 0.2077 |
| $K_1$ (pN) | 11.1 |
| $K_3$ (pN) | 18.5 |
| $V_{opt}$ (V) | 16.1 |
| $\Delta V_{opt}$ (V) | 8.5 |
| $\tau_{opt}$ (ms) | 8 |
| $\gamma_1$ (mPa·s) | 452 |

Example 9

| Compound | Amount (wt %) |
|---|---|
| ME2N.F | 12 |
| ME3N.F | 12 |
| ME4N.F | 12 |
| ME5N.F | 12 |
| HP-3N.F | 5 |
| HP-4N.F | 5 |
| HP-5N.F | 5 |
| CCG-V-F | 15 |
| CCPC-33 | 2 |
| CCPC-34 | 2 |
| CCPC-35 | 2 |
| CCP-V-1 | 8 |
| CCP-V2-1 | 8 |
| Total | 100 |
| $T_{NI}$ (° C.) | 96.2 |
| $\Delta\epsilon$ | 47.0 |
| $\Delta n$ | 0.1508 |
| $K_1$ (pN) | 7.9 |
| $K_3$ (pN) | 21.8 |
| $V_{opt}$ (V) | 11.6 |
| $\Delta V_{opt}$ (V) | 2.2 |
| $\tau_{opt}$ (ms) | 47 |

Example 10

| Compound | Amount (wt %) |
|---|---|
| ME2N.F | 10 |
| ME3N.F | 10 |
| ME4N.F | 10 |
| ME5N.F | 10 |
| PZU-V2-N | 10 |
| CCG-V-F | 10 |
| CCP-V-1 | 5 |
| CCP-V2-1 | 5 |
| CVCP-V-1 | 5 |
| CVCP-V-O1 | 5 |
| CVCP-1V-O1 | 5 |
| CCPC-33 | 5 |
| CCPC-34 | 5 |
| CCPC-35 | 5 |
| Total | 100 |
| $T_{NI}$ (° C.) | 98.1 |
| $\Delta\epsilon$ | 46.3 |
| $\Delta n$ | 0.1439 |
| $K_1$ (pN) | 8.5 |
| $K_3$ (pN) | 18.4 |
| $V_{opt}$ (V) | 11.8 |
| $\Delta V_{opt}$ (V) | 6.5 |
| $\tau_{opt}$ (ms) | 49 |

Example 11

| Compound | Amount (wt %) |
|---|---|
| ME2N.F | 10 |
| ME3N.F | 10 |
| ME4N.F | 10 |
| ME5N.F | 10 |
| PZU-V2-N | 10 |
| HP-33 | 10 |
| HP-53 | 10 |
| HD-34 | 10 |
| HD-35 | 10 |
| CP-33 | 5 |
| CP-35 | 5 |
| Total | 100 |
| $T_{NI}$ (° C.) | 99.2 |
| $\Delta\epsilon$ | 43.3 |
| $\Delta n$ | 0.1453 |
| $K_1$ (pN) | 9.8 |
| $K_3$ (pN) | 12.7 |
| $V_{opt}$ (V) | 14.9 |
| $\tau_{opt}$ (ms) | 54 |

Example 12

| Compound | Amount (wt %) |
|---|---|
| ME2N.F | 10 |
| ME3N.F | 11 |
| ME4N.F | 11 |
| ME5N.F | 11 |
| HP-3N.F | 5 |
| HP-4N.F | 5 |
| HP-5N.F | 5 |
| BCH-2F.F | 9 |
| BCH-3F.F | 9 |
| BCH-5F.F | 9 |
| CBC-33F | 5 |
| CBC-35F | 5 |
| CBC-55F | 5 |
| Total | 100 |
| $T_{NI}$ (° C.) | 99.1 |
| $\Delta\epsilon$ | 41.6 |
| $\Delta n$ | 0.1690 |
| $K_1$ (pN) | 7.9 |
| $K_3$ (pN) | 18.3 |
| $V_{opt}$ (V) | 13.9 |
| $\tau_{opt}$ (ms) | 25 |

Example 13

| Compound | Amount (wt %) |
|---|---|
| PZU-V2-N | 14 |
| ME2N.F | 8 |
| ME3N.F | 8 |
| ME4N.F | 8 |
| ME5N.F | 8 |
| HD-34 | 11 |
| HD-35 | 11 |
| CC-5-V | 17 |
| CCPC-33 | 5 |
| CCPC-34 | 5 |
| CCPC-35 | 5 |
| Total | 100 |
| $T_{NI}$ (° C.) | 99.0 |
| $\Delta\epsilon$ | 39.1 |
| $\Delta n$ | 0.1234 |
| $K_1$ (pN) | 9.9 |
| $K_3$ (pN) | 13.0 |
| $V_{opt}$ (V) | 17.1 |
| $\Delta V_{opt}$ (V) | 29.4 |
| $\tau_{opt}$ (ms) | 27 |

Example 14

| Compound | Amount (wt %) |
|---|---|
| PZU-V2-N | 15 |
| ME2N.F | 5 |
| ME3N.F | 5 |
| ME4N.F | 5 |
| ME5N.F | 5 |
| CCPC-33 | 4.5 |
| CCPC-34 | 4.5 |
| CCPC-35 | 4.5 |
| CCP-V-1 | 4 |
| CCP-V2-1 | 4 |
| CC-5-V | 10 |
| CBC-33F | 2 |
| CBC-35F | 2 |
| CBC-55F | 2 |
| CDU-2-F | 5 |
| CDU-3-F | 5 |
| CDU-5-F | 5 |
| CCZU-2-F | 3 |
| CCZU-3-F | 6.5 |
| CCZU-5-F | 3 |
| Total | 100 |
| $T_{NI}$ (° C.) | 95.4 |
| $\Delta\epsilon$ | 40.1 |
| $\Delta n$ | 0.1176 |

-continued

| | |
|---|---|
| $K_1$ (pN) | 8.0 |
| $K_3$ (pN) | 15.9 |
| $V_{opt}$ (V) | 7.7 |
| $\Delta V_{opt}$ (V) | 36.2 |
| $\tau_{opt}$ (ms) | 36 |

Example 15

| Compound | Amount (wt %) |
|---|---|
| PZU-V2-N | 20 |
| ME2N.F | 5 |
| ME3N.F | 5 |
| ME4N.F | 5 |
| ME5N.F | 5 |
| BCH-2F.F | 10 |
| BCH-3F.F | 10 |
| BCH-5F.F | 10 |
| BCH-32 | 5 |
| BCH-52 | 10 |
| CCPC-33 | 5 |
| CCPC-34 | 5 |
| CCPC-35 | 5 |
| | |
| Total | 100 |
| $T_{NI}$ (° C.) | 98.1 |
| $\Delta \epsilon$ | 44.5 |
| $\Delta n$ | 0.1536 |
| $K_1$ (pN) | 8.7 |
| $K_3$ (pN) | 11.9 |
| $V_{opt}$ (V) | 11.5 |
| $\Delta V_{opt}$ (V) | 3.5 |
| $\tau_{opt}$ (ms) | 19 |

Example 16

| Compound | Amount (wt %) |
|---|---|
| PZU-V2-N | 20 |
| DU-3-N | 10 |
| CCGU-3-F | 5 |
| CCZU-2-F | 7 |
| CCZU-3-F | 15 |
| CCZU-5-F | 7 |
| CCQU-2-F | 7 |
| CCQU-3-F | 7 |
| CCQU-5-F | 7 |
| CCPC-33 | 5 |
| CCPC-34 | 5 |
| CCPC-35 | 5 |
| | |
| Total | 100 |
| $T_{NI}$ (° C.) | 101.4 |
| $\Delta \epsilon$ | 42.9 |
| $\Delta n$ | 0.1011 |
| $K_1$ (pN) | 5.8 |
| $K_3$ (pN) | 16.9 |
| $V_{opt}$ (V) | 6.8 |
| $\Delta V_{opt}$ (V) | 53.1 |
| $\tau_{opt}$ (ms) | 42 |

Example 17

| Compound | Amount (wt %) |
|---|---|
| PZU-V2-N | 15 |
| ME2N.F | 5 |
| ME3N.F | 5 |
| ME4N.F | 5 |
| ME5N.F | 5 |
| CDU-2-F | 5 |
| CDU-3-F | 5 |
| CDU-5-F | 5 |
| CCGU-3-F | 6 |
| CCZU-2-F | 7 |
| CCZU-3-F | 15 |
| CCZU-5-F | 7 |
| CCPC-33 | 5 |
| CCPC-34 | 5 |
| CCPC-35 | 5 |
| | |
| Total | 100 |
| $T_{NI}$ (° C.) | 99.0 |
| $\Delta \epsilon$ | 44.8 |
| $\Delta n$ | 0.1177 |
| $K_1$ (pN) | 6.4 |
| $K_3$ (pN) | 16.1 |
| $V_{opt}$ (V) | 8.2 |
| $\Delta V_{opt}$ (V) | 40.2 |
| $\tau_{opt}$ (ms) | 51 |

Example 18

| Compound | Amount (wt %) |
|---|---|
| PZU-V2-N | 15 |
| ME2N.F | 5 |
| ME3N.F | 5 |
| ME4N.F | 5 |
| ME5N.F | 5 |
| CGU-2-F | 5 |
| CGU-3-F | 5 |
| CGU-5-F | 5 |
| CCGU-3-F | 5 |
| CCZU-2-F | 5 |
| CCZU-3-F | 10 |
| CCZU-5-F | 5 |
| CCP-V-1 | 5 |
| CCP-V2-1 | 5 |
| CCPC-33 | 5 |
| CCPC-34 | 5 |
| CCPC-35 | 5 |
| | |
| Total | 100 |
| $T_{NI}$ (° C.) | 102.0 |
| $\Delta \epsilon$ | 44.7 |
| $\Delta n$ | 0.1289 |
| $K_1$ (pN) | 7.2 |
| $K_3$ (pN) | 16.2 |
| $V_{opt}$ (V) | 5.3 |
| $\Delta V_{opt}$ (V) | 40.3 |
| $\tau_{opt}$ (ms) | 34 |

Example 19

| Compound | Amount (wt %) |
|---|---|
| PZU-V2-N | 15 |
| ME2N.F | 5 |
| ME3N.F | 5 |

-continued

| Compound | Amount (wt %) |
|---|---|
| ME4N.F | 5 |
| ME5N.F | 5 |
| PGU-2-F | 5 |
| PGU-3-F | 5 |
| PGU-5-F | 5 |
| CCGU-3-F | 5 |
| CCZU-2-F | 6 |
| CCZU-3-F | 13 |
| CCZU-5-F | 6 |
| CCP-V-1 | 5 |
| CCPC-33 | 5 |
| CCPC-34 | 5 |
| CCPC-35 | 5 |
| Total | 100 |
| $T_{NI}$ (° C.) | 96.9 |
| $\Delta\epsilon$ | 49.6 |
| $\Delta n$ | 0.1399 |
| $K_1$ (pN) | 7.2 |
| $K_3$ (pN) | 15.7 |
| $V_{opt}$ (V) | 7.0 |
| $\Delta V_{opt}$ (V) | 32.2 |
| $\tau_{opt}$ (ms) | 31 |

Example 20

| Compound | Amount (wt %) |
|---|---|
| PZU-V2-N | 20 |
| ME3N.F.F | 10 |
| CGU-2-F | 10 |
| CGU-3-F | 10 |
| CGU-5-F | 10 |
| CCGU-3-F | 5 |
| CCP-V-1 | 10 |
| CCP-V2-1 | 10 |
| CCPC-33 | 5 |
| CCPC-34 | 5 |
| CCPC-35 | 5 |
| Total | 100 |
| $T_{NI}$ (° C.) | 96.4 |
| $\Delta\epsilon$ | 47.6 |
| $\Delta n$ | 0.1327 |
| $K_1$ (pN) | 7.9 |
| $K_3$ (pN) | 18.0 |
| $V_{opt}$ (V) | 4.1 |
| $\Delta V_{opt}$ (V) | 26.1 |
| $\tau_{opt}$ (ms) | 36 |

Example 21

| Compound | Amount (wt %) |
|---|---|
| PZU-V2-N | 21 |
| ME2N.F | 5 |
| ME3N.F | 5 |
| CGU-2-F | 10 |
| CGU-3-F | 10 |
| CGU-5-F | 10 |
| CCGU-3-F | 4 |
| CCP-V-1 | 10 |
| CCP-V2-1 | 10 |
| CCPC-33 | 5 |
| CCPC-34 | 5 |
| CCPC-35 | 5 |
| Total | 100 |
| $T_{NI}$ (° C.) | 98.3 |

-continued

| | |
|---|---|
| $\Delta\epsilon$ | 43.9 |
| $\Delta n$ | 0.1355 |
| $K_1$ (pN) | 8.5 |
| $K_3$ (pN) | 19.0 |
| $V_{opt}$ (V) | 4.0 |
| $\Delta V_{opt}$ (V) | 27.7 |
| $\tau_{opt}$ (ms) | 28 |

Comparative Example

MLC-6204 (Merck KGaA, Darmstadt) was tested under similar conditions as the Examples according to the invention:

| | |
|---|---|
| $T_{NI}$ (° C.) | 62.4 |
| $\Delta\epsilon$ | 35.2 |
| $\Delta n$ | 0.1484 |
| $K_1$ (pN) | 7.5 |
| $K_3$ (pN) | 14.8 |
| $V_{opt}$ (V) | 11.8 |
| $\Delta V_{opt}$ (V) | 7.3 |
| $\tau_{opt}$ (ms) | 41 |
| $\gamma_1$ (mPa · s) | 358 |

The invention claimed is:

1. Bistable liquid crystal device comprising
two outer substrates which, together with a frame, form a cell;
a liquid crystal composition present in said cell;
electrode structures with alignment layers on the inside of said outer substrates whereby at least one alignment layer comprises an alignment grating that permits the compounds of said liquid crystal composition to adopt at least two different stable states whereby the assembly of said electrode structures with said alignment layers being such that a switching between the said at least two different stable states is achieved by applying suitable electric signals to said electrode structures;
whereby said liquid crystal composition comprises
at least 30 weight % (based on the total weight of the composition) of a component (α) containing one or more compounds having a dielectric anisotropy $\Delta\epsilon$ of at least 25,
whereby at least 25 weight % (based on the total weight of the composition) of said compounds have a dielectric anisotropy $\Delta\epsilon$ of at least 40; and
at least 5 weight % (based on the total weight of the composition) of a component (β);
whereby said component (β) comprises at least one compound of formula III and/or at least one compound of formula IV and/or at least one compound of formula V and/or at least one compound of formula VI and/or at least one compound of formula VII

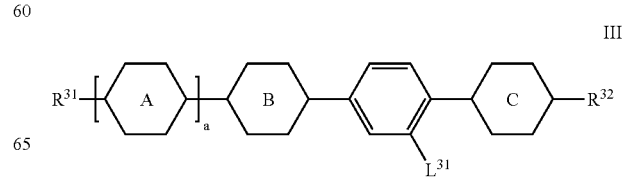

III

-continued

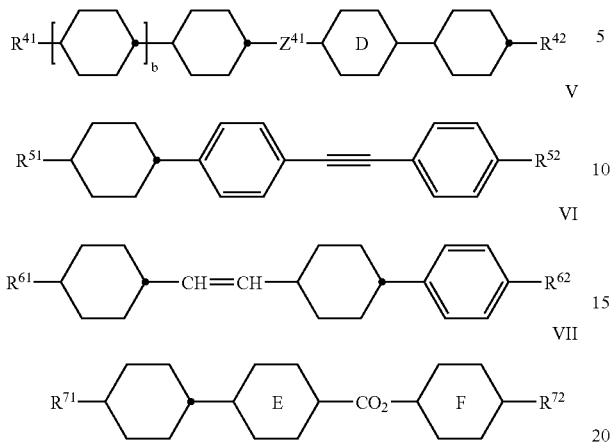

in which
a and b are independently of each other 0 or 1;
$R^{31}$, $R^{32}$, $R^{41}$, $R^{42}$, $R^{51}$, $R^{52}$, $R^{61}$, $R^{62}$, $R^{71}$ and $R^{72}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other; and
$L^{31}$ is H or F;
$Z^{41}$ is —CO—O—, —$CH_2$O—, —O$CH_2$—, —$CF_2$O—, —OC$F_2$—, —$CH_2CH_2$—, —$CF_2CF_2$—, —$CH_2CF_2$—, —$CF_2CH_2$—, —CH=CH— or —C≡C—;

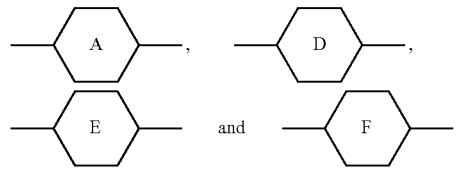

are independently of each other

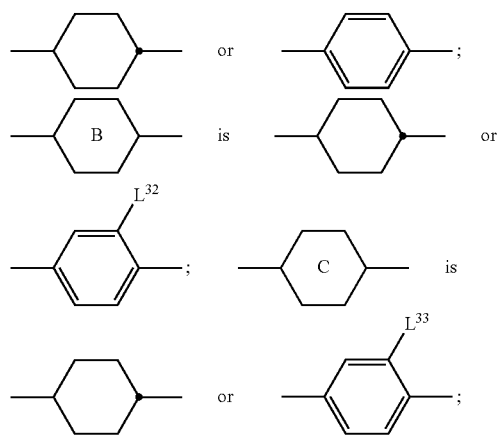

in which
$L^{32}$ and $L^{33}$ are independently of each other H or F.

2. Bistable liquid crystal device according to claim 1 whereby
said device is a zenithal bistable nematic liquid crystal device; and
said electrode structures with alignment layers on the inside of said outer substrates have at least one alignment layer that comprises an alignment grating that permits the compounds of said liquid crystal composition to adopt at least two different stable states with different pretilt angles in the same azimuthal plane.

3. Bistable liquid crystal device according to claim 1 whereby said component (α) comprises at least one compound of formula I and/or at least one compound of formula II

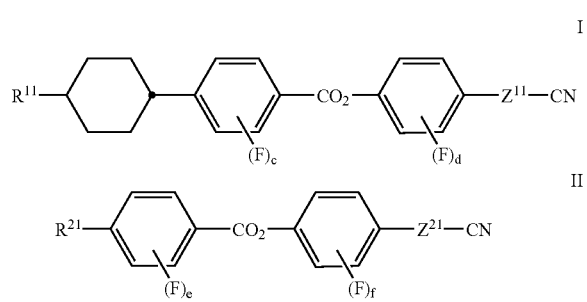

in which
c, d, e and f are independently of each other 0, 1, 2, 3 or 4;
$R^{11}$ is $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
$R^{21}$ is $C_2$-$C_{15}$ alkenyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
$Z^{11}$ and $Z^{21}$ are independently of each other a single bond or —C≡C—.

4. Bistable liquid crystal device according to claim 2 whereby said component (α) comprises at least one compound of formula VIII

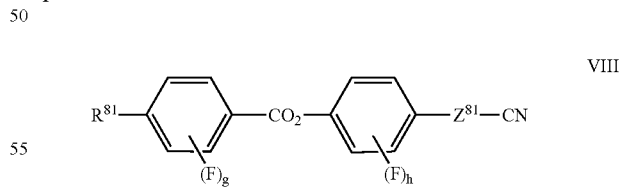

in which
g and h are independently of each other 0, 1, 2, 3 or 4;
$R^{81}$ is $C_1$-$C_{15}$ alkyl which is unsubstituted or mono- or poly-substituted with CN or halogen and in which one or more of the $CH_2$ groups may be replaced independently of each other by —O—, —S—, —C≡C—, —CO—O—, —OC—O— such that there are no hetero atoms adjacent to each other;
$Z^{81}$ a single bond or —C≡C—.

5. Bistable liquid crystal device according to claim 1 whereby said component (α) comprises at least one compound of formula IX

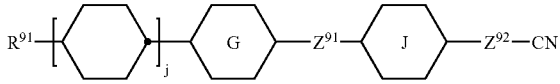   IX in which
j is 0 or 1;
$R^{91}$ is $C_1$-$C_{15}$ alkyl which is unsubstituted or mono- or poly-substituted with CN or halogen and in which one or more of the $CH_2$ groups may be replaced by —O—, —S—, —CH=CH—, —C≡C—, —CO—O—, —OC—O— such that there are no hetero atoms adjacent to each other;
$Z^{91}$ and $Z^{92}$ are independently of each other a single bond or —C≡C—;

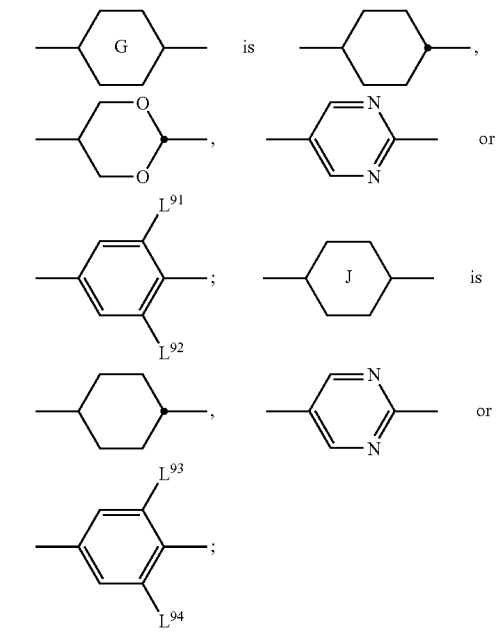

in which
$L^{91}$, $L^{92}$, $L^{93}$ and $L^{94}$ are independently of each other H or F.

6. Bistable liquid crystal device according to claim 1 whereby said liquid crystal composition further comprises at least 3 weight % (based on the total weight of the composition) of a component (γ) containing one or more compounds having an optical anisotropy Δn of at least 0.20.

7. Bistable liquid crystal device according to claim 6 whereby said component (γ) comprises at least one compound of formula X

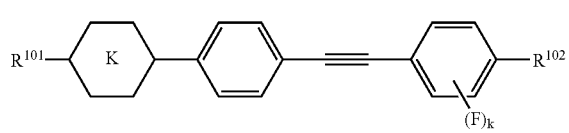   X in which
k is 0, 1, 2, 3 or 4;

$R^{101}$ and $R^{102}$ are independently of each other $C_1$-$C_{15}$ alkyl which is unsubstituted or mono- or poly-substituted with CN or halogen and in which one or more of the $CH_2$ groups may be replaced by —O—, —S—, —CH=CH—, —C≡C—, —CO—O—, —OC—O— such that there are no hetero atoms adjacent to each other; and

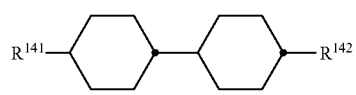

8. Bistable liquid crystal device according to claim 1 whereby said liquid crystal composition further comprises at least one compound of formula XI and/or at least one compound of formula XII and/or at least one compound of formula XIII and/or at least one compound of formula XIV

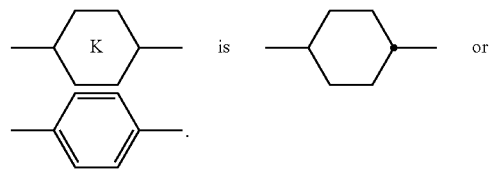   XI

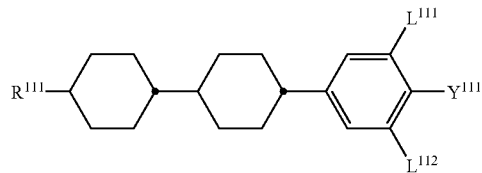   XII

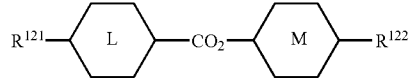   XIII

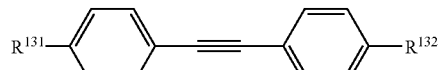   XIV in which
$R^{111}$ and $R^{142}$ are independently of each other $C_2$-$C_{15}$ alkenyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
$R^{121}$, $R^{131}$, $R^{132}$ and $R^{141}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
$R^{122}$ is $C_1$-$C_{15}$ alkyl which is unsubstituted or mono- or poly-substituted with halogen and in which one or more of the $CH_2$ groups may be replaced independently of each other by —O—, —S—, —CH=CH—, —C≡C—, —CO—O—, —OC—O— such that there are no hetero atoms adjacent to each other;
$Y^{111}$ is F, Cl, $C_1$-$C_{15}$ alkanyl or $C_2$-$C_{15}$ alkenyl that are independently of each other mono- or poly-substituted with halogen, or $C_1$-$C_{15}$ alkoxy, which is mono- or poly-substituted with halogen;
$L^{111}$ and $L^{112}$ are independently of each other H or F; and

and are independently of each other

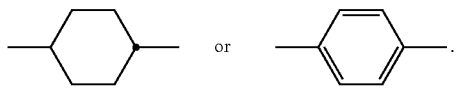

9. Bistable liquid crystal device according to claim 1 whereby said liquid crystal composition comprises at least 50 weight % (based on the total weight of the composition) of said component (α).

10. Bistable liquid crystal device according to claim 1 whereby said liquid crystal composition comprises at least 50 weight % (based on the total weight of the composition) of said component (α) whereby at least 30 weight % (based on the total weight of the composition) of said compounds have a dielectric anisotropy Δε of at least 40.

11. Bistable liquid crystal device according to claim 3 whereby said liquid crystal composition comprises at least one compound of formula II of said component (α) and at least 8 weight % (based on the total weight of the composition) of said component (β).

12. Bistable liquid crystal device according to claim 6 whereby said liquid crystal composition comprises at least 5 weight % (based on the total weight of the composition) of said component (γ).

13. Bistable liquid crystal device according to claim 1 whereby said liquid crystal composition comprises at least one compound of formula XV and/or of formula XVI and/or XVII and/or of formula XVIII and/or of formula XIX and/or of formula XX and/or of formula XXI and/or of formula XXII:

XV

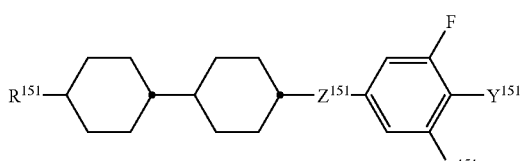

XVI

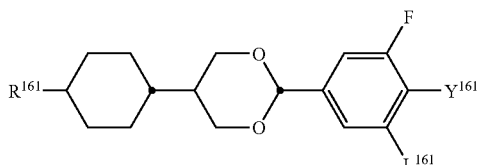

XVII

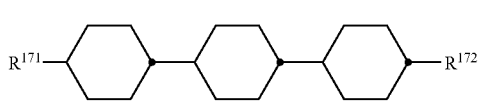

XVIII

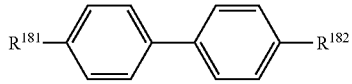

-continued

XIX

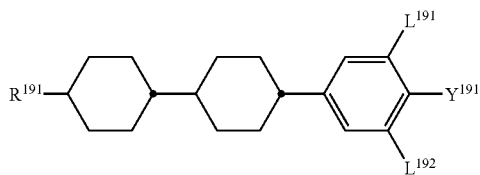

XX

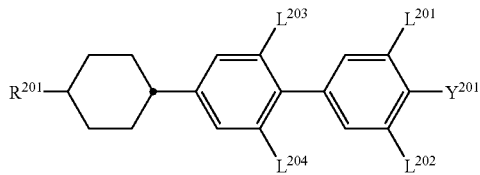

XXI

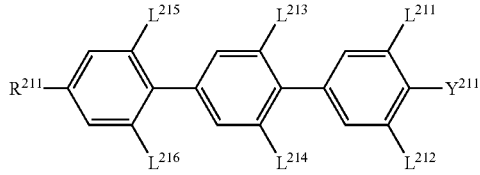

XXII

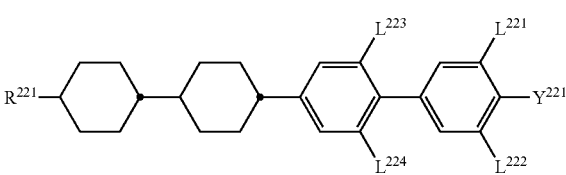

in which $R^{151}, R^{161}, R^{171}, R^{172}, R^{181}, R^{182}, R^{201}, R^{211}$ and $R^{221}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$R^{191}$ is $C_1$-$C_{15}$ alkyl which is unsubstituted or mono- or poly-substituted with CN or halogen and in which one or more of the $CH_2$ groups may be replaced independently of each other by —O—, —S—, —C≡C—, —CO—O—, —OC—O— such that there are no hetero atoms adjacent to each other (i.e. $R^{191}$ does not represent an alkenyl radical);

$Y^{151}, Y^{161}, Y^{191}, Y^{201}, Y^{211}$ and $Y^{221}$ are independently of each other F, Cl, $C_1$-$C_{15}$ alkanyl or $C_2$-$C_{15}$ alkenyl that are independently of each other mono- or poly-substituted with halogen, or $C_1$-$C_{15}$ alkoxy which is mono- or poly-substituted with halogen;

$L^{151}, L^{161}, L^{191}, L^{192}, L^{201}, L^{202}, L^{203}, L^{204}, L^{211}, L^{212}, L^{213}, L^{214}, L^{215}, L^{216}, L^{221}, L^{222}, L^{223}$ and $L^{224}$ are independently of each other H or F; and $Z^{151}$ is —CO—O—, $CH_2O$ or $CF_2O$.

14. Bistable liquid crystal device according to claim 1 whereby said component (α) comprises at least one compound of formula II:

II

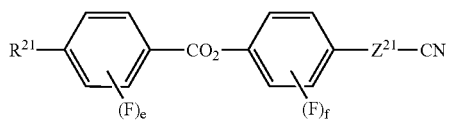

in which e and f are independently of each other 0, 1, 2, 3 or 4;

$R^{21}$ is $C_2$-$C_{15}$ alkenyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other; and $Z^{21}$ is a single bond or —C≡C—.

15. A method comprising displaying information and/or images on a bistable liquid crystal display device, wherein the device comprises a cell containing a liquid crystal composition which comprises:

at least 30 weight % (based on the total weight of the composition) of a component (α) containing one or more compounds having a dielectric anisotropy Δε of at least 25, whereby at least 25 weight % (based on the total weight of the composition) of said compounds have a dielectric anisotropy Δε of at least 40; and at least 5 weight % (based on the total weight of the composition) of a component (β);

whereby said component (β) comprises at least one compound of formula III and/or at least one compound of formula IV and/or at least one compound of formula V and/or at least one compound of formula VI and/or at least one compound of formula VII:

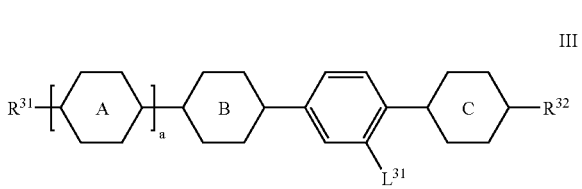

III

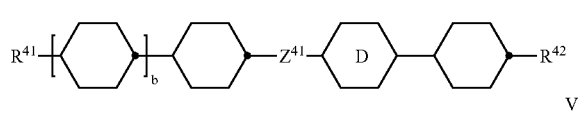

IV

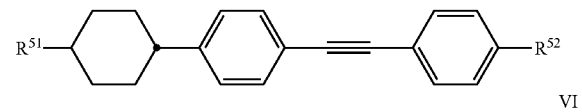

V

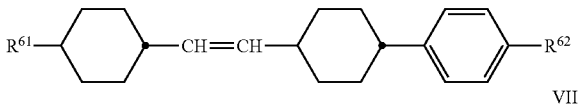

VI

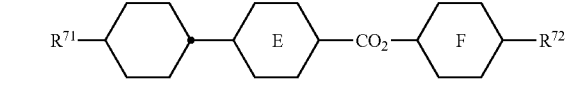

VII in which a and b are independently of each other 0 or 1;

$R^{31}$, $R^{32}$, $R^{41}$, $R^{42}$, $R^{51}$, $R^{52}$, $R^{61}$, $R^{62}$, $R^{71}$ and $R^{72}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$L^{31}$ is H or F;

$Z^{41}$ is —CO—O—, —$CH_2O$—, —$OCH_2$—, —$CF_2O$—, —$OCF_2$—, —$CH_2CH_2$—, —$CF_2CF_2$—, —$CH_2CF_2$—, —$CF_2CH_2$—, —CH=CH— or —C≡C—;

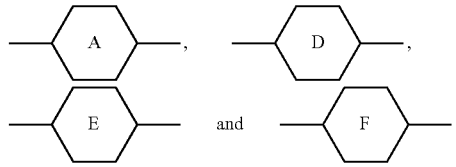

are independently of each other

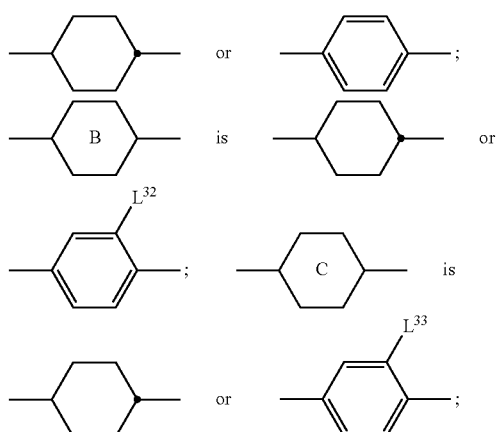

in which $L^{32}$ $L^{33}$ are independently of each other H or F.

16. The method of claim 15 wherein said bistable liquid crystal display device is a zenithal bistable nematic liquid crystal display device.

17. The method of claim 15, wherein said component (α) comprises at least one compound of formula I and/or at least one compound of formula II

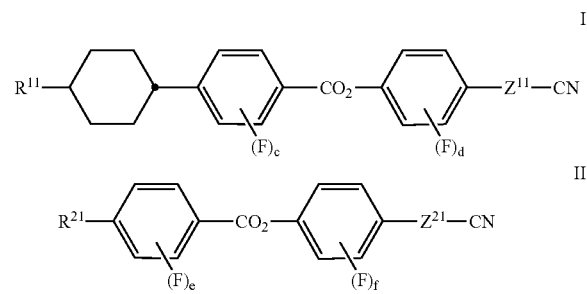

in which c, d, e and f are independently of each other 0, 1, 2, 3 or 4;

$R^{11}$ is $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$R^{21}$ is $C_2$-$C_{15}$ alkenyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;

$Z^{11}$ and $Z^{21}$ are independently of each other a single bond or —C≡C—.

18. The method of claim 15, wherein said component (α) comprises at least one compound of formula VIII

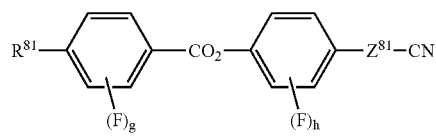

VIII in which g and h are independently of each other 0, 1, 2, 3 or 4;

$R^{81}$ is $C_1$-$C_{15}$ alkyl which is unsubstituted or mono- or poly-substituted with CN or halogen and in which one or more of the $CH_2$ groups may be replaced independently of each other by —O—, —S—, —C≡C—, —CO—O—, —OC—O— such that there are no hetero atoms adjacent to each other;

$Z^{81}$ is a single bond or —C≡C—.

19. The method of claim 15, wherein said component (α) comprises at least one compound of formula IX

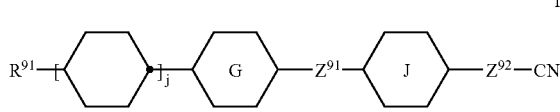

IX in which j is 0 or 1;

$R^{91}$ is $C_1$-$C_{15}$ alkyl which is unsubstituted or mono- or poly-substituted with CN or halogen and in which one or more of the $CH_2$ groups may be replaced by —O—, —S—, —CH=CH—, —C≡C—, —CO—O—, —OC—O— such that there are no hetero atoms adjacent to each other;

$Z^{91}$ and $Z^{92}$ are independently of each other a single bond or —C≡C—;

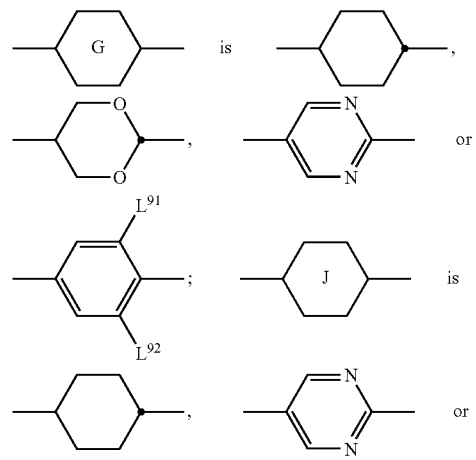

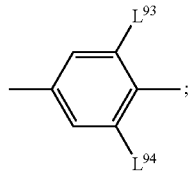

in which $L^{91}$, $L^{92}$, $L^{93}$ and $L^{94}$ are independently of each other H or F.

20. The method of claim 15, wherein said liquid crystal composition further comprises at least 3 weight % (based on the total weight of the composition) of a component (γ) containing one or more compounds having an optical anisotropy Δn of at least 0.20.

21. The method of claim 20, wherein said component (γ) comprises at least one compound of formula X:

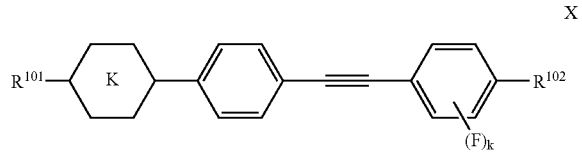

X in which k is 0, 1, 2, 3 or 4;

$R^{101}$ and $R^{102}$ are independently of each other $C_1$-$C_{15}$ alkyl which is unsubstituted or mono- or poly-substituted with CN or halogen and in which one or more of the $CH_2$ groups may be replaced by —O—, —S—, —CH=CH—, —C≡C—, —CO—O—, —OC—O— such that there are no hetero atoms adjacent to each other; and

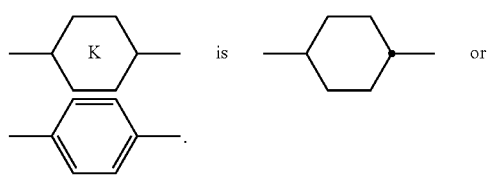

22. The method of claim 15, wherein said liquid crystal composition further comprises at least one compound of formula XI and/or at least one compound of formula XII and/or at least one compound of formula XIII at least one compound of formula XIV:

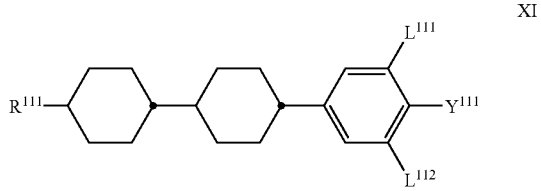

XI

-continued

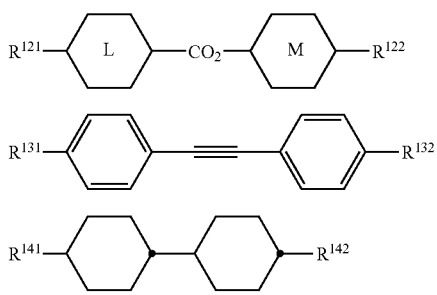

in which
- $R^{111}$ and $R^{142}$ are independently of each other $C_2$-$C_{15}$ alkenyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
- $R^{121}$, $R^{131}$, $R^{132}$ and $R^{141}$ are independently of each other $C_1$-$C_{15}$ alkyl which is unsubstituted or mono- or poly-substituted with CN or halogen and in which one or more of the $CH_2$ groups may be replaced independently of each other by —O—, —S—, —CH=CH—, —C≡C—, —CO—O—, —OC—O— such that there are no hetero atoms adjacent to each other;
- $R^{122}$ is $C_1$-$C_{15}$ alkyl which is unsubstituted or mono- or poly-substituted with halogen and in which one or more of the $CH_2$ groups may be replaced independently of each other by —O—, —S—, —CH=CH—, —C≡C—, —CO—O—, —OC—O— such that there are no hetero atoms adjacent to each other;
- $Y_{111}$ is F, Cl, $C_1$-$C_{15}$ alkanyl or $C_2$-$C_{15}$ alkenyl that are independently of each other mono- or poly-substituted with halogen, or $C_1$-$C_{15}$ alkoxy, which is mono- or poly-substituted with halogen;
- $L_{111}$ and $L_{112}$ are independently of each other H or F; and

are independently of each other

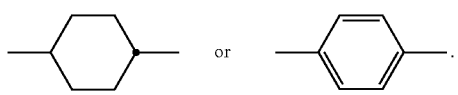

23. The method of claim 15, wherein said liquid crystal composition comprises at least 50 weight % (based on the total weight of the composition) of said component (α).

24. The method of claim 15, wherein said liquid crystal composition comprises at least 50 weight % (based on the total weight of the composition) of said component (α) whereby at least 30 weight % (based on the total weight of the composition) of said compounds have a dielectric anisotropy Δε of at least 40.

25. The method of claim 17, wherein said liquid crystal composition comprises at least one compound of formula II of said component (α) and at least 8 weight % (based on the total weight of the composition) of said component (β).

26. The method of claim 20, wherein said liquid crystal composition comprises at least 5 weight % (based on the total weight of the composition) of said component (γ).

27. The method of claim 15, wherein said liquid crystal composition further comprises at least one compound of formula XV and/or of formula XVI and/or XVII and/or of formula XVIII and/or of formula XIX and/or of formula XX and/or of formula XXI and/or of formula XXII:

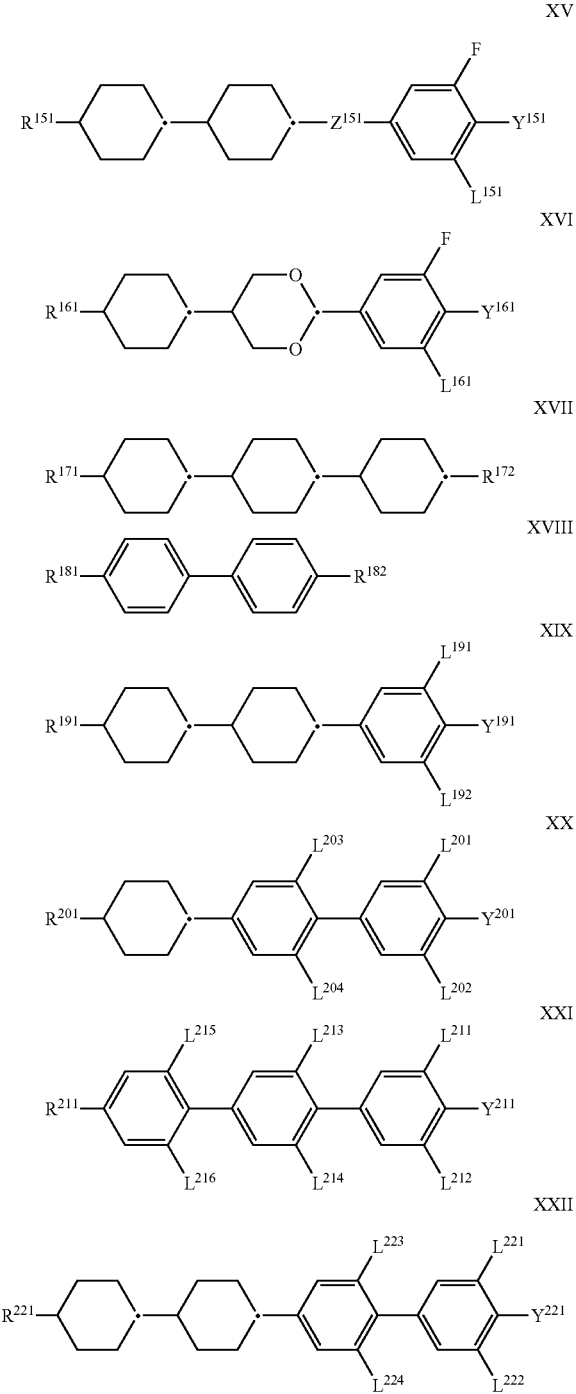

in which

R$^{151}$, R$^{161}$, R$^{171}$, R$^{172}$, R$^{181}$, R$^{182}$, R$^{201}$, R$^{211}$ and R$^{221}$ are independently of each other C$_1$-C$_{15}$ alkyl which is unsubstituted or mono- or poly-substituted with CN or halogen and in which one or more of the CH$_2$ groups may be replaced independently of each other by —O—, —S—, —CH=CH—, —C≡C—, —CO—O—, —OC—O— such that there are no hetero atoms adjacent to each other;

R$^{191}$ is C$_1$-C$_{15}$ alkyl which is unsubstituted or mono- or poly-substituted with CN or halogen and in which one or more of the CH2 groups may be replaced independently of each other by —O—, —S—, —C≡C—, —CO—O—, —OC—O— such that there are no hetero atoms adjacent to each other;

Y$^{151}$, Y$^{161}$, Y$^{191}$, Y$^{201}$, Y$^{211}$ and Y$^{221}$ are independently of each other F, Cl, C$_1$-C$_{15}$ alkanyl or C$_2$-C$_{15}$ alkenyl that are independently of each other mono- or poly-substituted with halogen, or C$_1$-C$_{15}$ alkoxy, which is mono- or poly-substituted with halogen;

L$^{151}$, L$^{161}$, L$^{191}$, L$^{192}$, L$^{201}$, L$^{202}$, L$^{203}$, L$^{204}$, L$^{211}$, L$^{212}$, L$^{213}$, L$^{214}$, L$^{215}$, L$^{216}$, L$^{221}$, L$^{222}$, L$^{223}$ and L$^{224}$ are independently of each other H or F; and Z$^{151}$ is —CO—O—, CH$_2$O or CF$_2$O.

28. A liquid crystal medium comprising:

at least 15%, by weight of the total medium, of at least one compound of formula I

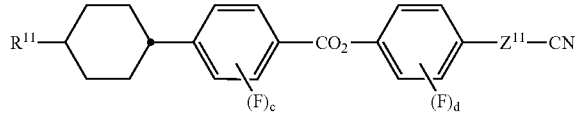

I in which c and d are independently of each other 0, 1, 2, 3 or 4;

R$^{11}$ is C$_1$-C$_{15}$ alkyl which is unsubstituted or mono- or poly-substituted with CN or halogen and in which one or more of the CH$_2$ groups may be replaced independently of each other by —O—, —S—, —CH=CH—, —C≡C—, —CO—O—, —OC—O— such that there are no hetero atoms adjacent to each other; and Z$^{11}$ is a single bond or —C≡C—, and at least one compound of formula II

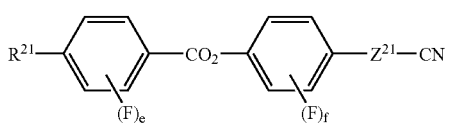

II in which e and f are independently of each other 0, 1, 2, 3 or 4;

R$^{21}$ is C$_2$-C$_{15}$ alkenyl which is unsubstituted or mono- or poly-substituted with CN or halogen and in which one or more of the CH$_2$ groups may be replaced independently of each other by —O—, —S—, —CH=CH—, —C≡C—, —CO—O—, —OC—O— such that there are no hetero atoms adjacent to each other;

Z$^{21}$ is a single bond or —C≡C—; and at least 5%, by weight of the total medium, of one or more compounds of the formula IIID or IIIE:

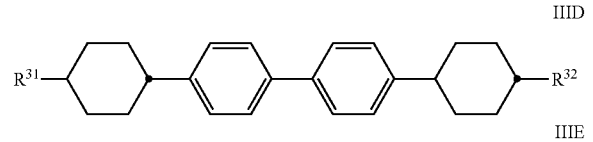

IIID

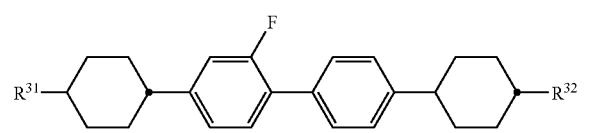

IIIE in which

R$^{31}$ and R$^{32}$ are independently of each other C$_1$-C$_{15}$ alkyl which is unsubstituted or mono- or poly-substituted with CN or halogen and in which one or more of the CH$_2$ groups may be replaced independently of each other by —O—, —S—, —CH=CH—, —C≡C—, —CO—O—, —OC—O— such that there are no hetero atoms adjacent to each other.

* * * * *

UNITED STATES PATENT AND TRADEMARK OFFICE
CERTIFICATE OF CORRECTION

PATENT NO.        : 7,294,368 B2                                              Page 1 of 1
APPLICATION NO.   : 10/538788
DATED             : November 13, 2007
INVENTOR(S)       : Matthew Francis It is certified that error appears in the above-identified patent and that said Letters Patent is hereby corrected as shown below:

Column 87, line 6, reads "and are independently" should read -- are independently --
Column 90, line 37, reads "$L^{32} L^{33}$" should read -- $L^{32}$ and $L^{33}$ --
Column 92, line 34, reads "k is0," should read -- k is 0, --
Column 93, line 37, reads "$Y_{111}$" should read -- $Y^{111}$ --
Column 93, line 41, reads "$L_{111}$ and $L_{112}$" should read -- $L^{111}$ and $L^{112}$ --
Column 95, line 12, reads "CH2" should read -- $CH_2$ --
Column 95, line 21, reads "$L^{204, L211}$," should read -- $L^{204}$, $L^{211}$ --

Signed and Sealed this

First Day of July, 2008

JON W. DUDAS
*Director of the United States Patent and Trademark Office*